US012784035B2

(12) United States Patent
Robell et al.

(10) Patent No.: US 12,784,035 B2
(45) Date of Patent: Nov. 3, 2026

(54) TECHNOLOGIES FOR CREATING AND TRANSFERRING NON-FUNGIBLE TOKEN BASED IDENTITIES

(71) Applicant: FORTIOR SOLUTIONS, LLC, Hillsboro, OR (US)

(72) Inventors: James Frederick Robell, Beaverton, OR (US); James G. Hart, Hillsboro, OR (US); Qui Quoc Hoang, Portland, OR (US); Viet Quoc Hoang, Portland, OR (US)

(73) Assignee: FORTIOR SOLUTIONS, LLC, Hillsboro, OR (US)

( * ) Notice: Subject to any disclaimer, the term of this patent is extended or adjusted under 35 U.S.C. 154(b) by 0 days.

(21) Appl. No.: 19/288,911

(22) Filed: Aug. 1, 2025

(65) Prior Publication Data

US 2026/0099836 A1 Apr. 9, 2026

Related U.S. Application Data

(63) Continuation of application No. 18/175,791, filed on Feb. 28, 2023, now Pat. No. 12,417,449.

(60) Provisional application No. 63/315,396, filed on Mar. 1, 2022.

(51) Int. Cl.
*G06Q 20/36* (2012.01)
*G06Q 20/38* (2012.01)

(52) U.S. Cl.
CPC ....... *G06Q 20/3672* (2013.01); *G06Q 20/389* (2013.01)

(58) Field of Classification Search
CPC ......................... G06Q 20/3672; G06Q 20/389
See application file for complete search history.

(56) References Cited

U.S. PATENT DOCUMENTS

| | | | | |
|---|---|---|---|---|
| 11,354,669 | B2 * | 6/2022 | Snyder | H04L 9/06 |
| 12,112,328 | B1 * | 10/2024 | Kurian | G06Q 20/40145 |
| 12,259,962 | B1 * | 3/2025 | Warnick | G06F 21/45 |
| 2018/0307857 | A1 * | 10/2018 | Beecham | G06F 16/9024 |
| 2018/0314880 | A1 * | 11/2018 | Fadeev | G06V 40/173 |
| 2021/0241243 | A1 * | 8/2021 | Wiklof | G06Q 20/0655 |

(Continued)

FOREIGN PATENT DOCUMENTS

| | | | | |
|---|---|---|---|---|
| KR | 20170127854 A | * 11/2017 | | G06Q 20/403 |
| WO | WO-2018017068 A1 | * 1/2018 | | G06Q 20/20 |

(Continued)

*Primary Examiner* — Duan Zhang
(74) *Attorney, Agent, or Firm* — Schwabe Williamson & Wyatt

(57) ABSTRACT

The present disclosure is related to blockchain technologies, tokenization and non-fungible token (NFT) technologies, identity verification, account verification, information security (InfoSec), and fraud prevention technologies, and in particular, to technologies for creating NFT identities (IDs) for individuals and/or organizations. An NFT ID service interacts with users to obtain ID information such as ID documents, biographical data, biometric data, and/or any other suitable data. The NFT ID service includes an NFT ID engine that generates an NFT-based form of digitized and/or tokenized ID, using blockchain technology, smart contracts, distributed ledgers, digital wallets, and the ID information. Other embodiments may be described and/or claimed.

28 Claims, 7 Drawing Sheets

(56) References Cited

U.S. PATENT DOCUMENTS

2022/0271960 A1* 8/2022 Liu ............ H04L 9/50
2022/0327529 A1* 10/2022 Williams ............ H04L 9/50
2022/0329436 A1* 10/2022 Gaur ............ H04L 9/50
2022/0394484 A1* 12/2022 Moudhgalya ......... H04W 12/40
2022/0414698 A1* 12/2022 Doumar ............ G06Q 10/10
2023/0034169 A1* 2/2023 Ferenczi ............ H04L 9/0894
2023/0045056 A1* 2/2023 Padmanabhan ........... H04L 9/50
2023/0108366 A1* 4/2023 Tang ............ G06Q 20/3829 705/66
2023/0126386 A1* 4/2023 Kurian ............ H04L 63/126 705/76
2023/0138797 A1* 5/2023 Kurian ............ G06F 21/602 713/193
2023/0186291 A1* 6/2023 Haddad ............ G06Q 20/363 705/64
2023/0186309 A1* 6/2023 Kurian ............ G06Q 20/3674 705/44
2023/0206219 A1* 6/2023 Khuong ............ G06Q 20/3825 705/75
2023/0214819 A1* 7/2023 Tham ............ G06Q 10/40 705/64
2023/0224177 A1* 7/2023 Linton ............ H04L 9/3213 713/189
2023/0241514 A1* 8/2023 Dalmia ............ A63F 13/35 463/40
2023/0259919 A1* 8/2023 Dorward ............ G06Q 20/389 705/66
2023/0379160 A1* 11/2023 Ferenczi ............ H04L 9/0863
2024/0013169 A1* 1/2024 Dershem ............ G06Q 20/14
2024/0403403 A1* 12/2024 Brown ............ G06F 21/32
2025/0053628 A1* 2/2025 Tali ............ H04L 9/50
2025/0132919 A1* 4/2025 Hu ............ H04L 9/3218

FOREIGN PATENT DOCUMENTS

WO WO-2019202563 A1 * 10/2019 ........... H04L 63/123
WO WO-2021174139 A1 * 9/2021 ........... G06Q 50/188

* cited by examiner

TECHNOLOGIES FOR CREATING AND TRANSFERRING NON-FUNGIBLE TOKEN BASED IDENTITIES

RELATED APPLICATIONS

The present application is a continuation application of U.S. patent application Ser. No. 18/175,791 filed Feb. 28, 2023 which claims priority to U.S. Provisional App. No. 63/315,396 filed on Mar. 1, 2022, the contents of which are hereby incorporated by reference in their entirety.

FIELD

The present disclosure generally relates to the fields of computing, data processing, cryptography, blockchain technologies, tokenization and non-fungible tokens (NFTs), identity verification, account verification, information security (InfoSec), and fraud prevention technologies, and in particular, to technologies for creating NFT-based identifiers and/or identities for individuals and/or organizations.

BACKGROUND

Identity verification services are often used by businesses and/or government agencies to ensure that information provided by users is associated with the identity of a real person. The identity of the real person may be verified using identity information indicated by physical identity documents (e.g., identity card, driver's license, passport, national identification card, and/or the like). The identity document is usually used to connect a person to information about the person, often in a database such as those provided by one or more authoritative sources (e.g., credit bureaus, government database(s), corporate database(s), and/or the like).

In some places, such as in the United State of America (US), individuals may be issued numerous forms of identity cards such as state-issued driver's license or other state-issued ID, social security card, passport, health insurance cards, company (e.g., employer) ID cards, and/or the like. These physical forms of ID have varying levels of security, trustworthiness, and identity assurance, and can be susceptible to counterfeit.

BRIEF DESCRIPTION OF THE DRAWINGS

Embodiments and/or implementations will be readily understood by the following detailed description in conjunction with the accompanying drawings. The accompanying drawings illustrate by way of example, and not by way of limitation, the embodiments and/or implementations. To facilitate the present description, like reference numerals designate like structural elements.

DETAILED DESCRIPTION

1. Non-Fungible Token Identity Embodiments

Embodiments described herein include technologies for creating NFT-based IDs including creating NFT IDs derived from other forms of IDs such as physical identity documents. The ID ecosystems of many jurisdictions, such as the US, are complex and fragmented. Identity documents are not easily verifiable as genuine or connected to the correct person. Identity theft and financial fraud are prevalent risks in the current ecosystem. The embodiments discussed herein provide a technical means for generating identity documents that defragment existing identity ecosystems, are easily verifiable as genuine and connected to the correct individual, and prevent or reduce the likelihood of identity theft or other forms of fraud.

Figure 1:
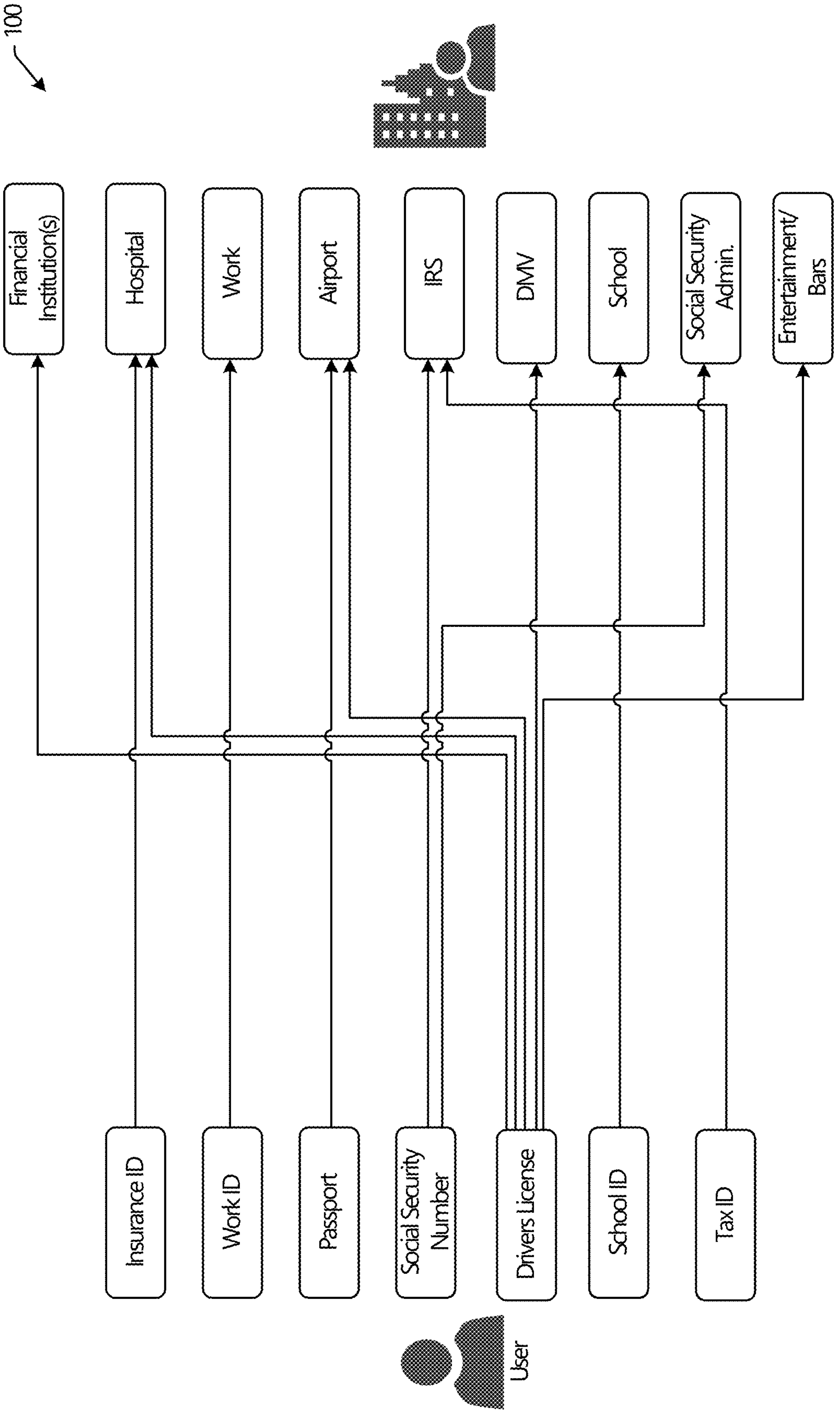
FIG. 1 depicts an example of existing identity ecosystems.

FIG. 1 depicts the existing ID ecosystem 100 in the US. Throughout the present disclosure, the US ID ecosystem is used as an example use case. However, the embodiments discussed herein may be applicable to the identity ecosystem of any geopolitical entity, legal jurisdiction, enterprise or corporate entity, and/or ad-hoc/non-formal entity or group.

As there is no compulsory federal-level ID card that is issued to all US citizens, most US citizens and US non-citizen residents use a patchwork of identity documents issued by federal, state, and local governments as de facto identity cards. The government-issued identity documents used by most persons in the US typically include a state-issued driver's license or other state-issued ID, a bio security (SS) card (or just the SS number), passport or (US passport card), permanent resident card (colloquially referred to as a "green card"), and in some cases a Common Access Card (CAC). In addition, birth certificates, registrations, health insurance cards, organization/company ID cards, school (e.g., university, secondary school, and/or the like) ID cards, firearms permits, and many other physical forms of ID are also used for various purposes. However, these other forms of ID are fragmented and siloed solutions, which are usually not accepted outside of their specific domains. Despite their low assurance as a physical token for verifying identity, existing identity documents are used for various purposes, such as proving one's identity to obtain services from governmental agencies or private entities, as well as obtaining credit and other regulated financial services in banking, investments, and tax.

The Real ID Act of 2005, H.R. 1268 Title II §§ 201-207, Pub. Law 109-13, 109th Cong. (2005) established uniform standards for the design and content of state drivers' licenses. Real ID is an example of an attempt by the Government sector to improve the security, trustworthiness, and identity assurance of existing forms of identity documents. Even with passage of the Real ID Act, most US citizens and US non-citizen residents are required to use different identity documents to prove their identity with different governmental bodies. Additionally, Real ID compliant identity documents have yet to be implemented as a required form of ID for flying on commercial airlines or other purposes, and Real ID compliant identity documents are still not required in many States.

Furthermore, the aforementioned identity documents have varying levels of security, trustworthiness, and identity assurance and add complexity to the current ID ecosystem 100. For example, many identity documents are printed on basic card stock that lacks meaningful security features, some of which do not include a photo of the individual. For this reason, fake identity documents (e.g., fake driver's licenses) are still widely and cheaply available on the internet.

Some identity documents include an integrated circuit chip (ICC) that contains information (info) about the owner, including a personal identification number (PIN) and one or more public key infrastructure (PKI) digital certificates. However, a smartcard reader is usually needed in order to utilize the info stored in the ICC, and many governmental agencies and business lack these devices.

Some websites and social media platforms previously or currently offer identity verification processes (also known as "account verification"). Account verification is a process of verifying that a new or existing account (e.g., account with the social media platform) is owned and/or operated by a specified individual or organization. Verified accounts are often visually distinguished by an icon (e.g., check mark, badge, and/or the like) somewhere in the profile of the verified account, incorporated in or with the account's avatar, next to the user name of verified individual or organization, and/or somewhere that is visually identifiable by other users of the platform. Account verification, at least in theory, enhances the quality of online services, mitigating sock puppetry, bots, trolling, online harassment, spam, vandalism, fake news, disinformation, and election interference. Examples of account verification processes include Facebook® blue verified badges, YouTube® grey check mark, and Twitter® blue check mark. However, these social media account verification processes and icons only work with one platform. Additionally, some platforms have requirements preventing most users from accessing the account verification services (e.g., at present, YouTube® requires at least 100,000 subscribers and other requirements to receive a Grey Check).

The embodiments herein simplify the ID ecosystem and also improve security and identity verification in comparison to existing technologies. In particular, the embodiments herein enhance the ID ecosystem, by providing for an NFT-based form of digitized/tokenized personal IDs using blockchain technology, smart contracts, digital wallets, and/or biometric data. The embodiments herein bring many identity-proofed physical IDs to the digital world as individual NFTs. Additionally, the NFT IDs are platform agnostic, meaning that the NFT IDs can be used across any and all platforms regardless of platform type and functionality. Furthermore, the NFT IDs are extremely difficult to duplicate or fake thereby enhancing InfoSec. The NFT IDs provide a more secure, trustworthy form of identification for all activities, online and offline that can be used anywhere, anytime, in any domain, Web2 or Web3.

Figure 2:
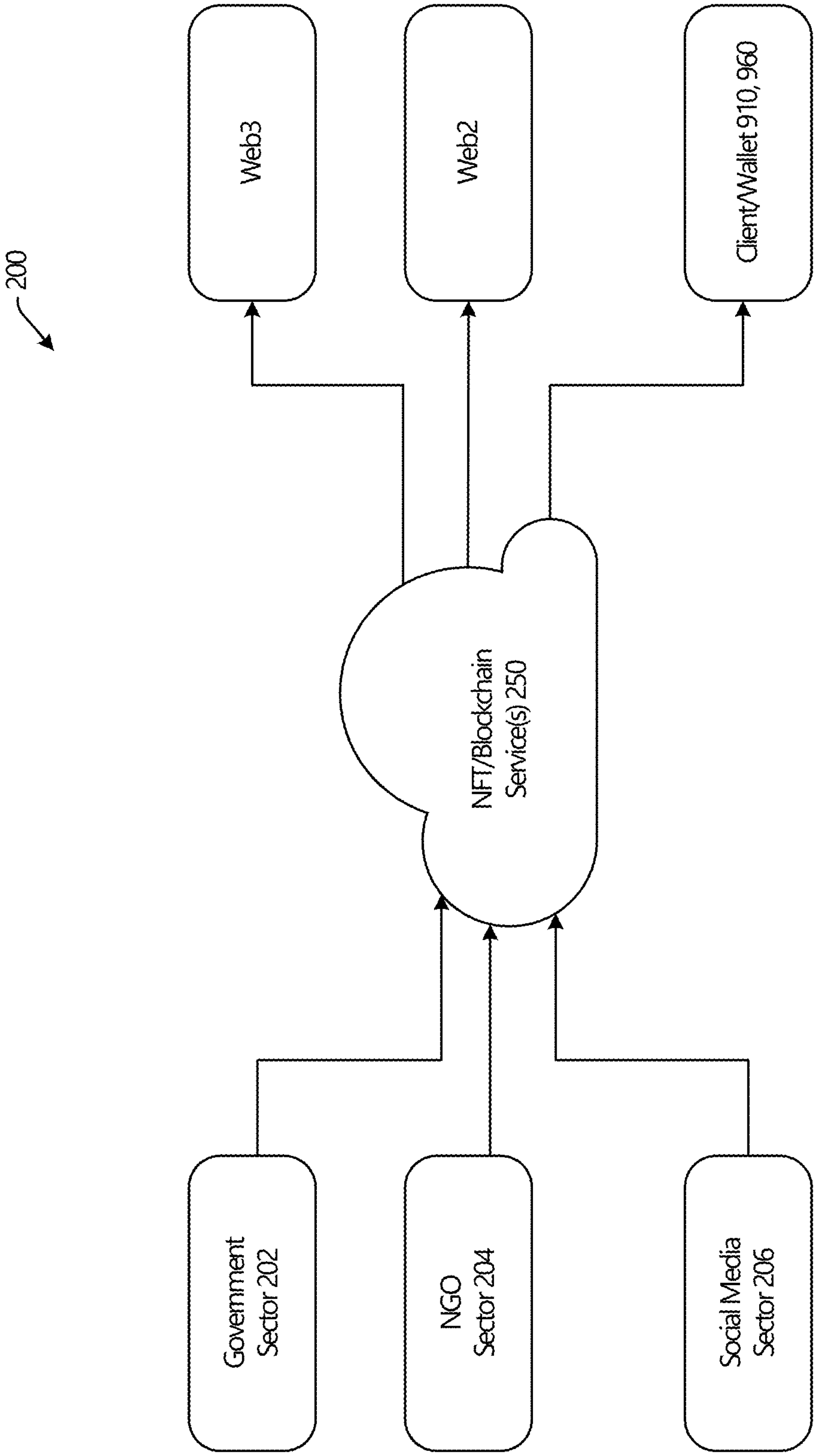
FIG. 2 depicts an NFT ID ecosystem.

FIG. 2 depicts an example NFT ID ecosystem including various data inputs and outputs to/from an example NFT/blockchain service(s) 250. The NFT/blockchain service(s) 250 provides various NFT ID services as discussed herein, and supports a wide range of usage models, which can be decided by the users and/or ID holders. Example usage models for the NFT/blockchain service(s) 250 (also referred to herein as "NFT ID service 250", "NFT service 250", "blockchain service 250", and/or the like) include government sector 202, non-governmental organization (NGO) sector 204, and social media sector 206 models. The government sector 202 includes governmental entities and/or regulatory bodies. The NGO sector 204 includes any non-profit and/or commercial entities including financial services organizations (orgs) and/or the like. The social media sector 206 includes any social media platform or other like entity that desires account verification and/or the like. Other usage models may be included in other implementations.

In an example use case, the NFT IDs discussed herein can be used by government agencies, as well as the commercial sector and other non-government agency entities, to create trustable NFT IDs based on their own security requirements and/or policies. In another example use case, the NFT IDs discussed herein allow social media influencers and content creators to identify themselves and their contents across multiple platforms, or if they move from one platform to another, through their NFT IDs.

Figure 3:
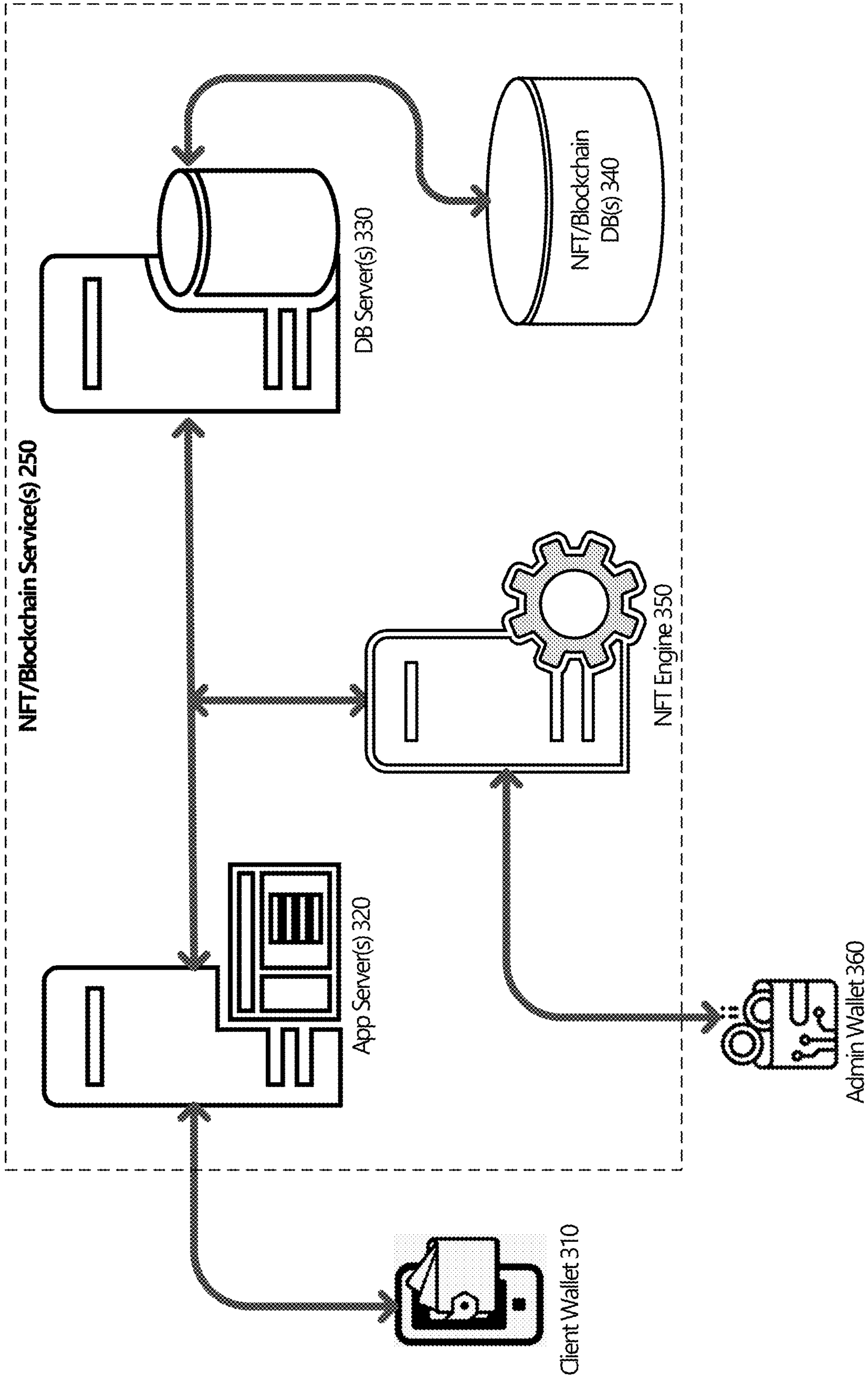
FIG. 3 depicts elements of an example NFT/blockchain service that can be used to generate NFT IDs as discussed herein.

FIG. 3 depicts various elements/components of the NFT/blockchain service 250. In this example, the NFT/blockchain service 250 includes an NFT ID engine 350 communicatively coupled with one or more app servers 320 and one or more database (DB) servers 330. The server(s) 320, 330, and/or 350 operate distributed applications to provide the NFT/blockchain service 250 to client/wallet devices 310. The server(s) 320, 330, and/or 350 may be located in one or more data centers (e.g., provided by a cloud computing service and/or the like), at the network's "edge", and/or in some other arrangement or configuration. One or more of the servers 320, 330, and/or 350 may be virtual machines (VMs) or other isolated user-space instances provided by a cloud computing service, edge computing service, and/or the like. Furthermore, some or all of the server(s) 320, 330, and/or 350 may also provide various administration capabilities to support the various aspects discussed herein. In various implementations, the servers 320, 330, and/or 350 can be located at different geographic locations such as, for example, in different data centers, co-located with different network access nodes, and/or the like. In one example implementation, the infrastructure may include a full stack in the cloud, the servers 320, 330, and 350 implementing a suitable Linux distribution (distro), operating NGINX and/or Apache® web/app servers, where the server-side languages of the distributed apps are written using PHP, Python, JavaScript, and Solidity, and the DB systems (e.g., NFT ID DBs 340) are implemented using MySQL, MongoDB, and InterPlanetary File System (IPFS).

In some implementations, the server(s) 320 receive ID info (e.g., ID info 513 in FIG. 5) as inputs (e.g., inputs 401 in FIG. 4) via a front-end NFT ID portal (e.g., mobile app and/or website, not shown by FIGS. 2 and 3). The ID info may include, for example, physical or electronic ID documents and/or other info such as contact info, authentication credentials, biometric data, and/or the like. In some implementations, physical IDs may be scanned in and uploaded by individual users (using their client/wallet 310, 360) to the server(s) 320 using a suitable user interface provided by the front-end NFT ID portal. This user interface can also be used to provide (upload) electronic documents/info to the server(s) 320. Additionally or alternatively, the ID info can be provided to the server(s) 320 via third party web/mobile apps and/or Web2 apps using suitable APIs and/or the like. The term "user", "individual", "wallet", "client", "device", "user device", "administrator", "admin", and/or the like (in singular or plural form) may be used interchangeably throughout the present disclosure, and these terms may refer to one or more client applications, client devices (e.g., any of the client devices/systems 310, 360, 650), and/or one or more users of the client applications and/or client devices.

Web 2.0 platforms ("Web2" in FIG. 2) are websites and/or apps that emphasize user-generated content, ease of use, participatory culture and interoperability (i.e., compatibility with other products, systems, and devices) for end users (e.g., users 310, 360). A Web2 platform allows users (e.g., users 310, 360) to interact and collaborate with each other through, for example, social media dialogue as creators of user-generated content in a virtual community. Data and content are centralized in a relatively small group of companies sometimes referred to as "Big Tech". Examples of Web2 platforms include social networking sites or social media platforms (e.g., Facebook®, Instagram®, Twitter®, and/or the like); blogs, wikis, and folksonomies ("tagging" keywords on websites and links); video sharing platforms (e.g., YouTube®, Vimeo®, TikTok®, and/or the like); image sharing platforms (e.g., Flickr®, Imgur®, and/or the like); hosted services; Web apps and mobile apps; collaborative consumption platforms; and mashup apps. Web 3.0 platforms ("Web3" in FIG. 2) represent a new iteration of the World Wide Web based upon blockchain technologies, which incorporates concepts including decentralization and token-based economics. Web3 platforms usually revolve around the idea of decentralization and often incorporate blockchain technologies, such as various cryptocurrencies and NFTs.

The received ID info may be provided to the DB servers 330, which may store the data in the NFT ID DB(s) 340 for temporary and/or persistent storage. The DB(s) 340 can be any suitable relational and/or non-relational DB(s) stored by one or more suitable data storage devices. The DB servers 330 may also be configurable to destroy the stored info within a predefined or configurable period of time (e.g., by deleting such info from the DB(s) 340). In some implementations, the servers 320, 330, and/or 350 can also be configurable or operable to generate reports and statistics to authorized recipients upon request. In embodiments, the received ID info is provided to the NFT ID engine 350 for generation of suitable NFT IDs according to the various embodiments discussed herein.

The NFT ID engine 350 is an adaptable and multipurpose software and/or hardware element that generates an NFT-based form of digitized/tokenized ID, using blockchain technology, smart contracts, distributed ledgers, digital wallets 310, and/or identity data (e.g., identity documents, personal info, biometric data, and/or the like). In some implementations, the NFT ID engine 350 is an application operated by one or more computing devices such as one or more servers (e.g., a cluster of cloud compute nodes, one or more edge compute nodes, and/or the like). Additionally or alternatively, the NFT ID engine 350 may be a distributed application operated by multiple app servers 320. Additionally or alternatively, the NFT ID engine 350 may be a special-purpose hardware device or a collection of special-purpose hardware devices that are accessible by the app servers 320.

The NFT ID engine 350 accepts inputs (e.g., inputs 401 in FIG. 4) from any number of sources, processes the inputs, and produces NFT IDs (e.g., outputs 402 in FIG. 4) that can be used on Web2 and/or Web3 platforms (see e.g., FIG. 2), and/or carried by individuals via digital wallets 310. In various implementations, the NFT ID engine 350 can take any form of physical ID, digital ID, and/or other info, process them in complex ways as defined by the users (e.g., users 310, 360), and generate and output an NFT ID form to be used in various applications (apps) such as Web2 and/or Web3 apps (see e.g., FIG. 2). The generated NFT IDs are then stored in the NFT ID DB(s) 340 via the DB servers 330 in one or more distributed ledgers or blockchains (e.g., blockchains 415 in FIG. 4).

The term "blockchain" refers to a set of technologies that use cryptography to create secure linkages between records (referred to as "blocks"). A blockchain (e.g., a blockchain 415 in FIG. 4) is a type of distributed DB that can record transactions in a public or private peer-to-peer network. Additionally or alternatively, a blockchain is a DB containing info (e.g., records of financial transactions and/or other transactions) that can be simultaneously used and shared within a large decentralized, publicly accessible network. Additionally or alternatively, a blockchain is a shared, immutable ledger that facilitates the process of recording transactions and tracking (tangible and intangible) assets in a network. A blockchain (or copies of the blockchain) can be distributed to some or all participants in a blockchain network. The participants in a blockchain network are referred to as "peers" or "nodes". In some examples, the client device(s) 310, 360, server(s) 320, 330, 350, and/or other compute nodes/devices (such as any of those discussed herein) may operate as blockchain nodes in a blockchain network.

A blockchain includes a growing list of records (or a DB of transactions) that are linked together using some identifier and/or other like mechanism. This list of records/blocks may be referred to as a "ledger". In the context of blockchain technologies, a "ledger" refers to a series of interconnected records or blocks (a "distributed ledger" is another term for a blockchain). The ledger is shared, replicated, and synchronized among nodes in a blockchain network. In some implementations, a blockchain has no central administrator or centralized data storage system. However, in other implementations a centralized system may be used to validate blocks or perform other functions. Most ledgers are used to track a specific type of info or transactions such as cryptocurrency, securities, asset tokens and/or NFTs, smart contracts, and/or the like.

Typically, blocks are linked together using cryptography where each block contains a cryptographic hash of a previous block, a timestamp, and transaction data. In some implementations, the cryptographic hash of the previous block may act as a block identifier (ID) of the block, or the cryptographic hash of the block itself (including a hash of the previous block) may act as a block ID of the block. In some implementations, blocks may be encrypted to enhance security. The timestamp proves that the transaction data existed when the block was published in order to get into its hash.

Because each block contains info about the block previous to it, a chain is formed with each additional block reinforcing the ones before it. This makes blockchains resistant to modification of their data because, once recorded, the data in any given block cannot be altered retroactively without altering all subsequent blocks. An advantage of using blockchain technology is that transactions performed on a blockchain are immutable, which means that the transactions cannot be changed or altered without permission from the network. This creates an accurate and nearly unchangeable record (or chain of records) that can be used to verify each transaction, such as each transfer of title or ownership, identity changes and/or changes/updates to identifying info, and/or the like. Publishing an update to an individual record can be done, but requires altering the cryptographic hash that was generated as the record was created, and any records added to the ledger after an altered record must be re-validated and re-added to the ledger (also with updated hashes). In a blockchain, a change to a record's value is typically published as a new ledger entry. When this single blockchain is connected to some kind of network that can handle communication between nodes and provide an agreed upon system for each node to verify changes to network data, then an individual blockchain can be replicated across different nodes in the network. This replication creates multiple blockchain ledgers, containing identical records that have been independently verified. In these ways, a blockchain provides immutability for the transactions that are tracked.

Example info that may be included in a block includes a timestamp (e.g., the time when the block was mined or created), a block number (e.g., the length of the blockchain in number of blocks), fee per gas or gas price (e.g., the minimum fee per gas required for a transaction to be included in the block), difficulty (e.g., the effort required to mine the block), mix hash (e.g., a unique identifier for the block), parent hash (e.g., a unique identifier for the block that came before (i.e., the previous block or the top-most block)), transaction data (e.g., the transaction included in the block (e.g., inputs 401 in FIG. 4)), state root (e.g., the entire state of the system including, for example, account balances, contract storage, contract code, account nonces, identity documents and/or identity data, and/or the like), and a nonce (e.g., a hash that, when combined with the mix hash, proves that the block has gone through a consensus (e.g., proof-of-work, proof-of-stake, and/or the like)). Additional or alternative info may be included in a block in other implementations.

Blockchains can be managed by a peer-to-peer network for use as a publicly distributed ledger, where nodes collectively adhere to a protocol to communicate and validate new blocks. These blockchains are referred to as "public blockchains". Public blockchains are permission-less by nature, allowing most users to join, and are usually decentralized (e.g., stored and updated by multiple compute nodes). By contrast, a private blockchain is a blockchain network where only one or a few authorities or organizations have control over the blockchain network including, for example, rules and/or policies for adding new blocks to the blockchain and/or the like.

A non-fungible token (NFT) is a unique and non-interchangeable unit of data stored on a blockchain. NFTs use a digital ledger to provide a public certificate of authenticity or proof of ownership, but do not restrict the sharing or copying of the underlying digital files. The lack of interchangeability (fungibility) distinguishes NFTs from blockchain cryptocurrencies, such as Bitcoin, Ethereum, and/or the like. The mapping from original data to a token uses methods which render tokens infeasible to reverse in the absence of the tokenization system, for example, using tokens created from random numbers. Tokenization systems provide data processing applications with the authority and interfaces to request tokens, or detokenize back to sensitive data. NFTs can be associated with reproducible digital files such as photos, videos, and audio.

As mentioned previously, the NFT IDs generated by the NFT ID engine 350 can be stored in a client wallet 310 (also referred to as a "digital wallet 310", "cryptocurrency wallet 310", "wallet device 310", "wallet 310", and/or the like). The wallet 310 is a device, physical medium, program, software engine, and/or a service that stores a user's credentials (e.g., cryptographic private keys and/or public keys, digital certificates, and/or the like) for completing transactions such as cryptocurrency and/or other blockchain-related transactions. In some implementations, the wallet 310 may be, or part of, a software element, such as a mobile payment app operated by a user device (e.g., Apple Pay®, Google Pay®, PayPal®, Venmo®, and/or the like).

In some implementations, the user device 310, 360 is a mobile device, such as a laptop, smartphone, tablet, wearable device (e.g., smartwatch and/or the like), virtual reality (VR)/augmented reality (AR) headset, and/or the like, or any other suitable computing device, such as any of those discussed herein. In these implementations, the wallet 310 may be a platform-specific app (e.g., iOS® app, Android® app, and/or the like). In other implementations, the wallet 310 is a standalone hardware device such as the Ledger Nano X™ provided by Ledger SAS®, the YubiHSM2™ provided by Yubico®, the Trezor Model TR provided by SatoshiLabs S.R.O., and/or the like. In these implementations, the standalone hardware device may be specifically designed to operate as a wallet device, or may be designed as a secure element (e.g., a hardware authentication device, security token, and/or the like). Additionally or alternatively, the wallet 310 is a secure element within a larger computing system such as, for example, a trusted platform module (TPM), a secure cryptoprocessor, software and/or hardware-based secure enclaves, a trusted execution environment (TEE) (see e.g., TEE 609 in FIG. 6), a protected location, and/or the like. Additionally or alternatively, the wallet 310 may be a "hot wallet" (e.g., a wallet that stores the user credentials, a network-connected application, and/or the like) or a "cold wallet (e.g., a wallet that stores the user credentials offline and/or disconnected from the internet or other network).

In various implementations, the user credentials are associated with a state of a user's account in a blockchain-based framework. The wallet 310 allows the user to make transactions, where the public key of the public/private key pair allows other wallets to make payments to the wallet 310 (e.g., using the wallet's 310 network address, app/wallet identifier, and/or the like) and the private key of the public/private key pair allows the wallet 310 spend currency or cryptocurrency stored by the wallet 310 and/or in the blockchain. In addition to this basic function of storing the keys, the wallet 310 also offers the functionality of encrypting and/or digitally signing info or electronic documents. Signing can for example result in executing a smart contract, a cryptocurrency transaction, identification process, legally signing a document, and/or the like.

Additionally, an administrator (admin) that operates the admin wallet 360 (also referred to as "admin 360") associated with an org/entity defines the requirements and functions of each NFT ID type. The admin 360 may be the same or similar as the client 310, but is operated by a user having administrator privileges. For example, the admin 360 may represent a client app, client device, and/or any other type of app or device/system, such as any of those discussed herein. In some implementations, the admin 360 is involved in the creation of the NFT IDs by coding, compiling, deploying, and running a smart contract in/at the NFT ID engine 350. Additionally or alternatively, the admin 360 gathers info provided by individual users, encrypts the info, and then uploads the info to the NFT/blockchain service 250. In some implementations, the admin 360 uploads the info to a distributed file system and/or a private data storage server (e.g., file system microservice 414 in FIG. 4 and file system 560 in FIG. 5 via the NFT ID engine 350). In some examples, the distributed file system is implemented using [IPFS]. The admin 360 uses a client/wallet device 360, which may be the same or similar as the wallet 310, or may be (or access) a different admin portal/interface. In addition to the aspects discussed previously with respect to (w.r.t) the wallet 310, the wallet 360 may also perform monitoring and/or housekeeping functionality.

Furthermore, the wallets 310, 360 implement a wallet interface with the NFT/blockchain service 250 in order to provide inputs (e.g., inputs 401 in FIG. 4) to the NFT/ blockchain service 250, and to accept outputs (e.g., NFT IDs/outputs 402 in FIG. 4) such as accepting transfers and/or the like. This wallet interface may be the aforementioned NFT ID front-end portal or some other interface.

Figure 4:
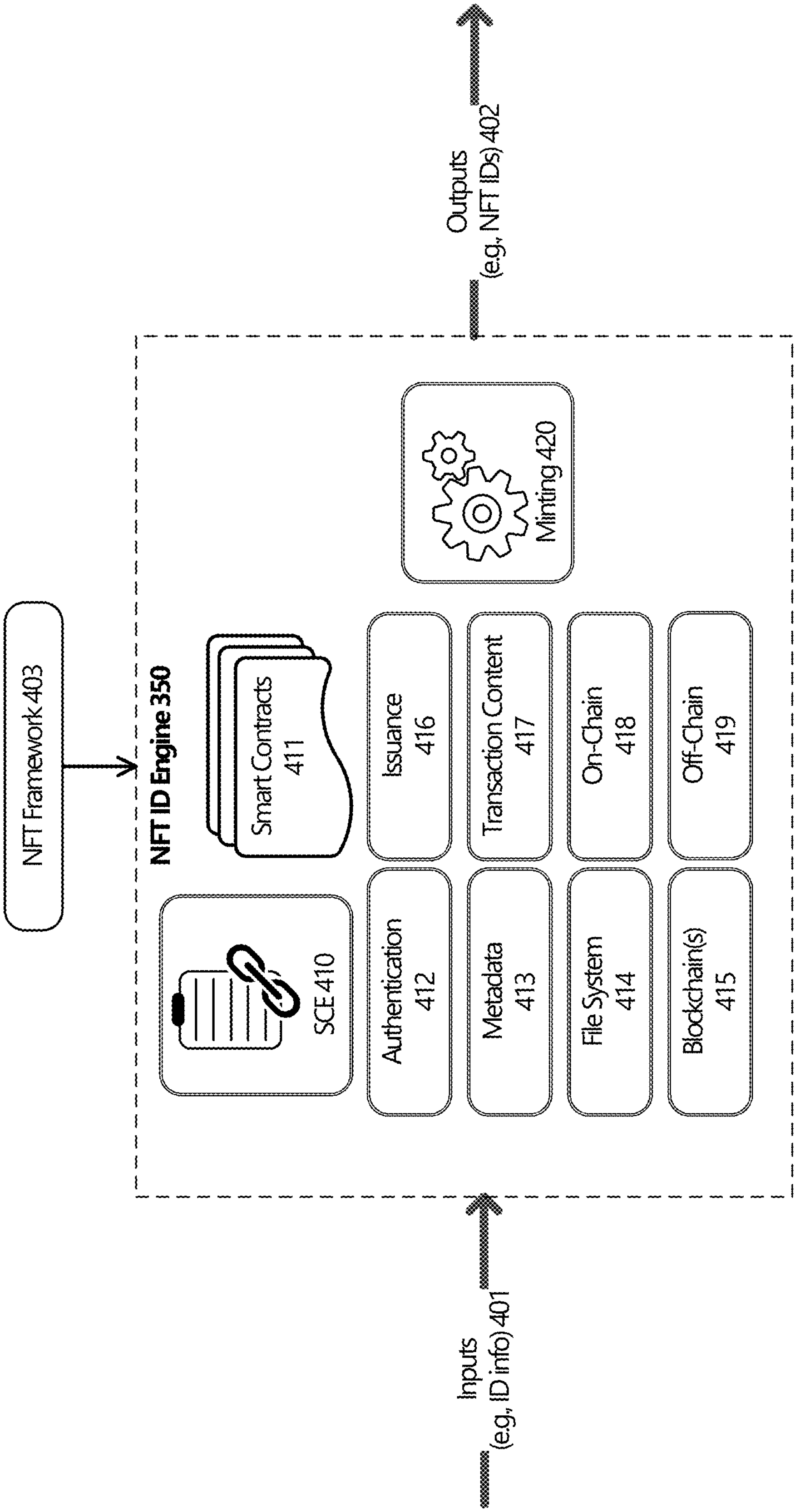
FIG. 4 depicts components of an example NFT ID engine.

FIG. 4 depicts an example implementation of the NFT ID engine 350. The NFT ID engine 350 is or includes one or more multi-use applications that include multiple microservices and business logic. In this example, the microservices of the NFT ID engine 350 include a smart contracts engine (SCE) 410, one or more smart contracts 411, authentication engine 412, metadata 413, file system microservice 414, one or more blockchains 415, issuance microservice 416, transaction content 417, on-chain microservice 418, off-chain microservice 419, and minting engine 420. Although the example of FIG. 4 shows the NFT ID framework 403 as being a separate entity than the NFT engine 350, in other implementations, the NFT ID framework 403 is an element or component of the NFT engine 350 or the NFT engine 350 is an element or component of the NFT ID framework 403.

As alluded to previously, the NFT ID engine 350 accepts various inputs 401 (e.g., the ID info 513 and/or other info/data discussed herein), performs various operations (e.g., using the microservices 411-420), and produces NFT ID(s) as outputs 402 (also referred to herein as "NFT IDs 402" and/or the like). The inputs 401 may include various identity documents (e.g., electronic identity documents and/or physical identity documents scanned in or otherwise transformed into electronic form) and/or other data associated with a particular individual or user. Additionally or alternatively, the inputs 401 may include user-supplied/provided PII such as, for example, name, physical home address, physical employment address, phone number, email address, social media profile data, medical data (e.g., electronic health records (EHRs), lab test results, vaccination records, and/or the like), KYC data, KBA data, and/or any other PII. Additionally or alternatively, the inputs 401 may include other info related to a user such as, for example, rental agreements, mortgage statements, utility bills, cell phone service bills, and/or other financial instruments and/or financial institution documents. Additionally or alternatively, the web/app interface may request other info to be provided by the user such as biometric data and/or the like.

Additionally or alternatively, the inputs 401 may include other info collected from the user device such as any type or combination of: a user ID (userId) associated with the user 310, 360, timestamp of when the NFT/blockchain service 250 is accessed, geolocation info associated with the user's access of the NFT/blockchain service 250, digital certificate(s), client app data, service provider platform (SPP) data, device/system info, network-related data, and/or any other like data/info with a particular user 310, 360 or user/wallet devices 310, 360. Examples of the client app data include client app ID, client app type (e.g., browser, wallet/payment app, web app, native app, and/or the like), client app version, client app vendor, client app session ID, user agent string, and/or the like. Examples of the SPP data includes SPP account data (e.g., social media profile URL and other relevant data), login user name or credentials for accessing the SPP, SPP session ID, SPP session time, and/or the like. Examples of the device/system include info (e.g., operating system (OS) type and/or version, OS vendor, a network session ID, a device ID (e.g., serial number, product ID, EPC, RFID tag, and/or the like), Unix-like OS assigned ID (e.g., effective user ID (euid), file system user ID (fsuid), saved user id (suid), real user id (ruid), and/or the like), device fingerprint of a user/wallet device 310, 360, hardware and/or software configuration info, and/or the like. Examples of the network-related data include network address(es) associated with the client device 310, 360, session ID, cookie IDs, realm name, domain name, network credentials (e.g., SIM card info and/or the like), and/or the like. Some or all of the aforementioned info may be collected by program code/script embedded in webpages/web apps of the NFT ID front-end portal, which when executed by the user device 310, 360, causes the user device to collect such data and send it to the NFT/blockchain service 250 as inputs 401. Additionally or alternatively, sensitive data and/or confidential info may be collected. The personal, sensitive, and/or confidential data can be anonymized and/or pseudonymized or otherwise de-identified using suitable anonymization and/or pseudonymization technique(s).

The particular types of inputs 401 used may be specified or configured by an admin 360 associated with a particular platform, agency, org, or other entity. In some implementations, individual users 310, 360 provide the inputs 401 to the NFT/blockchain service 250 (e.g., using their client/user devices). Additionally or alternatively, an admin 360 collects the necessary, relevant, and/or predefined info and provides the info as inputs 401 to the NFT/blockchain service 250 (e.g., using their client/user devices and/or a specialized/secure admin portal). Additionally or alternatively, a configuration (or smart contract 411) can specify that a first set of inputs 401 are to be provided by users 310 and a second set of inputs 401 are to be provided by an admin 360. For example, the first set of inputs 401 provided by a user 310 can include scanned identity documents (e.g., driver's license, passport, and/or the like), biometric data, and/or other identity data/info (e.g., KYC data, KBA data, social media profile, and/or the like), and the admin 360 may be required to provide a second set of inputs 401 including org-specific codes or electronic documents (e.g., password, digital certificate, and/or the like).

In a first example implementation, the inputs 401 include government-issued and/or government-approved physical identity documents, and the NFT ID engine 350 produces identify-proofed NFT IDs 402. In one implementation, the identify-proofed NFT IDs 402 are government forms of identification in NFT format. Additionally or alternatively, the identify-proofed NFT IDs 402 can be loaded onto a smart card that is also used as a governmental identity card/document. In this example implementation, the particular inputs 401 used to create the NFT IDs 402 may be defined by the relevant agency, regulatory body, and/or other government sector 202 org. Here, different government sector 202 orgs may define or require different types and/or combinations of inputs 401 that are needed to produce an NFT ID 402 for their org (e.g., the U.S. Central Intelligence Agency may require more and/or different types of inputs 401 than those defined for various offices of the U.S. Department of Commerce).

In a second example implementation, the inputs 401 include identity documents and/or other info/data as defined by an NGO sector 204 entity such as non-profit orgs (e.g., schools, religious orgs, and/or the like), for-profit orgs (e.g., corporations, LLCs, and/or the like), and/or the like. The info and usage model for each NGO NFT ID 402 is decided by the users 310 and/or admins 360 of such orgs. In this example, the NFT ID engine 350 generates NGO/commercial NFT IDs from the accepted inputs. In one example, the NGO/commercial NFT IDs 402 generated by the NFT ID engine 350 may be access credentials in NFT format that are used to access computing systems, physical buildings, and/or specific areas of an enterprise.

In a third example implementation, the inputs to the NFT ID engine 350 include social media handles, channel IDs, and/or the like, and the NFT ID engine 350 produces social NFT IDs 402 that can be used by various social media users 310, 360 (e.g., influencers, content creators, followers/viewers, and/or the like) across multiple platforms. These social NFT IDs 402, and the inputs 401 used to generate the social NFT IDs 402, may be defined by individual social media platforms (e.g., social media sector 206), or may be standardized by the NFT/blockchain service 250 itself. In the new "work from home"/remote work environment, the social NFT IDs 402 allow people to work, interact, and consume content virtually and remotely. The social NFT IDs 402 are not dependent upon—and are independent of—any particular social media platform and can be used for any and all social media platforms and/or other (non-social media) platforms. In some implementations, individual users 310, 360 can create more than one social NFT ID 402 for themselves. The social NFT IDs enable individuals to protect their online creations and brands on various social platforms (e.g., YouTube®, Twitter®, Instagram®, TikTok®, and/or the like) and/or verify their identities in virtual reality (VR) environments (e.g., Metaverse® and/or the like) and Web3 platforms. Presently, social media platforms can pause, freeze, suspend, or cancel long-established accounts, thereby destroying users' 310, 360 social capital built into those accounts. The social NFT IDs allow users 310, 360 to seamlessly transfer, transport, export, move or otherwise use their online personas to/with alternative platforms regardless of whether their account is shut down by an single social media platform.

In addition to or alternatively to identity documents, other data may be provided as inputs 401 such as, for example, user generated text, images, video, audio content, and/or other like data. In some implementations, biometric analysis and/or processing may be incorporated into the NFT ID generation process (e.g., including biometrics being provided as inputs 401). The biometric inputs 401 may include physiological biometrics (e.g., fingerprints, face/facial features, DNA, palm print, body part geometry, vein patterns, eye features, odor/scent, voice features or voiceprint, neural oscillations and/or brainwaves, pulse, electrocardiogram (ECG), pulse oximetry, and/or the like) and/or behavioral biometrics (or "behaviometrics") (e.g., typing rhythm, gait, signature, behavioral profile features, voice features, and/or the like). In these implementations, the NFT ID engine 350 accepts one or more biometrics as inputs 401, which are then combined together (and/or with other inputs 401) and hashed. This hash will then become part of a smart contract 411 (e.g., as generated and/or operated by the smart contracts engine 410) to generate NFT IDs 402 where use of biometrics is/are desired (e.g., identify-proofed NFT IDs 402, NGO/commercial NFT IDs 402, and/or social NFT IDs 402).

The authentication engine 412 is a microservice that authenticates individual users 310, 360 that submit or otherwise provide inputs 401 to the NFT ID engine 350. In some implementations, individuals 310, 360 register or enroll with the NFT/blockchain service 250 by providing ID info as inputs 401 to the NFT/blockchain service 250. This ID info may be the same or similar as the ID info 513 discussed infra w.r.t FIG. 5. A user interface and/or suitable client app operated by a user/client device (e.g., wallet devices 310, 360) is used to provide the ID info is provided to the NFT/blockchain service 250. For example, a web/app interface may be provided to the user system and/or wallet devices 310, 360 to access a web/app server 320 to provide the info to the NFT ID engine 350, which is then stored by the DB server(s) 330 in NFT ID DB 340. This web/app interface may include form fields for users 310, 360 to enter various ID info, PII, KYC/KBA data, and/or other info/data, an upload component for users 310, 360 to upload content (e.g., electronic ID documents, and/or the like); client-side code and/or web components that allow users 310, 360 to access content from cloud storage services (e.g., via APIs and/or SDKs provided by cloud storage providers); and/or other components and/or control elements. Additionally or alternatively, client-side script, tags, program code, and/or the like may be included in the NFT ID front-end portal/interface that collects some of the ID info/inputs 401 from the user 310, 360 when accessed by the user/wallet devices 310, 360. The info used for authentication may be the same or similar to the ID info/inputs 401 used to create the NFT IDs 402 and/or may be a subset of the ID info/inputs 401. In some implementations, the authentication engine 412 may verify the ID info/inputs 401 against authoritative sources (e.g., credit bureaus, government database(s), corporate database(s), and/or the like). Additionally or alternatively, the authentication engine 412 authenticates a user's 310, 360 identity using authentication or authorization credentials, biometric data, and/or knowledge-based authentication (KBA) data. The authentication engine 412 also provides access control to restrict what accounts can mint items, including defining and enforcing ownership and role-based access schemes (see e.g., [OZ Contracts]. Additionally or alternatively, the authentication engine 412 authenticates a user's 310, 360 identity using third party identity verification services, in which case the authentication engine 412 can communicate with the third party identity verification service via suitable APIs and/or the like.

The NFT IDs 402 and/or other tokens may be created (or "minted" in the parlance of the NFT arts) by the minting engine 420. Various aspects of the minting engine 420 are discussed in more detail infra. The minting process may be governed, controlled, or otherwise based on one or more smart contracts 411. In some implementations, individual smart contracts 411 are generated by the SCE 410 according to corresponding configurations, which may be developed or otherwise provided by admins 360. A configuration may be a collection or set of policies, rules (or rule sets), templates, definitions, schemas, parameters, criteria, conditions, data, settings, preferences, options, and/or other data structures that define aspects of NFT IDs 402 for an org and/or how such NFT IDs 402 should be minted or created. For example, a configuration may dictate or specify the specific types of inputs 401 that are to be provided by individual users 310 for minting an NFT ID 402, specific types of inputs 401 that are to be provided by individual admins 360 for minting an NFT ID 402 for individual users 310, network addresses (or address ranges) and/or domains that are permitted to mint NFT IDs 402 for the org, apps and/or wallets that are permitted to be used to mint/create NFT IDs 402, device/system types that are permitted to be used to mint/create NFT IDs 402, content types and/or formats of the inputs 401, cryptographic mechanisms (e.g., encryption standards, hash functions, and/or the like) to be used for the inputs 401 and/or outputs 402, content type(s) and/or data/file formats of the minted NFT IDs 402, arrangement of graphical elements (or "style") of the NFT IDs 402 (or the identity data structure used to mint the NFT IDs 402), a location or location range (e.g., Uniform Resource Identifier (URI), Uniform Resource Locator (URL), Persistent URL (PURL), Uniform Resource Name (URN), Digital Object Identifier (DOI), magnet link, IPFS content address, file path, and/or the like) for storing metadata 413, a location or location range (e.g., URI, URL, PURL, URN, DOI, magnet link, IPFS content address, file path, and/or the like) for storing minted NFT IDs 402, parameters and/or criteria for transferring NFT IDs 402 to owners, a list of verification nodes, parameters and/or criteria for blockchain nodes to act as verification nodes, and/or other criteria and/or parameters. The specific parameters, criteria, conditions, data, and/or other data structures defined or specified by a configuration may be based on an org's InfoSec policies, regulatory and/or auditing policies, access control lists (ACLs), and/or any other preferences, and as such, each configuration may be org-specific and/or may vary based on design choices and/or use cases. Any suitable programming languages, markup languages, schema languages, and/or the like, may be used to define individual policies 437 and instantiate instances of those policies 437. As examples, the policies 437 may be defined using Abstract Syntax Notation One (ASN.1), Apache® Thrift™, Apex®, Capirca™, CUE, IFTTT ("If This Then That"), Human-Optimized Config Object Notation (HOCON), HTML, INI, JSON, Markdown, MessagePack, Nettle, PADS/ML, Protocol Buffers (protobuf), TOML, XML, YAML, [Solidity], [OZContracts], [Flow], [Cadence], [Vyper], [Yul+], and/or some other suitable language and/or data format, such as those discussed herein. In some implementations, a suitable integrated development environment (IDE) or software development environment may be used to define and generate the configurations used by the SCE 410 to generate and deploy the smart contracts 411. Additionally or alternatively, a suitable web-based interface can be provided by the NFT/blockchain service 250 that allows admins 360 to create and submit their configurations for generating NFT IDs 402. In some implementations, a configuration may be a smart contract 411 pushed or otherwise deployed to one or more blockchains 415. In these implementations, the smart contract 411 acting as a configuration may be used to generate a different smart contract 411 used to generate or mint NFT IDs 402.

The SCE 410 may be or implement any suitable smart contract mechanism (see e.g., [Solidity], [OZContracts], [Flow], [Cadence], [Vyper], [Yul+], and/or the like) to generate and/or execute smart contracts 411. In some implementations, the SCE 410 includes or provides runtime environment(s) in which smart contracts 411 can be executed. During operation, the SCE 410 combines one or more inputs 401 (e.g., as specified by a suitable configuration and/or the like) and hashes the combined inputs 401. The hash will then become part of a smart contract 411 (e.g., as generated and/or operated by the SCE 411), which are then executed by the minting engine 420 to generate corresponding NFT IDs 402.

Smart contracts 411 are reusable snippets of code (e.g., computer programs, scripts, applications, set of trigger functions, transaction protocol, and/or the like) that are intended to automatically execute, control, or document relevant events and actions according to some predefined criteria or conditions. Smart contracts 411 can be executed by nodes in a blockchain network (e.g., any of the compute nodes discussed herein) to digitally facilitate, verify, and/or enforce the negotiation or performance of a contract, which may be made partially or fully self-executing and/or self-enforcing. In these ways, smart contracts 411 can implement contracts between parties, where the execution is guaranteed and auditable.

Typically, smart contracts 411 include one or more functions that take relevant, desired, predefined, and/or configured data/inputs 401 as arguments and assign it/them to appropriate variables. As examples, the data/inputs 401 can include unique IDs, content items, metadata, ID documents, identity data, and/or any other relevant data structures, variables, parameters, and/or the like. Smart contracts 411 can also include transfer logic for transferring corresponding assets, such as cryptocurrency and/or an NFT ID 402. This typically involves defining one or more functions that take a new owner's address as an argument and updates the contract's internal state to reflect the transfer. Additionally or alternatively, the smart contracts 411 can include logic for calculating and distributing royalties, which may include one or more functions defined to obtain a sale price as an argument and uses it to calculate the royalty payment. In some implementations, the smart contracts 411 specify unique identity-based digital asset ownership elements. Additionally or alternatively, the smart contracts 411 specify transaction(s) or transaction type(s) that can be used to mint (generate), purchase, or otherwise obtain/transfer a corresponding NFT ID 402. The specific syntax and/or code of a smart contract 411 may depend on the specific language being used and/or the platform on which the smart contract 411 is to be deployed.

Smart contracts 411 can be written in higher-level programming languages and compiled to smart contract-specific bytecode. The higher-level programming languages may be a smart contract-specific language such as, for example, Ethereum® Virtual Machine (EVM) bytecode, [Solidity], [Vyper] (Python derived), [Yul+], Bamboo, Lisp Like Language (LLL), C++ for EOS.IO, Simplicity provided by Blockstream™, Rholang, Michelson, Counterfactual, Plasma, Plutus, Sophia, EOS.IO, [Cadence], and/or the like, or may be any of the other programming languages discussed herein, and/or combination(s) thereof. Once a smart contract is written/developed and compiled, it can then be deployed to one or more blockchains via a suitable interface. Once deployed, one or more blockchain nodes in a blockchain network can execute or run the smart contract code.

Each smart contract 411 includes a set of rules that govern what happens whenever an interaction with an NFT ID 402 takes place. Each NFT ID 402 is associated with a smart contract 411 which includes functions of the NFT ID 402 that allow applications to interact with it. Every time a transaction is made on the NFT ID 402, the code of the smart contract 411 checks for certain conditions and executes relevant actions. This transaction is then stored as transaction content 417. For example, when an NFT ID 402 is requested by an entity that wishes to verify an individual's identity, the smart contract 411 will update and/or manage relevant permissions, and execute a transaction when permitted by the owner of the NFT ID 402. Some smart contracts 411 determine whether nodes, accounts, and/or platforms can access, or perform specific actions on or using a particular NFT ID 402, or on a particular blockchain 415 (see e.g., discussion of permissioning smart contracts in [EEA-CS7]). In some implementations, when an NFT ID 402 is used to verify an account holder's identity, the corresponding smart contract 411 can automatically allocate payments or asset transfers to the owner of the NFT ID 402 based on the rates set and/or other conditions in the smart contract 411 when the NFT ID 402 was created or updated.

In some implementations, a smart contract 411 comprises a collection of code (e.g., its functions) and data (e.g., its state) that resides at a specific address on a blockchain. In Ethereum implementations, a developer publishes smart contract code into Ethereum Virtual Machine (EVM) memory. EVM is a global virtual computer whose state every participant on the Ethereum network stores and agrees on. Ethereum participants can request the execution of arbitrary code on the EVM, and code execution changes the state of the EVM. Individuals (e.g., wallet devices 310 and/or 360) can request smart contract code be executed by making a transaction request. An example smart contract is shown by Table 1.

TABLE 1 example pseudocode for a smart contract

```
//SPDX-License-Identifier: MIT
pragma solidity ^0.7.0;
import "hardhat/console.sol";
import "@openzeppelin/contracts/token/ERC721/ERC721.sol";
import "@openzeppelin/contracts/utils/Counters.sol";
contract NFTMinter is ERC721 {
  using Counters for Counters.Counter;
  Counters.Counter private _tokenIds;
  constructor(string memory tokenName, string memory symbol)
ERC721(tokenName, symbol) {
    _setBaseURI("ipfs://");
  }
  function mintToken(address owner, string memory metadataURI)
  public
  returns (uint256)
  {
    tokenIds.increment( );
    uint256 id = _ tokenIds.current( );
    _safeMint(owner, id);
    _setTokenURI(id, metadataURI);
    return id;
  }
}
```

In Table 1, the pragma directive is used to enable certain compiler features or checks (see e.g., [Solidity], [OZContracts]). The contract is a function that is similar to classes in object-oriented languages, which contains persistent data in state variables and functions that can modify these variables. Here, the contract is NFTMinter, which is set to be an ERC721 object where the ERC721 object is an implementation of [EIP-721]. The ERC721 object comprises a set of interfaces, contracts, and utilities that are all related to [EIP-721. The constructor is a special function that is executed during the creation of the contract and cannot be called afterwards. In this case, the constructor sets the resource address or base URI (e.g., "ipfs://") based on the token name ("tokenName") and token symbol ("symbol"). In some implementations, the token name and token symbol are concatenated to generate the resource address or base URI. In some implementations, after the constructor has executed, the final code of the contract is stored on the blockchain 415.

The token name in Table 1 is a human-readable name of the token (or type of token) being generated. In some implementations, a generic token name may be used for the NFT IDs 402 (e.g., "NFT-ID" and/or the like). Additionally or alternatively, the token name may include a name of the particular sector for which the NFT is created (e.g., government sector 202, NGO sector 204, social media sector 206, and/or the like), a particular platform type for which the NFT ID 402 is created (e.g., social media platform, ecommerce platform, Web2, Web3, or other platform types), and/or a specific org for which the NFT ID 402 is created (e.g., a specific platform, enterprise, company, government agency or regulatory body, and/or the like).

The token symbol usually refers to the currency symbol (or currency sign) used to represent a currency (e.g., the symbol "$" representing U.S. dollars, the symbol "¥" representing Yen, the symbol "₿" representing Bitcoin, the symbol "Ξ" representing Ether, and/or the like). In some implementations, such as when an NFT ID 402 is a government NFT ID 402, the symbols used for NFT IDs 402 may be based on the jurisdiction for which the NFT ID 402 is created (e.g., a two or three character country codes or geocodes as defined by ISO 3166-1:2020 and/or ISO 3166-2:2020, currency codes such as those defined by ISO 4217:2015, ITU letter codes, international telephone country codes, mobile country codes (MCCs), and/or the like). Additionally or alternatively, when an NFT ID 402 is an NGO/commercial NFT IDs, the symbols used for NFT IDs 402 may be based on an abbreviation or acronym of the org/entity, a ticker or stock symbol of the org/entity, and/or some other symbol as defined by the entity or org. Additionally or alternatively, a generic symbol may be used or the symbol may be omitted.

In some implementations, the smart contracts 411 may be part of one or more decentralized apps (Ðapps), which are apps running on a decentralized peer-to-peer network, often a blockchain 415. A ÐApp may include a user interface running on another (centralized or decentralized) system and may include decentralized storage and/or a message protocol and platform. In these implementations, a ÐApp may be a web user interface and a smart contract 411.

Furthermore, the SCE 410 and minting engine 420 may implement a suitable NFT framework 403, such as the Ethereum® platform (e.g., as discussed in [EIP-20], [EIP-165], [EIP-173], [EIP-721], [EIP-777], [EIP-1155], [EIP-3525], [EIP-5528], [EIP-5679], [EIP-5727], [EthereumDoc], [EEA-CS7], and/or the like), Ethereum® Immutable X platform, Polygon (formerly known as Matic Network), the Flow blockchain (see e.g., [Flow] and/or [Flow-NFT), Bitcoin Cash, Cardano, and/or the like.

The metadata 413 may include any data about individual NFT IDs 402 such as, for example, NFT type and/or data identifying an asset/object to which the NFT represents (e.g., a particular type of ID that the NFT ID 402 represents), approval identities/entities, owners of an individual NFT IDs 402, an org associated with the NFT ID 402 (e.g., an issuer of the NFT ID 402), transferor ID (e.g., someone to which the NFT ID 402 is transferred, a description of the asset/object to which the NFT ID 402 represents (e.g., usage and/or permissions associated with the NFT ID 402), a URI pointing to a resource with an image (e.g., a MIME type image) representing the asset to which the NFT ID 402 represents, and/or other like metadata. In some implementations, the metadata 413 can reside on one or more blockchains 415, which may be stored in the NFT ID DB(s) 340. In other implementations, the metadata 413 is stored off-chain when a token URI includes the resource/location of the metadata 413, which may be stored either on a centralized server or in or at a file system location (e.g., an IPFS location/content address, which may be indicated by a content identifier (CID) and/or another label used to point to material in IPFS).

Figure 5:
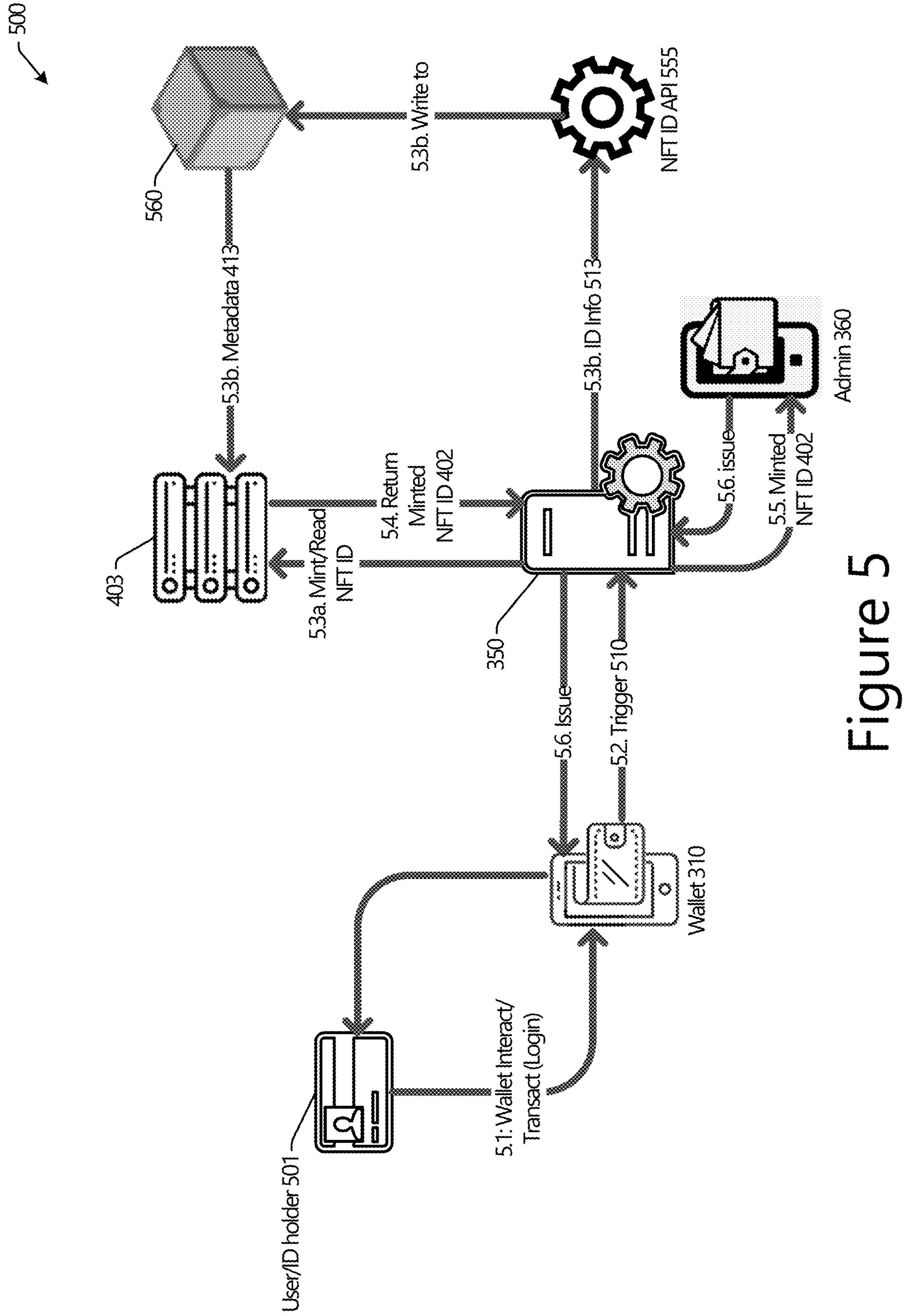
FIG. 5 depicts an example procedure for minting NFT IDs.

The file system microservice 414 may include APIs (e.g., API(s) 555 of FIG. 5) and/or functions to access data stored in a file system (e.g., file system 560 of FIG. 5). As an example, the file system 560 is implemented using [IPFS] and the file system microservice 414 is an IPFS microservice. In another example, the file system 560 is implemented using one or more private data storage devices and/or storage servers and the file system microservice 414 includes one or more file access and/or transfer mechanisms and/or protocols, such as any of those discussed herein.

Additionally or alternatively, the file system microservice 414 includes an update feature, where an ID history can be updated without touching the original data. In these implementations, the update procedure may include reading or otherwise accessing current metadata from the file system 560; updating the metadata 413 with new data entry/entries (e.g., new ID info 513); adding new metadata 413 to the file system 560; and updating content hash on one or more smart contracts 411.

The minted NFT IDs 402 may be stored in one or more blockchains 415. Some or all of the blockchains 415 may be private blockchains 415 and/or some or all of the blockchains 415 may be public blockchains 415. In some implementations, individual blockchains 415 are owned or are otherwise associated with a particular org or sector. For example, a blockchain 415 owned or otherwise corresponding to a State's Department of Motor Vehicles (DMV) may include blocks for respective driver's license NFTs 402. In other implementations, individual blockchains 415 are owned or are otherwise associated with an individual, where each block corresponds to minted NFT ID 402 for that person, and new blocks are added whenever the NFT ID4 402 is updated with new or alternative ID info 513.

The transaction content 417 (also referred to as "transaction data 417", "transaction parameters 417", and/or the like) includes content or data associated with transactions involving the minted NFT IDs 402. In general, a transaction 417 involves a request to execute operations on a blockchain 415 that changes the state of one or more accounts. More specifically, transaction content 417 may include data committed to a blockchain 415, which may be signed by an originating account and targeting a specific address. The transaction content 417 also contains metadata 413. Some transaction content 417 may include a contract creation transaction, which is a special transaction 417 with a zero address (e.g., an address of all zeros, "0") as the recipient, which is used to register a contract and record it on the blockchain 415.

The transaction content 417 include data and/or parameters that is/are passed to a smart contract 411 for minting an NFT ID 402. In these implementations, the transaction content 417 can include, for example, a token ID for an NFT ID 402, ownership info (e.g., info related to a user/wallet 310 that is a subject of the NFT ID 402), a pointer or other reference (e.g., URI, URL, PURL, URN, DOI, magnet link, IPFS content address, file path, and/or the like) to metadata 413 that is to be used for minting the NFT ID 402, and supply info (e.g., a number and/or type of NFT IDs 402 to be generated; usually 1 in most use cases). Additionally or alternatively, a transaction 417 can involve a transfer of ownership of an NFT ID 402 and/or a new/updated association of an NFT ID 402. For example, a first transaction 417 of an NFT ID 402 can include issuing the NFT ID 402 to a user (e.g., user 501 in FIG. 5), a second transaction 417 of the NFT ID 402 can include associating the NFT ID 402 with a social media profile of a first social media network, a third transaction 417 of the NFT ID 402 can include associating the NFT ID 402 with a social media profile of a second social media network, a fourth transaction 417 of the NFT ID 402 can include associating the NFT ID 402 with a financial institution, and so forth. Each of these transactions 417 can be recorded as or in one or more blocks (or as respective blocks) in one or more blockchains 415.

Nodes processing transactions 417 is the basis of adding blocks to a blockchain 415, and may be subject to the permissions defined in the corresponding smart contracts 411. When mining new blocks, a processing node checks the validity of a transaction 417 using the appropriate smart contract 411 with the state at the block's parent. If not permitted, the transaction is discarded. If permitted, the transaction is included as a new block and the block is dispatched to other nodes (e.g., for inclusion in local versions of the blockchain 415). When receiving a block, the receiving node checks each included transactions 417 using the appropriate smart contract 411 with the state at the block's parent. If any of the transactions 417 in the new block are not permitted, the block is considered invalid and discarded. If all transactions 417 are permitted, the block passes the permissioning validation check and is then subject to any other validity assessments the client 310, 360 might usually perform.

Transactions 417 can be on-chain transactions 418 or off-chain transactions 419. On-chain transactions 418 (simply referred to as "transactions 418" or "on-chain 418") are transactions that occur on a blockchain 415 that are reflected on the distributed ledger. On-chain transactions 418 are transactions that have been validated or authenticated and lead to an update to the overall blockchain network. An on-chain transaction 418 occurs and is considered valid when the blockchain 415 is modified. By contrast, an off-chain transaction 419 (simply referred to as "off-chain 419") takes the value outside of the blockchain 415 and/or transactions 417 that do not occur on the blockchain network, but instead, are transacted on another electronic system.

The minting engine 420 is a microservice or facility that generates NFT IDs 402. Similar to the way metal coins are minted and put into circulation, the NFT IDs 402 are also "minted" after they are created. The minting process turns the collection of inputs 401 into an NFT ID 402. During the minting process, the owner of the NFT ID 402 can schedule reviews or identity verification using the NFT ID 402. Once the NFT ID 402 is generated, the issuance microservice 416 issues or otherwise distributes the NFT ID 402 to the wallet 310 of the owner of the NFT ID 402.

Minting an NFT ID 402 involves the use of a smart contract 411 that is specifically designed to produce an NFT ID 402. Here, the smart contract code defines the rules for the NFT ID 402, and how the NFT ID 402 will be minted and transferred. Once the smart contract 411 is written or developed, the smart contract 411 is deployed to a blockchain 415. This can be done using, for example, any of the programming languages, development tools, command line interface(s), and/or other suitable interface provided by the blockchain/NFT service 250. Once the smart contract 411 is deployed, it can be used to mint one or more NFT IDs 402. This may involve calling specific function(s) in the smart contract 411 and passing data and/or parameters to the smart contract 411 for the NFT ID 402. The exact steps for minting the NFT ID 402 may depend on aspects of the blockchain/NFT service 250, the specific smart contract 411 (and/or functions therein), configuration data/parameters, and/or other conditions, parameters, and/or criteria. In some cases, minting an NFT ID 402 requires payment of transaction fees on a blockchain 415, which may be in the form of fiat currency and/or cryptocurrency.

In some implementations, the minted NFT ID 402 can include royalty payment mechanisms, which are also specified in the smart contract 411 that governs the NFT ID 402. Here, the corresponding smart contract 411 is written to include the necessary logic for calculating and distributing royalties, including events or conditions to trigger the payments. In some examples, the royalty payment mechanism is or specifies a percentage of a sale price that is automatically paid to the NFT ID 402 owner each time the NFT ID 402 is transferred among third party platforms (e.g., among different social media platforms, service provider platforms, and/or the like). Other conditions, parameters, or criteria can be defined in such smart contracts 411. When someone buys the minted NFT ID 402, the smart contract 411 will automatically calculate the royalty payment and transfer that payment amount to the wallet 310 of the NFT ID 402 owner. In some cases, receiving royalties from an NFT ID 402 involves paying transaction fees on the blockchain 415, which can be the same or similar as those discussed previously w.r.t to NFT minting and/or the like.

In some implementations, the minted NFT ID 402 can include identity authentication verification, and/or validation mechanisms, which are also specified in the corresponding smart contract 411 that governs the NFT ID 402. Here, the corresponding smart contract 411 is written to include the necessary logic for authenticating, verifying, and/or validating the NFT ID 402 owner's identity, such as for accessing a third party platforms (e.g., among different social media platforms, service provider platforms, and/or the like) and/or accessing specified resources. For example, the identity authentication mechanisms can indicate the manner in which (and the relevant data to be provided) to log into a website or third party platform. In another example, the identity authentication mechanisms can indicate permissions and/or resources (e.g., including virtual and physical resources) that the NFT ID 402 owner is permitted to access. In some examples, the identity authentication mechanisms specify data (e.g., timestamps, location data, and/or the like) that is automatically logged to a blockchain 415 each time the NFT ID 402 owner's identity is authenticated/verified/validated. Other conditions, parameters, or criteria can be defined in such smart contracts 411. When someone attempts to access a platform and/or other resources using the minted NFT ID 402, the smart contract 411 will automatically perform the specified authentication mechanisms, and log the transaction in the relevant blockchain(s) 415.

In some implementations, each NFT ID 402 is identified by a unique ID (UID) and/or token ID (tokenId) inside a smart contract 411. This UID does not change for the life of the smart contract 411. An attribute-value pair including the contract address and the tokenId is a globally unique and fully-qualified identifier for a specific asset on a blockchain 415. Additionally or alternatively, the tokenId is a specific identifier used to uniquely identify a particular instance of a token (e.g., a specific NFT ID 402). The UID may be any value or data structure that uniquely identifies an individual and/or their user devices 310, 360. In one example, the UID may be a randomly generated number or string, which may be generated using a suitable random number generator, pseudorandom number generators (PRNGS), and/or the like. Additionally or alternatively, the UID may be a version 4 Universally Unique Identifier (UUID) that is randomly generated according to Leach et al., "A Universally Unique IDentifier (UUID) URN Namespace", Internet Engineering Task Force (IETF), Network Working Group, Request for Comments (RFC): 4122 (July 2005) ("[RFC4122]"), which is hereby incorporated by reference in its entirety. In one example implementation, the random UID is generated for an individual device 310, 360 upon completing the registration process.

Additionally or alternatively, the UID may be a hash value calculated from one or more inputs (which may or may not be unique to the individual/user devices 310, 360). In one example implementation, the UID may be generated using supplied identity data/info (or a portion thereof) as an input to a suitable hash function (e.g., such as sha3 and/or any cryptographic mechanism discussed herein). For example, the UID may be a version 3 or 5 UUID that is generated according by hashing a namespace identifier and name using MD5 (UUID version 3) or SHA-1 (UUID version 5) as discussed in [RFC4122]. In another example, the UID may be generated using any suitable hash function and using any combination of PII and/or device or system info supplied by a user and/or extracted from the user devices 310, 360 during the NFT ID generation process.

Additionally or alternatively, the UID may be a digital certificate supplied by a suitable certificate authority, or may be generated using the digital certificate (e.g., hashing the digital certificate). In another embodiment, the UID may be a specific identifier or may be generated using the specific identifier (e.g., as discussed previously). The specific identifier may be any suitable identifier associated with a user and/or user devices 310, 360, associated with a network session, an application, an app session, an app instance, an app-generated identifier, and/or some other identifier (ID). The specific identifier may be a user ID or unique ID for a specific user on a specific client app (e.g., client app 655 of FIG. 6) and/or a specific user devices 310, 360. Additionally or alternatively, the user ID may be or include one or more of a uid (e.g., positive integer assigned to a user by a Unix-like OS), euid, fsuid, suid, ruid, a cookie ID, a realm name, domain ID, logon user name, network credentials, social media account name, user session ID, and/or any other like ID associated with a particular user devices 310, 360. Additionally or alternatively, the specific identifier may be a device identifier such as a device ID, product ID/code, serial number of the user devices 310, 360, a document of conformity (DOC), electronic product code (EPC), RFID tag, and/or the like. Additionally or alternatively, the specific identifier may be a network ID such as an international mobile subscriber identity (IMSI), internet protocol (IP) address, and/or some other suitable network address such as any of those discussed herein. Any of the aforementioned identifiers and/or info may be combined to produce the UID, and/or other info, such as any info discussed infra, may be used to produce the UID.

Additionally or alternatively, the UID may be based on a device fingerprint of the user devices 310, 360. The device fingerprint may be any info collected about the software and hardware of a computing device for the purpose of identification, which may or may not be incorporated into an identifier (e.g., the aforementioned UID and/or the like). In one example implementation, the device fingerprint may be based on system data, sensor data, and/or the like that is/are collected and combined using some known mechanism (e.g., a hash function and/or the like). In another example implementation, the device fingerprint may be the output of a physical unclonable function (PUF) implemented by a tamper-resistant chipset in the user devices 310, 360 (e.g., TEE 690 of FIG. 6 discussed infra). When a physical stimulus (e.g., electric impulse) is applied to the PUF, it may react in an unpredictable way due to the complex interaction of the stimulus with the physical microstructure of the PUF. This exact microstructure may depend on physical factors introduced during manufacture which may be unpredictable. The PUF outputs the device fingerprint that may serve as the UID. Any of the aforementioned embodiments/implementations may be combined and/or used to generate the NFT ID 402.

FIG. 5 depicts an example logical flow 500 for minting NFT IDs 402. Process 500 begins at step 5.1 where a user 501 logs in to their wallet 310. As mentioned previously, the wallet 310 could be an IOS app, Android app, a browser extension, a web app, a standalone hardware device, and/or the like.

At step 5.2, the smart contract 411 and/or minting process is triggered 510. The smart contract 411 is inside and a part of the NFT ID engine 350. The trigger 510 can cause the smart contract 411 inside of the NFT ID engine 350 to be executed, which kicks off the minting process. The admin 360 defines various requirements and functions of each NFT ID type, and creates it. The admin 360 can code, compile, deploy, and run the smart contract 411 within the NFT ID engine 350. The power, flexibility, and multiuse functionality may come from proprietary coding used for generating such smart contracts 411. Deployment scripts are also included at step 5.2. The smart contracts 411 can be written in any suitable smart contract language (see e.g., [Solidity], [OZContracts], [Flow], [Cadence], [Vyper], [Yul+], and/or the like) and/or any other programming language and/or development tool, including any of those discussed herein.

At step 5.3*a*, the NFT ID engine 350 (or the minting engine 420) mints a new NFT ID 402 or causes a new NFT ID 402 to be minted. In some examples, execution of the smart contract 411 causes the new NFT ID 402 to be minted. For example, the smart contract 411 defines various rules and logic for creating/minting the NFT ID 402 and managing the minted NFT ID 402 on the blockchain 415. In some implementations, the smart contract 411 is deployed on the blockchain 415, which makes the smart contract 411 available to be executed by individuals who want to mint NFT IDs 402 (e.g., users 310). In some examples, the trigger 510 can include transaction data/parameters 417 for minting the NFT ID 402. In other examples, the trigger 510 can cause the NFT ID engine 350 to generate the transaction data/parameters 417 for minting the NFT ID 402. In either example, the transaction data/parameters 417 can include, for example, a token ID for the to-be-minted NFT ID 402, ownership info for the to-be-minted NFT ID 402 (e.g., info related to the user/wallet 310), pointer or other reference to metadata 413 (e.g., URI, URL, PURL, URN, DOI, magnet link, IPFS content address, file path, and/or the like to storage location of the metadata location 413), and supply info (e.g., number and type of NFT IDs 402 to be generated; usually 1 in most use cases). When the smart contract 411 receives the transaction data/parameters 417, the smart contract 411 checks that the required conditions are met (e.g., various conditions specified by the admin-provided configuration and/or within the smart contract 411 itself) and then triggers the minting/creation of the NFT ID 402.

The NFT ID engine 350 triggers the minting/creation of the NFT ID 402 by interacting with the NET framework 403 to mint the new NFT ID 402. For example, the smart contract 411 can request or instruct the NFT framework 403 to begin the minting process by sending transaction data/parameters 417 to the NET framework 403 via suitable APIs. The NFT ID 402 can be minted or otherwise generated using any suitable technology or platform, and/or using any suitable minting techniques, such as those discussed in [EIP-20], [EIP-721], [EIP-998], [EIP-1155], [EIP-1559], [EIP-3525], [EIP-5375], [EIP-5528], [EIP-5679], [EIP-5727], [EthereumDoc], and/or other standards provided by Ethereum® (e.g., such as any of those discussed herein), Ethereum® Immutable X platform, Polygon, The Flow blockchain (see e.g., [Flow]), Bitcoin Cash, Cardano, and/or the like.

To create a new NFT ID 402, at step 5.3*b*, the NFT ID engine 350 provides ID info 513 to a file system 560 via one or more APIs 555. In some examples, the admin 360 encrypts the ID info 513 and uploads the encrypted ID info 513 to the NFT ID engine 350. In another example, user 310 and/or admin 360 uploads the ID info 513 to the NFT ID engine 350, and the NFT ID engine 350 encrypts or anonymizes the ID info 513. In either of these examples, the NFT ID engine 350 provides the encrypted/anonymized ID info 513 to the file system 560 via the API(s) 555 when the trigger 510 is executed or otherwise detected at step 5.2.

In some implementations, the APIs 555 (or the functions/methods of the APIs 555) are part of the file system microservice 414 discussed previously. As an example, the distributed file system 560 is implemented using IPFS (see e.g., [IPFS]) and the API(s) 555 is/are implemented using one or more IPFS APIs. In another example, the file system 560 is implemented using one or more private data storage devices and/or storage servers and the API(s) 555 is/are implemented using any suitable file transfer mechanisms and/or protocols, such as any of those discussed herein. Additionally or alternatively, the file system 560 is implemented by the DB server(s) 330. Step 5.3*b* also includes storing the ID info 513 as metadata 413, which is then provided to the NFT ID framework 403 based on the request to mint the NFT ID 402 (step 5.3*a*). In some examples, the NFT ID engine 350 translates or converts the ID info 513 into the metadata 413 prior to storing the metadata 413 in the file system 560, the API 555 calls cause the ID info 513 to be translated/converted into the metadata 413, or the file system 560 translates/converts the ID info 513 into the metadata 413. Any suitable translation and/or conversion technique or algorithm can be used to translate/convert the ID info 513 into the metadata 413.

The ID info 513 includes identity data, PII, and/or other info associated with the user 310, and can include other info associated with the org for which the NFT ID is to be created. Examples of ID info 513 that is submitted to, or collected by, the NFT ID engine 350 include driver's license, phone number, email address(es); social media handle(s); YouTube channel name or ID; work/school ID; residential, academic, and/or financial history and/or related documentations (e.g., these can be periodically updated if needed or desired); KYC and/or KBA data; biometric data; electronic health records; any other info the users 310, 360 require; and/or any other info or data such as any of those discussed herein.

In some examples, the ID info 513 is provided to the NFT ID engine 350 by the user 310 and/or the admin 360 (e.g., at step 5.1 and/or step 5.2). Additionally or alternatively, the NFT ID engine 350 gathers some or all of the ID info 513 from one or more external sources (e.g., governmental databases, private or enterprise databases, social media networks, and/or the like). Additionally or alternatively, the NFT ID engine 350 encrypts the ID info 513 prior to, or concurrently with providing the ID info 513 to the distributed file system 560. In any of these implementations, the ID info 513 is stored by the distributed file system 560 as metadata 413. The metadata 413 is also provided to (or accessed by) the NET framework 403 for the minting process. In some implementations, the ID info 513 and/or metadata 413 is not stored on the blockchain 415. In these implementations, the metadata 413 is used to generate a data structure representing an identity of the user 310 (referred to as an "identity data structure"), and this data structure is then stored as a block in the block chain 415. In some examples, the identity data structure is a graphical representation (e.g., a graphical or other digitized ID document). Additionally or alternatively, the identity data structure is an information object (InOb) including various data fields and data elements in a suitable data/file format, such as any of those discussed herein. Step 5.3*a* may be performed before, after, or concurrently with step 5.3*b*. Additionally or alternatively, a pointer or other reference that points to or otherwise refers to the metadata 413 in storage 560 is stored on the blockchain 415.

In response to the mint/read NFT ID command at step 5.3*a*, the NFT ID framework 403 mints an NFT ID 402 using the metadata 413 as discussed previously. At step 5.4, the minted NFT ID 402 is provided by the NFT ID framework 403 to the NFT ID engine 350. In some implementations, at step 5.4, a pointer or other reference (e.g., URI, URL, PURL, URN, DOI, magnet link, IPFS content address, file path, and/or the like) that points to the data (also called metadata 413) is returned to the NFT ID engine 350. In some implementations, the minting process stores the pointer or other reference to the metadata 413 inside the NFT ID 402. Additionally or alternatively, the minted NFT ID 402 is recorded as a transaction 417 (e.g., as a block) on the blockchain 415, and ownership of the minted NFT ID 402 is transferred to the owner specified in the transaction data 417 at step 5.5.

At step 5.5, the minted NFT ID 402 is added to the admin wallet 360. The newly minted NFT ID 402 initially belongs to whoever did (or requested) the actual minting, which in this example is the admin 360 (e.g., by sending the minting request/trigger at step 5.3*a*). The NFT ID 402 is then transferred to the individual's wallet 310 during an issuance process at step 5.6. The admin 360 issues the new NFT ID 402 by transferring the newly minted NFT ID 402 to the wallet 310 of the new ID holder 501 via the NFT ID engine 350 or using some API, web service (WS), protocol, and/or other transfer mechanism, such as any of those discussed herein. The transfer of the minted NFT ID 402 from the admin wallet 360 to the wallet 310 of the new ID holder 501 may be recorded as a transaction 417 and/or is added as a block to the relevant blockchain(s) 415.

In some implementations, an update feature can also be included, where an ID history (e.g., historical and/or already stored ID info 513) can be updated with or without touching the original data (e.g., the already stored ID info 513). In these implementations, the current metadata 413 is read from the file system 560, and one or more data elements/DBOs of the metadata 413 is/are updated with one or more new entries. New metadata 413 is added or stored in the file system 560, and a content hash on a corresponding smart contract 411 is updated.

In various implementations, an individual 501 can have multiple NFT IDs 402, for example, a first NFT ID 402 for a driver's license, a second NFT ID 402 for a work ID, a third NFT ID 402 for a social media platform (e.g., Twitter® and/or the like), a fourth NFT ID 402 for a content sharing platform (e.g., YouTube® and/or the like), and so forth. Additionally, each of the multiple NFT IDs 402 can be minted using the same or different smart contracts 411.

In one example, a user 501 can operate the wallet 310 to scan one or more identity documents and/or input various identity data (e.g., one or more biometrics, such as facial image data, fingerprint, voiceprint, and/or the like), which is then provided to the NFT engine 350 (step 5.1). The user 501 can also provide info regarding the type of NFT ID 402 to be generated and/or the org(s) (e.g., third party platform, governmental agency/body, NGO, and/or the like) that the NFT ID 402 should be associated with (step 5.1). If a smart contract 411 for generating the NFT ID 402 already exists (e.g., the relevant org has already defined or developed a suitable smart contract 411), the wallet 310 triggers execution of the smart contract 411 (step 5.2), which causes the NFT engine 350 to provide the supplied info to the file system (step 5.3*b*) and request the NFT framework 403 to mint an NFT ID 402 (step 5.3*a*). If a smart contract 411 for generating the NFT ID 402 does not exist (e.g., the relevant org has not defined or developed a suitable smart contract 411), the wallet 310 triggers the NFT engine 350 to generate a suitable smart contract 411 (step 5.2, step 5.3*a*), which is then executed to mint the NFT ID 402 (step 5.3*a*, step 5.3*b*, step 5.4). The NFT framework 403 mints the NFT ID 402 by, for example, conceptualizing the NFT ID 402, creating the digital asset, tokenizing the asset, and then minting the NFT. Conceptualizing the NFT ID 402 can involve the NFT framework 403 determining the identity that the NFT ID 402 will represent according to a predefined configuration. Creating the digital asset can involve the NET framework 403 creating a digital representation of the identity (also referred to as a "digital ID"). The digital ID can be or include an image, video, audio data, text, and/or any other content/data. The digital ID can be provided by the user 501 and/or created by the NFT framework 403. The NET framework 403 can use various image and/or audio generation mechanisms to generate the digital ID. Tokenizing the asset can involve the NFT framework 403 linking the digital ID to a unique ID (e.g., a hash of the digital ID, a random number, and/or the like), which is to be stored on a blockchain 415. This allows the NFT ID 402 to be verified and tracked as a unique and original digital asset. Then, the NFT ID 402 is minted or created by assigning it a specific number of tokens and adding it to the blockchain. The NFT can then be bought, sold, and traded just like any other cryptocurrency.

2. Example Hardware and Software Systems and Configurations

In FIGS. 1-6, the client devices 310, 360, 650 (also referred to as a "client system," "user system," "user device," and/or the like) include physical hardware devices and software components capable of accessing content and/or services provided by the NFT ID service 200. In order to access the content/services, the client devices 310, 360, 650 include components such as processors, memory devices, communication interfaces, and/or the like. Additionally, the client devices 310, 360, 650 may include, or be communicatively coupled with, one or more sensors (e.g., image capture device(s), microphones, and/or the like), which is/are used to capture biometric data. As discussed in more detail infra, the captured biometric data is then provided to the NFT ID service 200 for NFT ID purposes. The client devices 310, 360, 650 communicate with the NFT/blockchain service 250 to obtain content/services using, for example, Hypertext Transfer Protocol (HTTP) over Transmission Control Protocol (TCP)/Internet Protocol (IP), or one or more other common Internet protocols such as File Transfer Protocol (FTP); Session Initiation Protocol (SIP) with Session Description Protocol (SDP), Real-time Transport Protocol (RTP), Secure RTP (SRTP), and/or Real-time Streaming Protocol (RTSP); Real-Time Communication (RTC) and/or WebRTC; Secure Shell (SSH); Extensible Messaging and Presence Protocol (XMPP); WebSocket; and/or some other communication technology such as those discussed herein. In this regard, the client devices 310, 360, 650 may establish a communication session with the NFT/blockchain service 250. As used herein, a "session" refers to a persistent interaction between a subscriber (e.g., client device 310) and an endpoint that may be either a relying party (RP) such as a web server, app server, or a Credential Service Provider (CSP) such as NFT/blockchain service 250. A session begins with an authentication event and ends with a session termination event. A session is bound by use of a session secret (e.g., a password, digital certificate, and/or the like) that the subscriber's software (a browser, app, or OS) can present to the RP or CSP in lieu of the subscriber's authentication credentials. A "session secret" refers to a secret used in authentication that is known to a subscriber and a verifier. The client devices 310, 360, 650 can be implemented as any suitable computing system or other data processing apparatus usable by users to access content/services provided by the NFT/blockchain service 250. In the example of FIGS. 3-5, the client devices 310, 360, 650 are depicted as digital wallets or mobile cellular phones (e.g., a "smartphones"); however, the client systems can be any other suitable computer system such as laptops, tablets, desktop computers, workstations, portable media players, wearable computing devices (e.g., smart watches and/or the like), or some other computing systems/devices.

In some examples, the NFT/blockchain service 250 may represent a cloud computing service, an intranet, enterprise network, or some other like private network that is unavailable to the public. In one example implementation, the entirety of NFT/blockchain service 250 including both the front end and the back end may be implemented in or by a cloud computing service (e.g., a "full stack" cloud implementation). The cloud computing service (or "cloud") includes networks of physical and/or virtual computer systems (e.g., one or more servers), data storage systems/devices, and/or the like within or associated with a data center or data warehouse that provide access to a pool of computing resources. The one or more servers in a cloud include user computer systems, where each of the servers includes one or more processors, one or more memory devices, input/output (I/O) interfaces, communications interfaces, and/or other like components. The servers may be connected with one another via a Local Area Network (LAN), fast LAN, message passing interface (MPI) implementations, and/or any other suitable networking technology. Various combinations of the servers may implement different cloud elements or nodes, such as cloud manager(s), cluster manager(s), master node(s), one or more secondary (slave) nodes, and/or the like. The one or more servers may implement additional or alternative nodes/elements in other implementations. In some cloud implementations, at least some of the servers in the cloud (e.g., servers that act as secondary nodes) may implement app server and/or web server functionality, which includes, inter alia, obtaining various messages from the client devices 310, 360, 650; processing data contained in those messages; routing data to other nodes in the cloud for further processing, storage, retrieval, and/or the like; generating and communicating messages including data items, content items, program code, renderable webpages and/or documents (e.g., including the various GUIs discussed herein), and/or other info to/from client devices 310, 360, 650; and/or other like app server functions. In this way, various combinations of the servers may implement different cloud elements/nodes configured to perform the implementations discussed herein.

The NFT/blockchain service 250 includes one or more servers 320, 330, and/or 350 and a DB (e.g., NFT ID DB 340 and/or the like). The web server(s) (e.g., servers 320) serve static content from a file system of the web server(s). The servers 320, 330, and/or 350 may be virtual or physical systems that provide NFT ID services to individual users (e.g., using a client system(s) 310, 360) and/or for customer platforms. In some implementations, some or all of the NFT ID services may be provided by or accessed from third party systems/services, and the info provided by the third party systems/services may be enhanced or amended using info collected by the NFT/blockchain service 250. The virtual and/or physical systems may include app servers, web servers, and/or other like computing systems/devices. The particular NFT ID services provided by the servers 320, 330, and/or 350 (or remote system 690) may depend on the architecture or implementation of the NFT/blockchain service 250, and may vary from embodiment to embodiment. In one example, one or more of the servers 320, 330, and/or 350 (or remote system 690) may operate as an app server and may provide respective NFT ID services (e.g., registration, NFT ID minting, report generation, and so forth) as separate processes, or by implementing autonomous software agents. In another example, individual NFT ID server(s) 320, 330, and/or 350 (or remote system 690) may be dedicated to perform separate NFT ID services, where app servers 320 are used to obtain requests from client devices 310, 360, 650 and provide info/data to the NFT ID server(s) 330 and/or 350 to perform their respective NFT ID related services.

The app servers 320 comprise one or more physical and/or virtualized systems for providing content and/or functionality (e.g., services) to one or more clients (e.g., client system 310, 360, 650) over a network. The physical and/or virtualized systems include one or more logically or physically connected servers and/or data storage devices distributed locally or across one or more geographic locations. Generally, the web/app servers 320 are configured to use IP/network resources to provide web pages, forms, apps, data, services, and/or media content to the client system. Additionally or alternatively, the web/app servers 320 may generate and serve dynamic content (e.g., server-side programming, database connections, dynamic generation of web documents) using an appropriate plug-in (e.g., a ASP.NET plug-in). The app server(s) 320 implement an app platform, which is a framework that provides for the development and execution of server-side apps as part of an app hosting service. The app platform enables the creation, management, and execution of one or more server-side apps developed by the NFT/blockchain service 250 and/or third-party app developers, which allow users and/or third-party app developers to access the NFT/blockchain service 250 via respective client systems 310, 360, 650. The client systems 310, 360, 650 may operate respective client apps (e.g., client app 655 in FIG. 6) to access the dynamic content, for example, by sending appropriate HTTP messages and/or the like, and in response, the server-side app(s) may dynamically generate and provide source code documents to the client app, and the source code documents are used for generating and rendering graphical objects (or simply "objects") within the client app. The server-side apps may be developed with any suitable server-side programming languages or technologies, such as PHP; Java™ based technologies such as Java Servlets, JavaServer Pages (JSP), JavaServer Faces (JSF), and/or the like; ASP.NET; Ruby or Ruby on Rails; and/or any other like technology that renders HyperText Markup Language (HTML), such as those discussed herein. The apps may be built using a platform-specific and/or proprietary development tool, and/or programming languages.

The servers 320, 330, and/or 350 serve one or more instructions or source code documents to client systems, which may then be executed within a client app (e.g., a wallet app as discussed previously, which may be the same or similar as client app 655) to render one or more objects (e.g., graphical user interfaces (GUIs)). The GUIs comprise graphical control elements (GCEs) that allow the client systems to perform various functions and/or to request or instruct the NFT/blockchain service 250 to perform various functions. The servers 320, 330, and/or 350 (or remote system 690) may provide various interfaces such as those discussed herein. The interfaces may be developed using website development tools and/or programming languages (e.g., HTML, Cascading Stylesheets (CSS), JavaScript, Jscript, Bash, Python, PowerShell, Ruby, and/or the like) and/or using platform-specific development tools (e.g., Android® Studio™ integrated development environment (IDE), Microsoft® Visual Studio® IDE, Apple® iOS® software development kit (SDK), Nvidia® Compute Unified Device Architecture (CUDA)® Toolkit, and/or the like). The term "platform-specific" may refer to the platform implemented by the client systems and/or the platform implemented by the servers 320, 330, and/or 350. Example interfaces are shown and described with regard to FIGS. 1-6. In an example implementation, the servers 320, 330, and/or 350 (or remote system 690) may implement Apache HTTP Server ("httpd") web servers or NGINX™ webservers on top of the Linux® OS. In this example implementation, PHP and/or Python may be employed as server-side languages, MySQL may be used as the DQL/DBMS. In an example implementation, the mobile apps may be developed for Android®, iOS®, and/or some other mobile platform.

Furthermore, one or more servers 320, 330, 350, 690 may hash, digitally sign, and/or encrypt/decrypt data using, for example, a cryptographic hash algorithm, such as a function in the Secure Hash Algorithm (SHA) 2 set of cryptographic hash algorithms (e.g., SHA-226, SHA-256, SHA-512, and/or the like), SHA 3, and so forth, or any type of keyed or unkeyed cryptographic hash function and/or any other function discussed herein; an elliptic curve cryptographic (ECC) algorithm, Elliptic Curve cryptography Digital Signature Algorithm (ECDSA), Rivest-Shamir-Adleman (RSA) cryptography, Merkle signature scheme, advanced encryption system (AES) algorithm, a triple data encryption algorithm (3DES), and/or the like.

The NFT ID DB 340 may be stored in one or more data storage devices or storage systems that act as a repository for persistently storing and managing collections of data according to one or more predefined DB structures. The data storage devices/systems may include one or more primary storage devices, secondary storage devices, tertiary storage devices, non-linear storage devices, and/or other like data storage devices. In some implementations, at least some of the servers 320, 330, 350, 690 may implement a suitable database management system (DBMS) to execute storage and retrieval of info against various database object(s) in the NFT ID DB 340. These servers 320, 330, 350, 690 may be storage servers, file servers, or other like computing systems. The DBMS may include a relational database management system (RDBMS), an object database management system (ODBMS), a non-relational DBMS (e.g., a NoSQL DB system), and/or some other DBMS used to create and maintain the NFT ID DB 340. The NFT ID DB 340 can be implemented as part of a single database, a distributed database, a collection of distributed databases, a database with redundant online or offline backups or other redundancies, and/or the like, and can include a distributed database or storage network. These servers 320, 330, 350, 690 may implement one or more query engines that utilize one or more data query languages (DQLs) to store and retrieve info in/from the NFT ID DB 340, such as Structured Query Language (SQL), Structured Object Query Language (SOQL), Procedural Language/SOQL (PL/SOQL), GraphQL, Hyper Text SQL (HTSQL), Query By Example (QBE), object query language (OQL), object constraint language (OCL), non-first normal form query language (N1QL), XQuery, and/or any other DQL or combinations thereof. The query engine(s) may include any suitable query engine technology or combinations thereof including, for example, direct (e.g., SQL) execution engines (e.g., Presto SQL query engine, MySQL engine, SOQL execution engine, Apache® Phoenix® engine, and/or the like), a key-value datastore or NoSQL DB engines (e.g., DynamoDB® provided by Amazon.com®, MongoDB query framework provided by MongoDB Inc.®, Apache® Cassandra, Redis™ provided by Redis Labs®, and/or the like), MapReduce query engines (e.g., Apache® Hive™, Apache® Impala™ Apache® HAWQ™, IBMR Db2 Big SQL®, and/or the like for Apache® Hadoop® DB systems, and/or the like), relational DB (or "NewSQL") engines (e.g., InnoDB™ or MySQL Cluster™ developed by Oracle®, MyRocks™ developed by Facebook.com®, FaunaDB provided by Fauna Inc.), PostgreSQL DB engines (e.g., MicroKernel DB Engine and Relational DB Engine provided by Pervasive Software®), graph processing engines (e.g., GraphX of an Apache® Spark® engine, an Apache® Tez engine, Neo4J provided by Neo4j, Inc.™ and/or the like), pull (iteration pattern) query engines, push (visitor pattern) query engines, transactional DB engines, extensible query execution engines, package query language (PaQL) execution engines, LegoBase query execution engines, and/or some other query engine used to query some other type of DB system (such as any processing engine or execution technology discussed herein). In some implementations, the query engine(s) may include or implement an in-memory caching system and/or an in-memory caching engine (e.g., memcached, Redis, and/or the like) to store frequently accessed data items in a main memory of the servers 320, 330, 350, 690 for later retrieval without additional access to the persistent data store. Suitable implementations for the database systems and storage devices are known or commercially available, and are readily implemented by persons having ordinary skill in the art.

The NFT ID DB 340 stores a plurality of database objects (DBOs). The DBOs may be arranged in a set of logical tables containing data fitted into predefined or customizable categories, and/or the DBOs may be arranged in a set of blockchains or ledgers wherein each block (or DBO) in the blockchain is linked to a previous block. Each of the DBOs may include data associated with individual users, such as identity data and/or ID info (e.g., ID info 513 of FIG. 5), and/or other personal info of users 310, 360, 650, UIDs, and/or, in certain embodiments, other data such as biographic data; biometric data; data collected from various external sources; session IDs; and/or other like data, including any of the data or data types discussed herein. Some of the DBOs may store info pertaining to relationships between any of the data items discussed herein. Some of the DBOs may store permission or access-related info for each user. These DBOs may indicate specific third parties that are permitted to access identity data of a particular user. In some implementations, the permission or access-related DBOs for each user may be arranged or stored as a blockchain to control which third parties can access that user's identity data and/or NFT ID. In these embodiments, the blockchain(s) do not actually store user biometric and/or biographic data, but instead are used to authorize specific third party platforms to access specific identity data items and/or NFT IDs and to grant accesses to their platforms, to validate or verify a user's identity, and/or for other purposes.

As alluded to previously, the client system(s) 310, 360, 650 is/are configured to run, execute, or otherwise operate a client app 655. The client app 655 is a software app designed to generate and render objects, which include various types of content. At least some of the objects include graphical user interfaces (GUIs) and/or graphical control elements (GCEs) that enable interactions with the NFT/blockchain service 250. In some embodiments, the client app 655 is an app container/skeleton in which an NFT ID app operates (e.g., a wallet app, payment app, web browser, and/or the like). For example, the objects may represent a web app that runs inside the client app 655, and the client app 655 may be an HTTP client, such as a "web browser" (or simply a "browser") for sending and receiving HTTP messages to and from a web/app servers 320 of the NFT/blockchain service 250. In some examples, a NFT ID browser extension or plug-in may be configured to allow the client app 655 to render objects that allow the user to interact with the NFT/blockchain service 250 for generating NFT IDs 402 according to the embodiments discussed herein. Example browsers include WebKit-based browsers, Microsoft's Internet Explorer browser, Microsoft's Edge browser, Apple's Safari, Google's Chrome, Opera's browser, Mozilla's Firefox browser, and/or the like. In some embodiments, the client app 655 is an app specifically developed or tailored to interact with the NFT/blockchain service 250. For example, the client app 655 may be a desktop or native (mobile) app that runs directly on the client system(s) 310, 360, 650 without a browser, and which communicates (sends and receives) suitable messages with the NFT/blockchain service 250. In some embodiments, the client app 655 is an app specifically developed or tailored to interact with the NFT/blockchain service 250 for generating NFT IDs 402.

The client app 655 may be developed using any suitable programming languages and/or development tools, such as those discussed herein or others known in the art. The client app 655 may be platform-specific, such as when the client system(s) 310, 360, 650 is/are implemented as a mobile device, such as a smartphone, tablet computer, and/or the like. In these embodiments, the client app 655 may be a mobile web browser, a native app (or "mobile app") specifically tailored to operate on the mobile client system(s) 310, 360, 650, or a hybrid app wherein objects (or a web app) is embedded inside the native app. In some implementations, the client app 655 and/or the web apps that run inside the client app 655 is/are specifically designed to interact with server-side apps implemented by the app platform of the provider system (discussed infra). In some implementations, the client app 655, and/or the web apps that run inside the client app 655 may be platform-specific or developed to operate on a particular type of client system(s) 310, 360, 650 or a particular (hardware and/or software) client system(s) configuration. The term "platform-specific" may refer to the platform implemented by the client system(s) 310, 360, 650, the platform implemented by the NFT/blockchain service 250, and/or a platform of a third-party system/platform.

In the aforementioned embodiments, the client system(s) 310, 360, 650 implementing a client app 655 is capable of controlling its communications/network interface(s) to send and receive HTTP messages to/from the NFT/blockchain service 250, render the objects in the client app 655, request connections with other devices, and/or perform (or request performance) of other like functions. The header of these HTTP messages includes various operating parameters and the body of the HTTP messages include program code or source code documents (e.g., HTML, XML, JSON, and/or some other like object(s)/document(s)) to be executed and rendered in the client app 655. The client app 655 executes the program code or source code documents and renders the objects (or web apps) inside the client app 655.

The rendered objects (or executed web app) allows the user of the client system(s) 310, 360, 650 to view content provided by the NFT/blockchain service 250, which may include the results of a requested service, visual representations of data, hyperlinks or links to other resources, and/or the like. The rendered objects also include interfaces for interacting with the NFT/blockchain service 250, for example, to request additional content or services from the NFT/blockchain service 250. In an example, the rendered objects may include GUIs, which are used to manage the interactions between the user of the client system(s) 310, 360, 650 and the NFT/blockchain service 250. The GUIs comprise one or more GCEs (or widgets) such as buttons, sliders, text boxes, tabs, dashboards, and/or the like. The user of the client system(s) 310, 360, 650 may select or otherwise interact with one or more of the GCEs (e.g., by pointing and clicking using a mouse, or performing a gesture for touchscreen-based systems) to request content or services from the NFT service 250.

In some cases, the user of client system(s) 310, 360, 650 may be required to authenticate their identity in order to obtain content and/or services from the NFT/blockchain service 250, and the NFT/blockchain service 250 serves the user of client system(s) 310, 360, 650 so that the user can access the content/services from the NFT/blockchain service 250. To provide the NFT ID services to the user, the client app 655 may be, or may include, a secure portal to the NFT/blockchain service 250 (e.g., the previously discussed NFT ID front-end portal and/or the like). The secure portal may be a stand-alone app, embedded within a web or mobile app provided by NFT/blockchain service 250, and/or invoked or called by the web/mobile app provided by NFT/blockchain service 250 (e.g., using an API, Remote Procedure Call (RPC), and/or the like). In these cases, graphical objects rendered and displayed within the client app 655 may be a GUI and/or GCEs of the secure portal, which allows the user to share data (e.g., ID documents, contact info, biographic data, biometric data, and/or the like) with the NFT/blockchain service 250. In any of the aforementioned embodiments and example use cases, the secure portal allows user devices 310, 360, 650, to enroll with the NFT/blockchain service 250 for NFT ID purposes. The secure portal also allows enrolled users to access and/or perform various NFT ID creation tasks. For example, the secure portal may provide access to a dashboard GUI that allows admins 360 to submit smart contracts 411, configurations to generate such smart contracts 411, (encrypted) ID info 513, update and improve the quality of collected information, and set notifications for automatically receiving updates related to various individuals.

Additionally or alternatively, the client app 655 may collect various data from the client system(s) 310, 360, 650 without direct user interaction with the client app 655. For example, the client app 655 may cause the client system(s) 310, 360, 650 to generate and transmit one or more HTTP messages with a header portion including, inter alia, an IP address of the client system(s) 310, 360, 650 in an X-Forwarded-For (XFF) field, a time and date that the message was sent in a Date field, and/or a user agent string contained in a User Agent field. The user agent string may indicate an operating system (OS) type/version being operated by the client system(s) 310, 360, 650, system information of the client system(s) 310, 360, 650, an app version/type or browser version/type of the client app 655, a rendering engine version/type implemented by the client app 655, a device and/or platform type of the client system(s) 310, 360, 650, and/or other like information. These HTTP messages may be sent in response to user interactions with the client app 655 (e.g., when a user submits biographic or biometric data as discussed infra), or the client app 655 may include one or more scripts, which when executed by the client system(s) 310, 360, 650, cause the client system(s) 310, 360, 650 to generate and send the HTTP messages upon loading or rendering the client app 655. Other message types may be used and/or the user and/or client system(s) 310, 360, 650 information may be obtained by other means in other embodiments.

In addition to (or alternative to) obtaining information from HTTP messages as discussed previously, the servers 320, 330, and/or 350 may determine or derive other types of user information associated with the client system(s) 310, 360, 650. For example, the servers 320, 330, and/or 350 may derive a time zone and/or geolocation in which the client system(s) 310, 360, 650 is/are located from an obtained IP address. In some embodiments, the user and/or client system(s) 310, 360, 650 information may be sent to the servers 320, 330, and/or 350 when the client system(s) 310, 360, 650 loads or renders the client app 655. For example, the login page may include JavaScript or other like code that obtains and sends back information (e.g., in an additional HTTP message) that is not typically included in an HTTP header, such as time zone information, global navigation satellite system (GNSS) and/or Global Positioning System (GPS) coordinates, screen or display resolution of the client system(s) 310, 360, 650, and/or other like information. Other methods may be used to obtain or derive such information in other embodiments.

Figure 6:
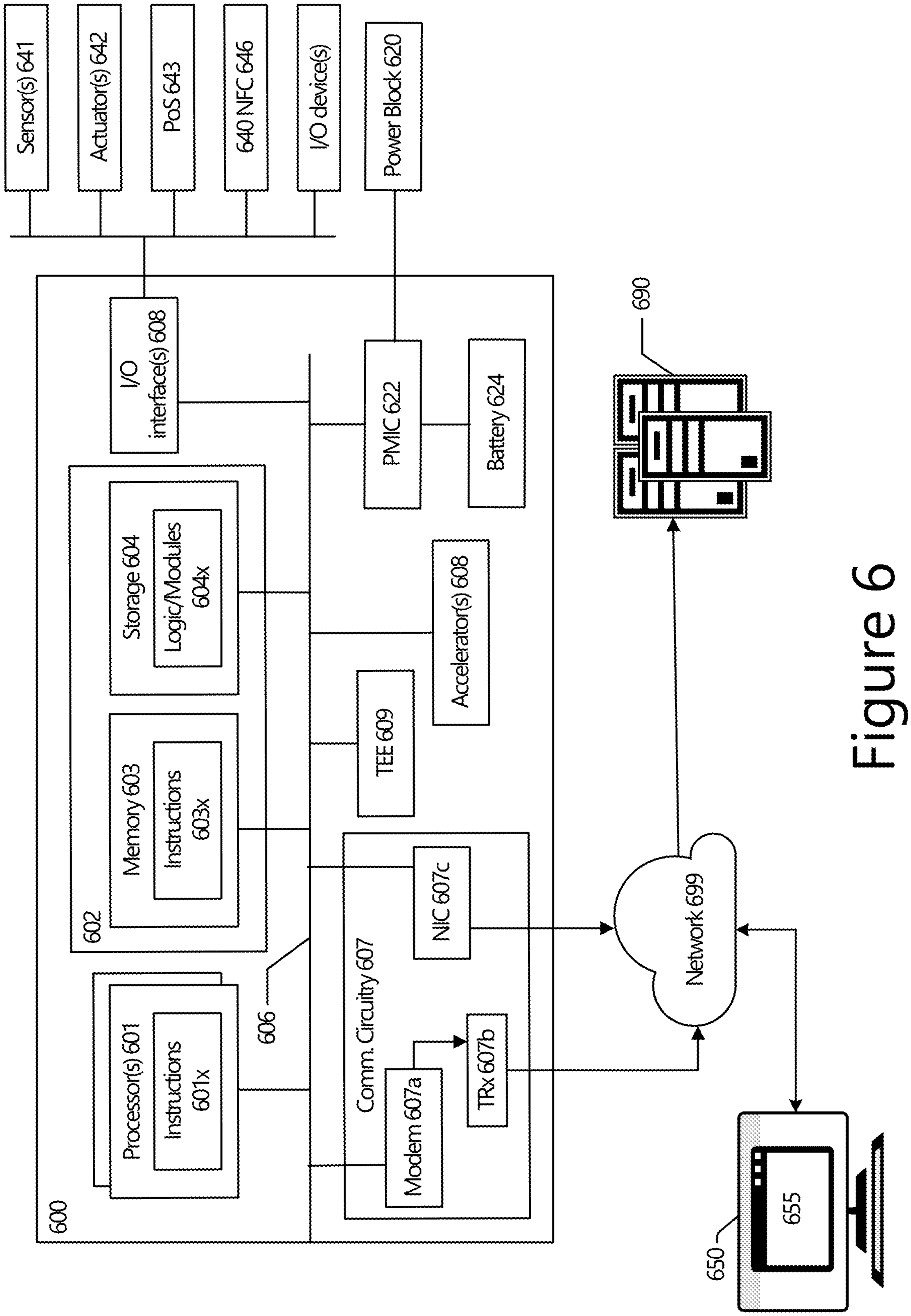
FIG. 6 illustrates an example computing system suitable for practicing various aspects of the present disclosure.

FIG. 6 illustrates an example compute node 600 (also referred to as "platform 600," "device 600," "appliance 600," "system 600", and/or the like), and various components therein, for implementing the techniques (e.g., operations, processes, methods, and methodologies) described herein. In FIG. 6, like numbered items are the same as discussed previously w.r.t FIGS. 1-5. The compute node 600 provides a closer view of the respective components of node 600 when implemented as or as part of a computing device or system. The compute node 600 can include any combination of the hardware or logical components referenced herein, and may include or couple with any device usable with a communication network or a combination of such networks. In particular, any combination of the components depicted by FIG. 6 can be implemented as individual ICs, discrete electronic devices, or other modules, instruction sets, programmable logic or algorithms, hardware, hardware accelerators, software, firmware, or a combination thereof adapted in the compute node 600, or as components otherwise incorporated within a chassis of a larger system. Additionally or alternatively, any combination of the components depicted by FIG. 6 can be implemented as a system-on-chip (SoC), a single-board computer (SBC), a system-in-package (SiP), a multi-chip package (MCP), and/or the like, in which a combination of the hardware elements are formed into a single IC or a single package.

The compute node 600 includes physical hardware devices and software components capable of providing and/or accessing content and/or services to/from the remote system 690. The compute node 600 and/or the remote system 690 can be implemented as any suitable computing system or other data processing apparatus usable to access and/or provide content/services from/to one another. The compute node 600 communicates with remote systems 690, and vice versa, to obtain/serve content/services using any suitable communication protocol, such as any of those discussed herein. In some implementations, the remote system 690 may have some or all of the same or similar components as the compute node 600. As examples, the compute node 600 and/or the remote system 690 can be embodied as desktop computers, workstations, laptops, mobile phones (e.g., "smartphones"), tablet computers, portable media players, wearable devices, server(s), network appliances, smart appliances or smart factory machinery, network infrastructure elements, robots, drones, sensor systems and/or IoT devices, cloud compute nodes, edge compute nodes, an aggregation of computing resources (e.g., in a cloud-based environment), and/or some other computing devices capable of interfacing directly or indirectly with network 699 or other network(s). For purposes of the present disclosure, the compute node 600 may represent any of the computing devices discussed herein, and may be, or be implemented in one or more of NFT/blockchain service 250, client systems 310, 360, 650, servers 320, 330, 350, 690, and/or any other devices or systems, such as any of those discussed herein.

The system 600 includes physical hardware devices and software components capable of providing and/or accessing content and/or services to/from the remote system 655. The system 600 and/or the remote system 655 can be implemented as any suitable computing system or other data processing apparatus usable to access and/or provide content/services from/to one another. As examples, the system 600 and/or the remote system 655 may comprise desktop computers, a work stations, laptop computers, mobile cellular phones (e.g., "smartphones"), tablet computers, portable media players, wearable computing devices, server computer systems, an aggregation of computing resources (e.g., in a cloud-based environment), or some other computing devices capable of interfacing directly or indirectly with network 650 or other network. The system 600 communicates with remote systems 655, and vice versa, to obtain/serve content/services using any suitable communication protocol, such as any of those discussed herein.

The compute node 600 includes one or more processors 601 (also referred to as "processor circuitry 601"). The processor circuitry 601 includes circuitry capable of sequentially and/or automatically carrying out a sequence of arithmetic or logical operations, and recording, storing, and/or transferring digital data. Additionally or alternatively, the processor circuitry 601 includes any device capable of executing or otherwise operating computer-executable instructions, such as program code, software modules, and/or functional processes. The processor circuitry 601 includes various hardware elements or components such as, for example, a set of processor cores and one or more of on-chip or on-die memory or registers, cache and/or scratchpad memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. Some of these components, such as the on-chip or on-die memory or registers, cache and/or scratchpad memory, may be implemented using the same or similar devices as the memory circuitry 603 discussed infra. The processor circuitry 601 is also coupled with memory circuitry 603 and storage circuitry 604, and is configured to execute instructions stored in the memory/storage to enable various apps, OSs, or other software elements to run on the platform 600. In particular, the processor circuitry 601 is configured to operate app software (e.g., instructions 601*x*, 603*x*, 604*x*) to provide one or more services to a user of the compute node 600 and/or user(s) of remote systems/devices.

The processor circuitry 601 can be embodied as, or otherwise include one or multiple central processing units (CPUs), application processors, graphics processing units (GPUs), RISC processors, Acorn RISC Machine (ARM) processors, complex instruction set computer (CISC) processors, DSPs, FPGAs, programmable logic devices (PLDs), ASICs, baseband processors, radio-frequency integrated circuits (RFICs), microprocessors or controllers, multi-core processors, multithreaded processors, ultra-low voltage processors, embedded processors, a specialized x-processing units (xPUs) or a data processing unit (DPUs) (e.g., Infrastructure Processing Unit (IPU), network processing unit (NPU), and/or the like), and/or any other processing devices or elements, or any combination thereof. In some implementations, the processor circuitry 601 is embodied as one or more special-purpose processor(s)/controller(s) configured (or configurable) to operate according to the various implementations and other aspects discussed herein. Additionally or alternatively, the processor circuitry 601 includes one or more hardware accelerators (e.g., same or similar to acceleration circuitry 608), which can include microprocessors, programmable processing devices (e.g., FPGAs, ASICS, PLDs, DSPs. and/or the like), and/or the like. As examples, the processor circuitry 602 may include Intel® Core™ based processor(s), MCU-class processor(s), Xeon® processor(s); Advanced Micro Devices (AMD) Zen® Core Architecture processor(s), such as Ryzen® or Epyc® processor(s), Accelerated Processing Units (APUs), MXGPUs, and/or the like; A, S, W, and T series processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); Power Architecture processor(s) provided by the OpenPOWER® Foundation and/or IBM®, MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; the ThunderX2® provided by Cavium™, Inc.; GeForce®, Tegra®, Titan X®, Tesla®, Shield®, and/or other like GPUs provided by Nvidia®; and/or the like. Other examples of the processor circuitry 602 may be mentioned elsewhere in the present disclosure.

The compute node 600 also includes non-transitory or transitory machine-readable media 602 (also referred to as "computer readable medium 602" or "CRM 602"), which may be embodied as, or otherwise include system memory 603, storage 604, and/or memory devices/elements of the processor 601. Additionally or alternatively, the CRM 602 can be embodied as any of the devices/technologies described for the memory 603 and/or storage 604.

The system memory 603 (also referred to as "memory circuitry 603") includes one or more hardware elements/devices for storing data and/or instructions 603*x* (and/or instructions 601*x*, 604*x*). Any number of memory devices may be used to provide for a given amount of system memory 603. As examples, the memory 603 can be embodied as processor cache or scratchpad memory, volatile memory, non-volatile memory (NVM), and/or any other machine readable media for storing data. Examples of volatile memory include random access memory (RAM), static RAM (SRAM), dynamic RAM (DRAM), synchronous DRAM (SDRAM), thyristor RAM (T-RAM), content-addressable memory (CAM), and/or the like. Examples of NVM can include read-only memory (ROM) (e.g., including programmable ROM (PROM), erasable PROM (EPROM), electrically EPROM (EEPROM), flash memory (e.g., NAND flash memory, NOR flash memory, and/or the like), solid-state storage (SSS) or solid-state ROM, programmable metallization cell (PMC), and/or the like), non-volatile RAM (NVRAM), phase change memory (PCM) or phase change RAM (PRAM) (e.g., Intel® 3D XPoint™ memory, chalcogenide RAM (CRAM), Interfacial Phase-Change Memory (IPCM), and/or the like), memistor devices, resistive memory or resistive RAM (ReRAM) (e.g., memristor devices, metal oxide-based ReRAM, quantum dot resistive memory devices, and/or the like), conductive bridging RAM (or PMC), magnetoresistive RAM (MRAM), electrochemical RAM (ECRAM), ferroelectric RAM (FeRAM), anti-ferroelectric RAM (AFeRAM), ferroelectric field-effect transistor (FeFET) memory, and/or the like. Additionally or alternatively, the memory circuitry 603 can include spintronic memory devices (e.g., domain wall memory (DWM), spin transfer torque (STT) memory (e.g., STT-RAM or STT-MRAM), magnetic tunneling junction memory devices, spin-orbit transfer memory devices, Spin-Hall memory devices, nanowire memory cells, and/or the like). In some implementations, the individual memory devices 603 may be formed into any number of different package types, such as single die package (SDP), dual die package (DDP), quad die package (Q17P), memory modules (e.g., dual inline memory modules (DIMMs), microDIMMs, and/or MiniDIMMs), and/or the like. Additionally or alternatively, the memory circuitry 603 is or includes block addressable memory device(s), such as those based on NAND or NOR flash memory technologies (e.g., single-level cell ("SLC"), multi-level cell ("MLC"), quad-level cell ("QLC"), tri-level cell ("TLC"), or some other NAND or NOR device). Additionally or alternatively, the memory circuitry 603 can include resistor-based and/or transistor-less memory architectures. In some examples, the memory circuitry 603 can refer to a die, chip, and/or a packaged memory product. In some implementations, the memory 603 can be or include the on-die memory or registers associated with the processor circuitry 601. Additionally or alternatively, the memory 603 can include any of the devices/components discussed infra w.r.t the storage circuitry 604.

The storage 604 (also referred to as "storage circuitry 604") provides persistent storage of information, such as data, OSs, apps, instructions 604*x*, and/or other software elements. As examples, the storage 604 may be embodied as a magnetic disk storage device, hard disk drive (HDD), microHDD, solid-state drive (SSD), optical storage device, flash memory devices, memory card (e.g., secure digital (SD) card, extreme Digital (XD) picture card, USB flash drives, SIM cards, and/or the like), and/or any combination thereof. The storage circuitry 604 can also include specific storage units, such as storage devices and/or storage disks that include optical disks (e.g., DVDs, CDs/CD-ROM, Blu-ray disks, and/or the like), flash drives, floppy disks, hard drives, and/or any number of other hardware devices in which information is stored for any duration (e.g., for extended time periods, permanently, for brief instances, for temporarily buffering, and/or caching). Additionally or alternatively, the storage circuitry 604 can include resistor-based and/or transistor-less memory architectures. Further, any number of technologies may be used for the storage 604 in addition to, or instead of, the previously described technologies, such as, for example, resistance change memories, phase change memories, holographic memories, chemical memories, among many others. Additionally or alternatively, the storage circuitry 604 can include any of the devices or components discussed previously w.r.t the memory 603.

Instructions 601*x*, 603*x*, 604*x* in the form of computer programs, computational logic/modules (e.g., including the various modules/logic discussed herein), source code, middleware, firmware, object code, machine code, microcode (ucode), or hardware commands/instructions, when executed, implement or otherwise carry out various functions, processes, methods, algorithms, operations, tasks, actions, techniques, and/or other aspects of the present disclosure. The instructions 601*x*, 603*x*, 604*x* may be written in any combination of one or more programming languages, including object oriented programming languages, procedural programming languages, scripting languages, markup languages, machine language, and/or some other suitable programming languages including proprietary programming languages and/or development tools, or any other suitable technologies. The instructions 601*x*, 603*x*, 604*x* may execute entirely on the system 600, partly on the system 600, as a stand-alone software package, partly on the system 600 and partly on a remote system 690, or entirely on the remote system 690. In the latter scenario, the remote system 690 may be connected to the system 600 through any type of network 699. Although the instructions 601*x*, 603*x*, 604*x* are shown as code blocks included in the processor 601, memory 604, and/or storage 620, any of the code blocks may be replaced with hardwired circuits, for example, built into memory blocks/cells of an ASIC, FPGA, and/or some other suitable IC.

In some examples, the storage circuitry 604 stores computational logic/modules configured to implement the techniques described herein. The computational logic 604*x* may be employed to store working copies and/or permanent copies of programming instructions, or data to create the programming instructions, for the operation of various components of compute node 600 (e.g., drivers, libraries, APIs, and/or the like), an OS of compute node 600, one or more applications, and/or the like. The computational logic 604*x* may be stored or loaded into memory circuitry 603 as instructions 603*x*, or data to create the instructions 603*x*, which are then accessed for execution by the processor circuitry 601 via the IX 606 to carry out the various functions, processes, methods, algorithms, operations, tasks, actions, techniques, and/or other aspects described herein (see e.g., FIGS. 1-5). The various elements may be implemented by assembler instructions supported by processor circuitry 601 or high-level languages that may be compiled into instructions 601*x*, or data to create the instructions 601*x*, to be executed by the processor circuitry 601. The permanent copy of the programming instructions may be placed into persistent storage circuitry 604 at the factory/OEM or in the field through, for example, a distribution medium (e.g., a wired connection and/or over-the-air (OTA) interface) and a communication interface (e.g., communication circuitry 607) from a distribution server (e.g., remote system 690) and/or the like.

Additionally or alternatively, the instructions 601*x*, 603*x*, 604*x* can include one or more operating systems (OS) and/or other software to control various aspects of the compute node 600. The OS can include drivers and/or APIs to control particular devices or components that are embedded in the compute node 600, attached to the compute node 600, communicatively coupled with the compute node 600, and/or otherwise accessible by the compute node 600. The OSs also include one or more libraries, drivers, APIs, firmware, middleware, software glue, and/or the like, which provide program code and/or software components for one or more apps to obtain and use the data from other apps operated by the compute node 600, such as the various subsystems of the NFT/blockchain service 250 and/or any other device or system discussed herein. For example, the OS can include a display driver to control and allow access to a display device, a touchscreen driver to control and allow access to a touchscreen interface of the system 600, sensor drivers to obtain sensor readings of sensor circuitry 621 and control and allow access to sensor circuitry 621, actuator drivers to obtain actuator positions of the actuators 622 and/or control and allow access to the actuators 622, a camera driver to control and allow access to an embedded image capture device, audio drivers to control and allow access to one or more audio devices. The OS can be a general purpose OS or an OS specifically written for and tailored to the computing platform 600. Example OSs include consumer-based OS (e.g., Microsoft® Windows® 10, Google® Android®, Apple® macOS®, Apple® iOS®, KaiOS™ provided by KaiOS Technologies Inc., Unix or a Unix-like OS such as Linux, Ubuntu, and/or the like), industry-focused OSs such as real-time OS (RTOS) (e.g., Apache® Mynewt, Windows® IoT®, Android Things®, Micrium® Micro-Controller OSs ("MicroC/OS" or "uC/OS"), VxWorks®, FreeRTOS, and/or the like), hypervisors (e.g., Xen® Hypervisor, Real-Time Systems® RTS Hypervisor, Wind River Hypervisor, VMWare® vSphere® Hypervisor, and/or the like), and/or the like. For purposes of the present disclosure, can also include hypervisors, container orchestrators and/or container engines. The OS can invoke alternate software to facilitate one or more functions and/or operations that are not native to the OS, such as particular communication protocols and/or interpreters. Additionally or alternatively, the OS instantiates various functionalities that are not native to the OS. In some examples, OSs include varying degrees of complexity and/or capabilities. In some examples, a first OS on a first compute node 600 may be the same or different than a second OS on a second compute node 600 (here, the first and second compute nodes 600 can be physical machines or VMs operating on the same or different physical compute nodes). In these examples, the first OS may be an RTOS having particular performance expectations of responsivity to dynamic input conditions, and the second OS can include GUI capabilities to facilitate end-user I/O and/or the like.

The various components of the computing node 600 communicate with one another over an interconnect (IX) 606. The IX 606 may include any number of IX (or similar) technologies including, for example, instruction set architecture (ISA), extended ISA (eISA), Inter-Integrated Circuit (I2C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX, RapidIO™ IX, Coherent Accelerator Processor Interface (CAPI), OpenCAPI, Advanced Microcontroller Bus Architecture (AMBA) IX, cache coherent interconnect for accelerators (CCIX), Gen-Z Consortium IXs, a HyperTransport IX, NVLink provided by NVIDIA®, ARM Advanced extensible Interface (AXI), a Time-Trigger Protocol (TTP) system, a FlexRay system, PROFIBUS, Ethernet, USB, On-Chip System Fabric (IOSF), Infinity Fabric (IF), and/or any number of other IX technologies. The IX 606 may be a proprietary bus, for example, used in a SoC based system.

In some implementations (e.g., where the system 600 is a server computer system), the compute node 600 includes one or more hardware accelerators 608 (also referred to as "acceleration circuitry 608", "accelerator circuitry 608", and/or the like). The acceleration circuitry 608 can include various hardware elements such as, for example, one or more GPUs, FPGAs, DSPs, SoCs (including programmable SoCs and multi-processor SoCs), ASICs (including programmable ASICs), PLDs (including complex PLDs (CPLDs) and high capacity PLDs (HCPLDs), xPUs (e.g., DPUs, IPUs, and NPUs) and/or other forms of specialized circuitry designed to accomplish specialized tasks. Additionally or alternatively, the acceleration circuitry 608 may be embodied as, or include, one or more of artificial intelligence (AI) accelerators (e.g., vision processing unit (VPU), neural compute sticks, neuromorphic hardware, deep learning processors (DLPs) or deep learning accelerators, tensor processing units (TPUs), physical neural network hardware, and/or the like), cryptographic accelerators (or secure cryptoprocessors), network processors, I/O accelerator (e.g., DMA engines and/or the like), and/or any other specialized hardware device/component. The offloaded tasks performed by the acceleration circuitry 608 can include, for example, AI/ML tasks (e.g., training, feature extraction, model execution for inference/prediction, classification, and so forth), visual data processing, graphics processing, digital and/or analog signal processing, network data processing, infrastructure function management, object detection, rule analysis, and/or the like. As examples, these processor(s) 601 and/or accelerators 608 may be a cluster of artificial intelligence (AI) GPUs, tensor processing units (TPUs) developed by Google® Inc., Real AI Processors (RAPS™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, and/or the like. In some implementations, the processor circuitry 602 and/or accelerator circuitry 608 may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like.

The acceleration circuitry 608 includes any suitable hardware device or collection of hardware elements that are designed to perform one or more specific functions more efficiently in comparison to general-purpose processing elements (e.g., those provided as part of the processor circuitry 601). For example, the acceleration circuitry 608 can include special-purpose processing device tailored to perform one or more specific tasks or workloads of the subsystems of the NFT/blockchain service 250. In some examples, the specific tasks or workloads may be offloaded from one or more processors of the processor circuitry 602. In some implementations, the processor circuitry 601 and/or acceleration circuitry 608 includes hardware elements specifically tailored for executing, operating, or otherwise providing AI and/or ML functionality, such as for operating various subsystems of the NFT/blockchain service 250 and/or any other device or system discussed herein, such as those discussed w.r.t FIGS. 1-5. In these implementations, the circuitry 601 and/or 608 is/are embodied as, or otherwise includes, one or more AI or ML chips that can run many different kinds of AI/ML instruction sets once loaded with the appropriate weightings, training data, AI/ML models, and/or the like. Additionally or alternatively, the processor circuitry 601 and/or accelerator circuitry 608 is/are embodied as, or otherwise includes, one or more custom-designed silicon cores specifically designed to operate corresponding subsystems of the NFT/blockchain service 250 and/or any other device or system discussed herein. These cores may be designed as synthesizable cores comprising hardware description language logic (e.g., register transfer logic, verilog, Very High Speed Integrated Circuit hardware description language (VHDL), and/or the like); netlist cores comprising gate-level description of electronic components and connections and/or process-specific very-large-scale integration (VLSI) layout; and/or analog or digital logic in transistor-layout format. In these implementations, one or more of the subsystems of the NFT/blockchain service 250 and/or any other device or system discussed herein may be operated, at least in part, on custom-designed silicon core(s). These "hardware-ized" subsystems may be integrated into a larger chipset but may be more efficient than using general purpose processor cores The TEE 609 operates as a protected area accessible to the processor circuitry 601 and/or other components to enable secure access to data and secure execution of instructions. The TEE 690 operates as a protected area accessible to the processor circuitry 602 to enable secure access to data and secure execution of instructions. In some implementations, the TEE 609 is embodied as one or more physical hardware devices that is/are separate from other components of the system 600, such as a secure-embedded controller, a dedicated SoC, a TPM, a tamper-resistant chipset or microcontroller with embedded processing devices and memory devices, a smart card and/or universal integrated circuit card (UICC) (e.g., Subscriber Identity Module (SIM) card and/or the like), and/or the like. Examples of such implementations include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and/or the like.

Additionally or alternatively, the TEE 609 is embodied as secure enclaves (or "enclaves"), which is/are isolated regions of code and/or data within the processor and/or memory/storage circuitry of the compute node 600, where only code executed within a secure enclave may access data within the same secure enclave, and the secure enclave may only be accessible using the secure app (which may be implemented by an app processor or a tamper-resistant microcontroller). In some implementations, the memory circuitry 603 and/or storage circuitry 604 may be divided into one or more trusted memory regions for storing apps or software modules of the secure enclave(s) 609. Example implementations of the TEE 690, and an accompanying secure area in the processor circuitry 601 or the memory circuitry 603 and/or storage circuitry 604, include Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 600 through the TEE 690 and the processor circuitry 602.

Additionally or alternatively, the TEE 609 and/or processor circuitry 601, acceleration circuitry 608, memory circuitry 603, and/or storage circuitry 604 may be divided into, or otherwise separated into isolated user-space instances and/or virtualized environments using a suitable virtualization technology, such as, for example, virtual machines (VMs), virtualization containers (e.g., Docker® containers, Kubernetes® containers, Solaris® containers and/or zones, OpenVZ® virtual private servers, DragonFly BSD® virtual kernels and/or jails, chroot jails, and/or the like), and/or other virtualization technologies. These virtualization technologies may be managed and/or controlled by a virtual machine monitor (VMM), hypervisor container engines, orchestrators, and/or the like. Such virtualization technologies provide execution environments/TEEs in which one or more apps and/or other software, code, or scripts may execute while being isolated from one or more other apps, software, code, or scripts.

The communication circuitry 607 is a hardware element, or collection of hardware elements, used to communicate over one or more networks (e.g., network 699) and/or with other devices. The communication circuitry 607 includes modem 607*a* and transceiver circuitry ("TRx") 607*b*. The modem 607*a* includes one or more processing devices (e.g., baseband processors) to carry out various protocol and radio control functions. Modem 607*a* may interface with application circuitry of compute node 600 (e.g., a combination of processor circuitry 601, memory circuitry 603, and/or storage circuitry 604) for generation and processing of baseband signals and for controlling operations of the TRx 607*b*. The modem 607*a* handles various radio control functions that enable communication with one or more radio networks via the TRx 607*b* according to one or more wireless communication protocols. The modem 607*a* may include circuitry such as, but not limited to, one or more single-core or multi-core processors (e.g., one or more baseband processors) or control logic to process baseband signals received from a receive signal path of the TRx 607*b*, and to generate baseband signals to be provided to the TRx 607*b* via a transmit signal path. In various implementations, the modem 607*a* may implement a real-time OS (RTOS) to manage resources of the modem 607*a*, schedule tasks, and/or the like.

The communication circuitry 607 also includes TRx 607*b* to enable communication with wireless networks using modulated electromagnetic radiation through a non-solid medium. The TRx 607*b* may include one or more radios that are compatible with, and/or may operate according to any one or more of the radio communication technologies, radio access technologies (RATs), and/or communication protocols/standards including any combination of those discussed herein. TRx 607*b* includes a receive signal path, which comprises circuitry to convert analog RF signals (e.g., an existing or received modulated waveform) into digital baseband signals to be provided to the modem 607*a*. The TRx 607*b* also includes a transmit signal path, which comprises circuitry configured to convert digital baseband signals provided by the modem 607*a* to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the TRx 607*b* using metal transmission lines and/or the like.

The network interface circuitry/controller (NIC) 607*c* provides wired communication to the network 699 and/or to other devices using a standard communication protocol such as, for example, Ethernet (e.g., [IEEE802.3]), Ethernet over GRE Tunnels, Ethernet over Multiprotocol Label Switching (MPLS), Ethernet over USB, Controller Area Network (CAN), Local Interconnect Network (LIN), DeviceNet, ControlNet, Data Highway+, PROFIBUS, or PROFINET, among many others. Network connectivity may be provided to/from the compute node 600 via the NIC 607*c* using a physical connection, which may be electrical (e.g., a "copper interconnect"), fiber, and/or optical. The physical connection also includes suitable input connectors (e.g., ports, receptacles, sockets, and/or the like) and output connectors (e.g., plugs, pins, and/or the like). The NIC 607*c* may include one or more dedicated processors and/or FPGAs to communicate using one or more of the aforementioned network interface protocols. In some implementations, the NIC 607*c* may include multiple controllers to provide connectivity to other networks using the same or different protocols. For example, the compute node 600 may include a first NIC 607*c* providing communications to the network 699 over Ethernet and a second NIC 607*c* providing communications to other devices over another type of network. As examples, the NIC 607*c* is or includes one or more of an Ethernet controller (e.g., a Gigabit Ethernet Controller and/or the like), a high-speed serial interface (HSSI), a Peripheral Component Interconnect (PCI) controller, a USB controller, a SmartNIC, an Intelligent Fabric Processor (IFP), and/or other like device.

The input/output (I/O) interface circuitry 608 (also referred to as "interface circuitry 608") is configured to connect or communicatively coupled the compute node 600 with one or more external (peripheral) components, devices, and/or subsystems. In some implementations, the interface circuitry 608 may be used to transfer data between the compute node 600 and another computer device (e.g., remote system 690, client system 650, and/or the like) via a wired and/or wireless connection. is used to connect additional devices or subsystems. The interface circuitry 608, is part of, or includes circuitry that enables the exchange of information between two or more components or devices such as, for example, between the compute node 600 and one or more external devices. The external devices include sensor circuitry 641, actuator circuitry 642, positioning circuitry 643, and other I/O devices 640, but may also include other devices or subsystems not shown by FIG. 6. Access to various such devices/components may be implementation specific, and may vary from implementation to implementation. As examples, the interface circuitry 608 can be embodied as, or otherwise include, one or more hardware interfaces such as, for example, buses (e.g., including an expansion buses, IXs, and/or the like), input/output (I/O) interfaces, peripheral component interfaces (e.g., peripheral cards and/or the like), network interface cards, host bus adapters, and/or mezzanines, and/or the like. In some implementations, the interface circuitry 608 includes one or more interface controllers and connectors that interconnect one or more of the processor circuitry 601, memory circuitry 603, storage circuitry 604, communication circuitry 607, and the other components of compute node 600 and/or to one or more external (peripheral) components, devices, and/or subsystems. Additionally or alternatively, the interface circuitry 608 includes a sensor hub or other like elements to obtain and process collected sensor data and/or actuator data before being passed to other components of the compute node 600.

Additionally or alternatively, the interface circuitry 608 and/or the IX 606 can be embodied as, or otherwise include memory controllers, storage controllers (e.g., redundant array of independent disk (RAID) controllers and/or the like), baseboard management controllers (BMCs), input/output (I/O) controllers, host controllers, and/or the like. Examples of I/O controllers include integrated memory controller (IMC), memory management unit (MMU), input-output MMU (IOMMU), sensor hub, General Purpose I/O (GPIO) controller, PCIe endpoint (EP) device, direct media interface (DMI) controller, Intel® Flexible Display Interface (FDI) controller(s), VGA interface controller(s), Peripheral Component Interconnect Express (PCIe) controller(s), universal serial bus (USB) controller(s), FireWire controller(s), Thunderbolt controller(s), FPGA Mezzanine Card (FMC), extensible Host Controller Interface (xHCI) controller(s), Enhanced Host Controller Interface (EHCI) controller(s), Serial Peripheral Interface (SPI) controller(s), Direct Memory Access (DMA) controller(s), hard drive controllers (e.g., Serial AT Attachment (SATA) host bus adapters/controllers, Intel® Rapid Storage Technology (RST), and/or the like), Advanced Host Controller Interface (AHCI), a Low Pin Count (LPC) interface (bridge function), Advanced Programmable Interrupt Controller(s) (APIC), audio controller(s), SMBus host interface controller(s), UART controller(s), and/or the like. Some of these controllers may be part of, or otherwise applicable to the memory circuitry 603, storage circuitry 604, and/or IX 606 as well. As examples, the connectors include electrical connectors, ports, slots, jumpers, receptacles, modular connectors, coaxial cable and/or BNC connectors, optical fiber connectors, PCB mount connectors, inline/cable connectors, chassis/panel connectors, peripheral component interfaces (e.g., non-volatile memory ports, USB ports, Ethernet ports, audio jacks, power supply interfaces, on-board diagnostic (OBD) ports, and so forth), and/or the like.

The sensor(s) 641 (also referred to as “sensor circuitry 641”) includes devices, modules, or subsystems whose purpose is to detect events or changes in its environment and send the information (sensor data) about the detected events to some other a device, module, subsystem, and/or the like. Individual sensors 641 may be exteroceptive sensors (e.g., sensors that capture and/or measure environmental phenomena and/external states), proprioceptive sensors (e.g., sensors that capture and/or measure internal states of the compute node 600 and/or individual components of the compute node 600), and/or exproprioceptive sensors (e.g., sensors that capture, measure, or correlate internal states and external states). Examples of such sensors 641 include inertia measurement units (IMU), microelectromechanical systems (MEMS) or nanoelectromechanical systems (NEMS), level sensors, flow sensors, temperature sensors (e.g., thermistors, including sensors for measuring the temperature of internal components and sensors for measuring temperature external to the compute node 600), pressure sensors, barometric pressure sensors, gravimeters, altimeters, image capture devices (e.g., visible light cameras, thermographic camera and/or thermal imaging camera (TIC) systems, forward-looking infrared (FLIR) camera systems, radiometric thermal camera systems, active infrared (IR) camera systems, ultraviolet (UV) camera systems, and/or the like), light detection and ranging (LiDAR) sensors, proximity sensors (e.g., IR radiation detector and/or the like), depth sensors, ambient light sensors, optical light sensors, ultrasonic transceivers, microphones, inductive loops, force and/or load sensors, remote charge converters (RCC), rotor speed and position sensor(s), fiber optic gyro (FOG) inertial sensors, Attitude & Heading Reference Unit (AHRU), fibre Bragg grating (FBG) sensors and interrogators, tachometers, engine temperature gauges, pressure gauges, transformer sensors, airspeed-measurement meters, speed indicators, and/or the like. The IMUs, MEMS, and/or NEMS can include, for example, one or more 3-axis accelerometers, one or more 3-axis gyroscopes, one or more magnetometers, one or more compasses, one or more barometers, and/or the like. Additionally or alternatively, the sensors 641 can include sensors of various compute components such as, for example, digital thermal sensors (DTS) of respective processors/cores, thermal sensor on-die (TSOD) of respective dual inline memory modules (DIMMs), baseboard thermal sensors, and/or any other sensor(s), such as any of those discussed herein.

The actuators 642 allow the compute node 600 to change its state, position, and/or orientation, or move or control a mechanism or system. The actuators 642 comprise electrical and/or mechanical devices for moving or controlling a mechanism or system, and converts energy (e.g., electric current or moving air and/or liquid) into some kind of motion. The compute node 600 is configured to operate one or more actuators 642 based on one or more captured events, instructions, control signals, and/or configurations received from a service provider 690, client device 650, and/or other components of the compute node 600. As examples, the actuators 642 can be or include any number and combination of the following: soft actuators (e.g., actuators that changes its shape in response to a stimuli such as, for example, mechanical, thermal, magnetic, and/or electrical stimuli), hydraulic actuators, pneumatic actuators, mechanical actuators, electromechanical actuators (EMAs), microelectromechanical actuators, electrohydraulic actuators, linear actuators, linear motors, rotary motors, DC motors, stepper motors, servomechanisms, electromechanical switches, electromechanical relays (EMRs), power switches, valve actuators, piezoelectric actuators and/or biomorphs, thermal biomorphs, solid state actuators, solid state relays (SSRs), shape-memory alloy-based actuators, electroactive polymer-based actuators, relay driver integrated circuits (ICs), solenoids, impactive actuators/mechanisms (e.g., jaws, claws, tweezers, clamps, hooks, mechanical fingers, humaniform dexterous robotic hands, and/or other gripper mechanisms that physically grasp by direct impact upon an object), propulsion actuators/mechanisms (e.g., wheels, axles, thrusters, propellers, engines, motors (e.g., those discussed previously), clutches, and/or the like), projectile actuators/mechanisms (e.g., mechanisms that shoot or propel objects or elements), controllers of the compute node 600 or components thereof (e.g., host controllers, cooling element controllers, baseboard management controller (BMC), platform controller hub (PCH), uncore components (e.g., shared last level cache (LLC) cache, caching agent (Cbo), integrated memory controller (IMC), home agent (HA), power control unit (PCU), configuration agent (Ubox), integrated I/O controller (IIO), and interconnect (IX) link interfaces and/or controllers), and/or any other components such as any of those discussed herein), audible sound generators, visual warning devices, virtual instrumentation and/or virtualized actuator devices, and/or other like components or devices. In some examples, such as when the compute node 600 is part of a robot or drone, the actuator(s) 642 can be embodied as or otherwise represent one or more end effector tools, conveyor motors, and/or the like.

The positioning circuitry 643 includes circuitry to receive and decode signals transmitted/broadcasted by a positioning network of a GNSS. Examples of such navigation satellite constellations include United States' GPS, Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), and/or the like), and/or the like. The positioning circuitry 643 comprises various hardware elements (e.g., including hardware devices such as switches, filters, amplifiers, antenna elements, and/or the like to facilitate OTA communications) to communicate with components of a positioning network, such as navigation satellite constellation nodes. In some implementations, the positioning circuitry 643 may include a Micro-Technology for Positioning, Navigation, and Timing (Micro-PNT) IC that uses a master timing clock to perform position tracking/estimation without GNSS assistance. The positioning circuitry 643 may also be part of, or interact with, the communication circuitry 607 to communicate with the nodes and components of the positioning network. The positioning circuitry 643 may also provide position data and/or time data to the application circuitry, which may use the data to synchronize operations with various infrastructure (e.g., radio base stations), for turn-by-turn navigation, and/or the like.

NFC circuitry 646 comprises one or more hardware devices and software modules configurable or operable to read electronic tags and/or connect with another NFC-enabled device (also referred to as an "NFC touchpoint"). NFC is commonly used for contactless, short-range communications based on radio frequency identification (RFID) standards, where magnetic field induction is used to enable communication between NFC-enabled devices. The one or more hardware devices may include an NFC controller coupled with an antenna element and a processor coupled with the NFC controller. The NFC controller may be a chip providing NFC functionalities to the NFC circuitry 646. The software modules may include NFC controller firmware and an NFC stack. The NFC stack may be executed by the processor to control the NFC controller, and the NFC controller firmware may be executed by the NFC controller to control the antenna element to emit an RF signal. The RF signal may power a passive NFC tag (e.g., a microchip embedded in a sticker or wristband) to transmit stored data to the NFC circuitry 646, or initiate data transfer between the NFC circuitry 646 and another active NFC device (e.g., a smartphone or an NFC-enabled point-of-sale terminal) that is proximate to the computing system 600 (or the NFC circuitry 646 contained therein). The NFC circuitry 646 may include other elements, such as those discussed herein. Additionally, the NFC circuitry 646 may interface with a secure element (e.g., TEE 690) to obtain payment credentials and/or other sensitive/secure data to be provided to the other active NFC device. Additionally or alternatively, the NFC circuitry 646 and/or some other element may provide Host Card Emulation (HCE), which emulates a physical secure element.

The I/O device(s) 640 may be present within, or connected to, the compute node 600. The I/O devices 640 include input device circuitry and output device circuitry including one or more user interfaces designed to enable user interaction with the compute node 600 and/or peripheral component interfaces designed to enable peripheral component interaction with the compute node 600. The input device circuitry includes any physical or virtual means for accepting an input including, inter alia, one or more physical or virtual buttons, a physical or virtual keyboard, keypad, mouse, touchpad, touchscreen, microphones, scanner, headset, and/or the like. In implementations where the input device circuitry includes a capacitive, resistive, or other like touch-surface, a touch signal may be obtained from circuitry of the touch-surface. The touch signal may include information regarding a location of the touch (e.g., one or more sets of (x,y) coordinates describing an area, shape, and/or movement of the touch), a pressure of the touch (e.g., as measured by area of contact between a user's finger or a deformable stylus and the touch-surface, or by a pressure sensor), a duration of contact, any other suitable information, or any combination of such information. In these implementations, one or more apps operated by the processor circuitry 601 may identify gesture(s) based on the information of the touch signal, and utilizing a gesture library that maps determined gestures with specified actions.

The output device circuitry is used to show or convey information, such as sensor readings, actuator position(s), or other like information. Data and/or graphics may be displayed on one or more user interface components of the output device circuitry. The output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED and/or OLED displays, quantum dot displays, projectors, and/or the like), with the output of characters, graphics, multimedia objects, and/or the like being generated or produced from operation of the compute node 600. The output device circuitry may also include speakers or other audio emitting devices, printer(s), and/or the like. In some implementations, the sensor circuitry 641 may be used as the input device circuitry (e.g., an image capture device, motion capture device, and/or the like) and one or more actuators 642 may be used as the output device circuitry (e.g., an actuator to provide haptic feedback and/or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, and/or the like.

A battery 624 may be coupled to the compute node 600 to power the compute node 600, which may be used in implementations where the compute node 600 is not in a fixed location, such as when the compute node 600 is a mobile device or laptop. The battery 624 may be a lithium ion battery, a lead-acid automotive battery, or a metal-air battery, such as a zinc-air battery, an aluminum-air battery, a lithium-air battery, a lithium polymer battery, and/or the like. In implementations where the compute node 600 is mounted in a fixed location, such as when the system is implemented as a server computer system, the compute node 600 may have a power supply coupled to an electrical grid. In these implementations, the compute node 600 may include power tee circuitry to provide for electrical power drawn from a network cable to provide both power supply and data connectivity to the compute node 600 using a single cable.

Power management integrated circuitry (PMIC) 622 may be included in the compute node 600 to track the state of charge (SoCh) of the battery 624, and to control charging of the compute node 600. The PMIC 622 may be used to monitor other parameters of the battery 624 to provide failure predictions, such as the state of health (SoH) and the state of function (SoF) of the battery 624. The PMIC 622 may include voltage regulators, surge protectors, power alarm detection circuitry. The power alarm detection circuitry may detect one or more of brown out (under-voltage) and surge (over-voltage) conditions. The PMIC 622 may communicate the information on the battery 624 to the processor circuitry 601 over the IX 606. The PMIC 622 may also include an analog-to-digital (ADC) convertor that allows the processor circuitry 601 to directly monitor the voltage of the battery 624 or the current flow from the battery 624. The battery parameters may be used to determine actions that the compute node 600 may perform, such as transmission frequency, mesh network operation, sensing frequency, and/or the like.

A power block 620, or other power supply coupled to an electrical grid, may be coupled with the PMIC 622 to charge the battery 624. In some examples, the power block 620 may be replaced with a wireless power receiver to obtain the power wirelessly, for example, through a loop antenna in the compute node 600. In these implementations, a wireless battery charging circuit may be included in the PMIC 622. The specific charging circuits chosen depend on the size of the battery 624 and the current required.

The compute node 600 may include any combinations of the components shown by FIG. 6; however, some of the components shown may be omitted, additional components may be present, and different arrangement of the components shown may occur in other implementations. In one example where the compute node 600 is or is part of a server computer system, the battery 624, communication circuitry 607, the sensors 641, actuators 642, and/or positioning circuitry 643, and possibly some or all of the I/O devices 640, may be omitted.

As mentioned previously, the memory circuitry 603 and/or the storage circuitry 604 are embodied as transitory or non-transitory computer-readable media (e.g., CRM 602). The CRM 602 is suitable for use to store instructions (or data that creates the instructions) that cause an apparatus (such as any of the devices/components/systems described w.r.t FIG. 1), in response to execution of the instructions (e.g., instructions 601*x*, 603*x*, 604*x*) by the compute node 600 (e.g., one or more processors 601), to practice selected aspects of the present disclosure. The CRM 602 can include a number of programming instructions (e.g., instructions 601*x*, 603*x*, 604*x*) (or data to create the programming instructions). The programming instructions are configured to enable a device, in response to execution of the programming instructions, to perform various programming operations associated with operating system functions, one or more apps, and/or aspects of the present disclosure. The programming instructions may correspond to any of the computational logic 604*x*, instructions 603*x* and 601*x* discussed previously.

Additionally or alternatively, programming instructions (or data to create the instructions) may be disposed on multiple CRM 602. In alternate implementations, programming instructions (or data to create the instructions) may be disposed on computer-readable transitory storage media, such as signals. The programming instructions embodied by a machine-readable medium 602 may be transmitted or received over a communications network using a transmission medium via a network interface device (e.g., communication circuitry 607 and/or NIC 607*c* of FIG. 6) utilizing any one of a number of communication protocols and/or data transfer protocols such as any of those discussed herein.

Any combination of one or more computer usable or CRM 602 may be utilized as or instead of the CRM 602. The computer-usable or computer-readable medium 602 may be, for example, but not limited to one or more electronic, magnetic, optical, electromagnetic, infrared, or semiconductor systems, apparatuses, devices, or propagation media. For instance, the CRM 602 may be embodied by devices described for the storage circuitry 604 and/or memory circuitry 603 described previously and/or as discussed elsewhere in the present disclosure. In the context of the present disclosure, a computer-usable or computer-readable medium 602 may be any medium that can contain, store, communicate, propagate, or transport the program (or data to create the program) for use by or in connection with the instruction execution system, apparatus, or device. The computer-usable medium 602 may include a propagated data signal with the computer-usable program code (e.g., including programming instructions) or data to create the program code embodied therewith, either in baseband or as part of a carrier wave. The computer usable program code or data to create the program may be transmitted using any appropriate medium, including but not limited to wireless, wireline, optical fiber cable, RF, and/or the like.

Additionally or alternatively, the program code (or data to create the program code) described herein may be stored in one or more of a compressed format, an encrypted format, a fragmented format, a packaged format, and/or the like. Program code (e.g., programming instructions) or data to create the program code as described herein may require one or more of installation, modification, adaptation, updating, combining, supplementing, configuring, decryption, decompression, unpacking, distribution, reassignment, and/or the like in order to make them directly readable and/or executable by a computing device and/or other machine. For example, the program code or data to create the program code may be stored in multiple parts, which are individually compressed, encrypted, and stored on separate computing devices, wherein the parts when decrypted, decompressed, and combined form a set of executable instructions that implement the program code or the data to create the program code, such as those described herein. In another example, the program code or data to create the program code may be stored in a state in which they may be read by a computer, but require addition of a library (e.g., a dynamic link library), a software development kit (SDK), an API, and/or the like in order to execute the instructions on a particular computing device or other device. In another example, the program code or data to create the program code may need to be configured (e.g., settings stored, data input, network addresses recorded, and/or the like) before the program code or data to create the program code can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code or data to create the program code are intended to encompass such machine readable instructions and/or program(s) or data to create such machine readable instruction and/or programs regardless of the particular format or state of the machine readable instructions and/or program(s) when stored or otherwise at rest or in transit.

The computer program code for carrying out operations of the present disclosure, including, for example, programming instructions, computational logic 604x, instructions 603x, and/or instructions 601x, may be written in any combination of one or more programming languages, including an object oriented programming language (e.g., Python, PyTorch, Ruby, Scala, Smalltalk, Java™, Java Servlets, Kotlin, C++, C#, and/or the like), a procedural programming language (e.g., the "C" programming language, Go (or "Golang"), and/or the like), a scripting language (e.g., ECMAScript, JavaScript, Server-Side JavaScript (SSJS), PHP, Pearl, Python, PyTorch, Ruby, Lua, Torch/Lua with Just-In Time compiler (LuaJIT), Accelerated Mobile Pages Script (AMPscript), VBScript, and/or the like), a markup language (e.g., hypertext markup language (HTML), extensible markup language (XML), wiki markup or Wikitext, User Interface Markup Language (UIML), and/or the like), a data interchange format/definition (e.g., Java Script Object Notion (JSON), Apache® MessagePack™, and/or the like), a stylesheet language (e.g., Cascading Stylesheets (CSS), extensible stylesheet language (XSL), and/or the like), an interface definition language (IDL) (e.g., Apache® Thrift, Abstract Syntax Notation One (ASN.1), Google® Protocol Buffers (protobuf), efficient XML interchange (EXI), and/or the like), a web framework (e.g., Active Server Pages Network Enabled Technologies (ASP.NET), Apache® Wicket, Asynchronous Javascript and XML (Ajax) frameworks, Django, Jakarta Server Faces (JSF; formerly Java-Server Faces), Jakarta Server Pages (JSP; formerly JavaServer Pages), Ruby on Rails, web toolkit, and/or the like), a template language (e.g., Apache® Velocity, Tea, Django template language, Mustache, Template Attribute Language (TAL), Extensible Stylesheet Language Transformations (XSLT), Thymeleaf, Facelet view, and/or the like), and/or some other suitable programming languages including proprietary programming languages and/or development tools, or any other languages or tools such as those discussed herein. It should be noted that some of the aforementioned languages, tools, and/or technologies may be classified as belonging to multiple types of languages/technologies or otherwise classified differently than described previously. The computer program code for carrying out operations of the present disclosure may also be written in any combination of the programming languages discussed herein. The program code may execute entirely on the compute node 600, partly on the compute node 600 as a stand-alone software package, partly on the compute node 600 and partly on a remote computer, or entirely on the remote computer. In the latter scenario, the remote computer may be connected to the compute node 600 through any type of network (e.g., network 699).

The network 699 comprises a set of computers that share resources located on or otherwise provided by a set of network nodes. The set of computers making up the network 699 can use one or more communication protocols and/or access technologies (such as any of those discussed herein) to communicate with one another and/or with other computers outside of the network 699 (e.g., compute node 600, client device 650, and/or remote system 690), and may be connected with one another or otherwise arranged in a variety of network topologies.

As examples, the network 699 can represent the Internet, one or more cellular networks, local area networks (LANs), wide area networks (WANs), wireless LANs (WLANs), Transfer Control Protocol (TCP)/Internet Protocol (IP)-based networks, Personal Area Networks (e.g., Bluetooth®, [IEEE802154], and/or the like), Digital Subscriber Line (DSL) and/or cable networks, data networks, cloud computing services, edge computing networks, proprietary and/or enterprise networks, and/or any combination thereof. In some implementations, the network 699 is associated with network operator who owns or controls equipment and other elements necessary to provide network-related services, such as one or more network access nodes (NANs) (e.g., base stations, access points, and/or the like), one or more servers for routing digital data or telephone calls (e.g., a core network or backbone network), and/or the like. Other networks can be used instead of or in addition to the Internet, such as an intranet, an extranet, a virtual private network (VPN), an enterprise network, a non-TCP/IP based network, any LAN, WLAN, WAN, and/or the like. In either implementation, the network 699 comprises computers, network connections among various computers (e.g., between the compute node 600, client device(s) 650, remote system 690, and/or the like), and software routines to enable communication between the computers over respective network connections. Connections to the network 699 (and/or compute nodes therein) may be via a wired and/or a wireless connections using the various communication protocols such as any of those discussed herein. More than one network may be involved in a communication session between the illustrated devices. Connection to the network 699 may require that the computers execute software routines that enable, for example, the layers of the OSI model of computer networking or equivalent in a wireless (or cellular) phone network.

The remote system 690 (also referred to as a "service provider", "application server(s)", "app server(s)", "external platform", and/or the like) comprises one or more physical and/or virtualized computing systems owned and/or operated by a company, enterprise, and/or individual that hosts, serves, and/or otherwise provides information objects to one or more users (e.g., compute node 600). The physical and/or virtualized systems include one or more logically or physically connected servers and/or data storage devices distributed locally or across one or more geographic locations. Generally, the remote system 690 uses IP/network resources to provide InOb(s) such as electronic documents, webpages, forms, apps (e.g., native apps, web apps, mobile apps, and/or the like), data, services, web services, media, and/or content to different user/client devices 650. As examples, the service provider 690 may provide mapping and/or navigation services; cloud computing services; search engine services; social networking, microblogging, and/or message board services; content (media) streaming services; e-commerce services; blockchain services; communication services such as Voice-over-Internet Protocol (VoIP) sessions, text messaging, group communication sessions, and/or the like; immersive gaming experiences; and/or other like services. In some examples, the remote system 690 corresponds to the NFT/blockchain service 250, and the system 600 and/or client device 650 corresponds to user devices 310, 360, 650. The user/client devices 310, 360, 650 that utilize services provided by remote system 690 may be referred to as "subscribers" and/or the like. Although FIG. 6 shows only a single remote system 690, the remote system 690 may represent multiple remote system 690, each of which may have their own subscribing users.

Furthermore, various aspects of the present disclosure may take the form of a computer program product or data to create the computer program, with the computer program or data embodied in any tangible or non-transitory medium of expression having the computer-usable program code (or data to create the computer program) embodied in the medium.

3. Example Implementations

Figure 7:
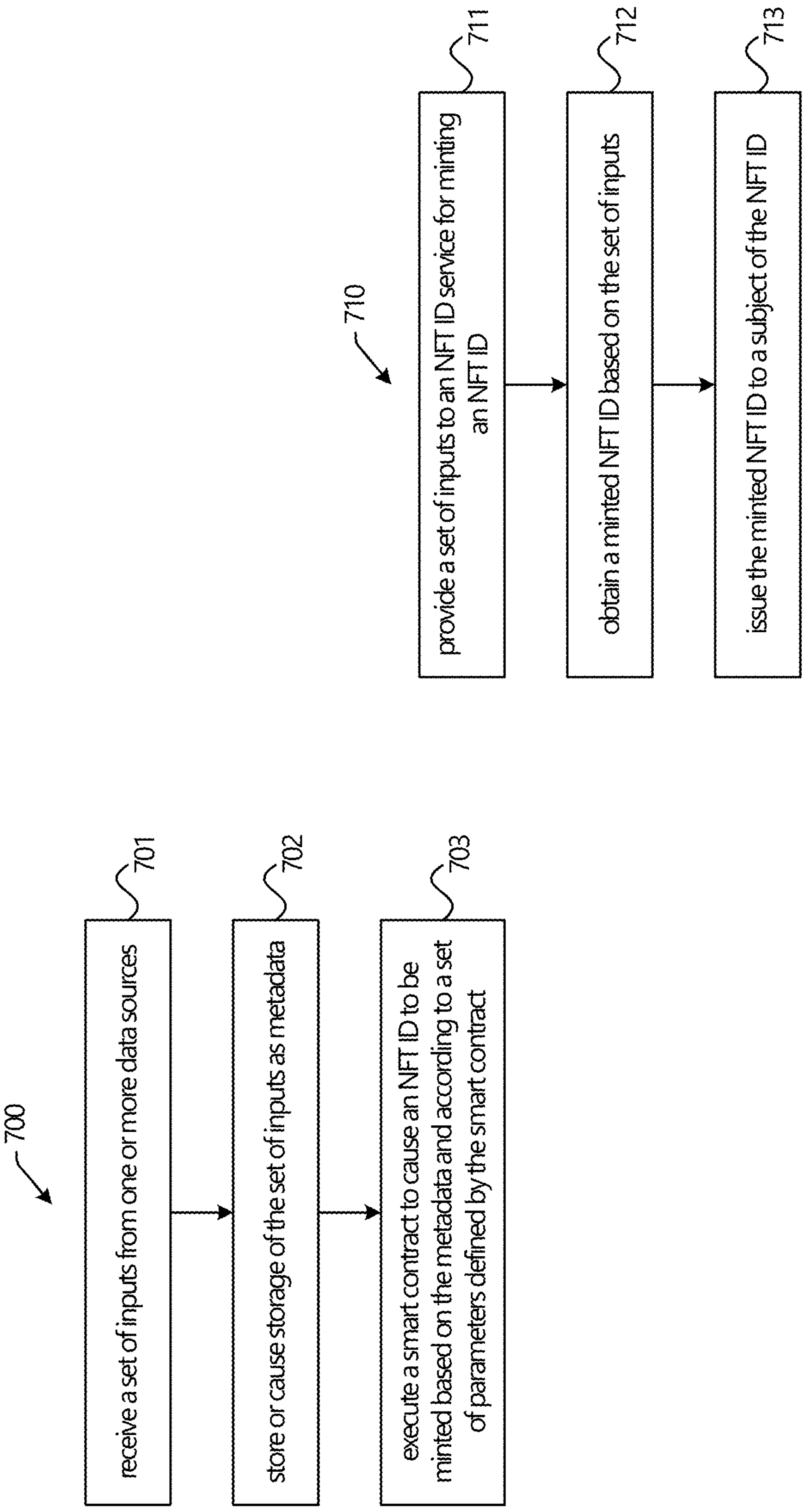
FIG. 7 depicts examples processes for practicing various aspects of the present disclosure.

FIG. 7 shows processes 700 and 710 for practicing aspects of the present disclosure. Process 700 is a process that can be used to provide NFT ID services, which may be performed by the NFT ID engine 350 discussed previously. Process 700 begins at operation 701 where the NFT ID engine 350 receives a set of inputs 401 from one or more data sources (e.g., user 310, admin 360, and/or one or more SPPs or third party platforms). At operation 702, the NFT ID engine 350 stores or causes storage of the set of inputs 401 (e.g., ID info 513) as metadata 413. The NFT ID engine 350 may store the set of inputs 401 (e.g., ID info 513) in file system 560 via API(s) 555. At operation 703, the NFT ID engine 350 executes a smart contract 411 to cause an NFT ID 402 to be minted based on the metadata 413 and according to a set of parameters defined by the smart contract 411.

Process 700 is a process that can be used to provide NFT ID services, which may be performed by the admin 360 discussed previously. Process 710 begins at operation 711 where the admin 360 provides a set of inputs 401 (e.g., ID info 513) to an NFT ID service 250 (e.g., NFT ID engine 350). At operation 712, the admin 360 obtains a minted NFT ID 402 based on the set of inputs 401 (e.g., ID info 513), and at operation 713, the admin 360 issues the minted NFT ID 402 to a subject of the minted NFT ID 402 (e.g., user 310).

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example [0141] includes a method for providing non-fungible token (NFT) identity (ID) services, the method comprising: receiving a set of inputs from a set of data sources; causing storage of the set of inputs as metadata; and executing a smart contract to cause an NFT ID to be minted based on the metadata and according to a set of parameters defined by the smart contract.

Example [0142] includes the method of example [0141] and/or some other examples herein, wherein causing storage of the set of inputs as metadata includes: sending the set of inputs to a distributed file system via an application programming interface (API).

Example [0143] includes the method of examples [0141]-[0142] and/or some other examples herein, wherein the method includes: detecting a trigger to mint the NFT ID for a user, wherein the trigger includes transaction data to be used for executing the smart contract or the transaction data is generated in response to detection of the trigger; and executing the smart contract based on the detected trigger.

Example [0144] includes the method of example [0143] and/or some other examples herein, wherein the transaction data includes one or more of a token ID for the NFT ID, ownership information of an owner of the NFT ID, a reference to a storage location of the metadata in a distributed file system, and supply information indicating a number and type of NFT IDs to be minted.

Example [0145] includes the method of example [0144] and/or some other examples herein, wherein the transaction data includes a token name and a token symbol, and the method includes: generating the reference based on the token name and the token symbol.

Example [0146] includes the method of example [0145] and/or some other examples herein, wherein the token name is a name of an entity for which the NFT ID is to be created, and the token symbol is a code representing the entity or a geographic region for which the NFT ID is to be created.

Example [0147] includes the method of examples [0144]-[0146] and/or some other examples herein, wherein the method includes: sending the transaction data to an NFT framework to perform a minting process to mint the NFT ID.

Example [0148] includes the method of example [0147] and/or some other examples herein, wherein the minting process is to cause the NET framework to: store the reference to the storage location of the metadata in the NFT ID, not store the set of inputs or the metadata in a blockchain, and cause the NFT ID, when minted, to be recorded as a transaction in a block on a blockchain.

Example [0149] includes the method of examples [0147]-[0148] and/or some other examples herein, wherein the method includes: receiving a minted NFT ID from the NFT framework; and issuing the minted NFT ID to an administrator ("admin") or to a client associated with the user.

Example [0150] includes the method of example [0149] and/or some other examples herein, wherein the issuance of the minted NFT ID is recorded as a transaction in a block on a blockchain.

Example [0151] includes the method of example [0150] and/or some other examples herein, wherein issuance of the minted NFT ID from the admin to the user is recorded as another transaction in another block on the blockchain.

Example [0152] includes the method of examples [0149]-[0151] and/or some other examples herein, wherein the set of data sources include one or more of the admin, the client, and one or more third party platforms.

Example [0153] includes the method of example [0152] and/or some other examples herein, wherein the client is a standalone wallet device or a client application (app), a web app, or a digital wallet app operating on a client device; and the admin is another standalone wallet device or another client app, another web app, or another digital wallet app operating on another client device.

Example [0154] includes the method of examples [0141]-[0153] and/or some other examples herein, wherein the method includes: generating the smart contract based on a configuration obtained from an admin.

Example [0155] includes the method of examples [0141]-[0154] and/or some other examples herein, wherein the configuration includes one or more of a subset of inputs of the set of inputs to be provided by individual users, a subset of inputs of the set of inputs to be provided by individual admins, content types or formats of the set of inputs, a list of network addresses, address ranges, or domains that are permitted to access the NFT ID services, one or more types of apps that are permitted to access the NFT ID services, one or more device types that are permitted to be used to mint/create NFT IDs, cryptographic mechanisms to be used for storing the set of inputs, cryptographic mechanisms to be used for minting the NFT ID, content types or formats of minted NFT IDs, a location or range of locations for storing the metadata, a location or range of locations for storing minted NFT IDs, parameters or criteria for transferring NFT IDs, a list of verification nodes, and parameters or criteria for blockchain nodes to act as verification nodes.

Example [0156] includes the method of examples [0141]-[0155] and/or some other examples herein, wherein the set of inputs include one or more of one or more ID documents, knowledge-based authentication (KBA) data or know your customer (KYC) data, one or more financial institution documents, one or more authentication credentials or digital certificates, biometric data, timestamp of when the NFT ID service is accessed, geolocation info associated with access of the NFT ID service, client app data, third party platforms data, device/system data, and network-related data.

Example [0157] includes one or more computer readable media comprising instructions, wherein execution of the instructions by processor circuitry is to cause the processor circuitry to perform the method of examples [0141]-[0156] and/or some other example(s) herein.

Example [0158] includes a computer program comprising the instructions of example [0157] and/or some other example(s) herein.

Example [0159] includes an Application Programming Interface defining functions, methods, variables, data structures, and/or protocols for the computer program of example [0158] and/or some other example(s) herein.

Example [0160] includes an apparatus comprising circuitry loaded with the instructions of example [0157] and/or some other example(s) herein.

Example [0161] includes an apparatus comprising circuitry operable to run the instructions of example [0157] and/or some other example(s) herein.

Example [0162] includes an integrated circuit comprising one or more of the processor circuitry and the one or more computer readable media of example [0157] and/or some other example(s) herein.

Example [0163] includes a computing system comprising the one or more computer readable media and the processor circuitry of example [0157] and/or some other example(s) herein.

Example [0164] includes an apparatus comprising means for executing the instructions of example [0157] and/or some other example(s) herein.

Example [0165] includes a signal generated as a result of executing the instructions of example [0157] and/or some other example(s) herein.

Example [0166] includes a data unit generated as a result of executing the instructions of example [0157] and/or some other example(s) herein.

Example [0167] includes the data unit of example [0166] and/or some other example(s) herein, wherein the data unit is a datagram, packet, frame, subframe, segment, Protocol Data Unit (PDU), Service Data Unit (SDU), message, data block, data chunk, partition, fragment, and/or database object.

Example [0168] includes a signal encoded with the data unit of examples [0166]-[0167] and/or some other example(s) herein.

Example [0169] includes an electromagnetic signal carrying the instructions of example [0157] and/or some other example(s) herein.

Example [0170] includes an apparatus comprising means for performing the method of examples [0141]-[0156] and/or some other example(s) herein.

4. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The phrase "X(s)" means one or more X or a set of X. The description may use the phrases "in an embodiment," "In some embodiments," "in one implementation," "In some implementations," "in some examples", and/or the like, each of which may refer to one or more of the same or different embodiments, implementations, and/or examples. Furthermore, the terms "comprising," "including," "having," and/or the like, as used w.r.t the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some examples refers to (partial or in full) acts, tasks, operations, and/or the like, related to bringing or the readying the bringing of something into existence either actively or passively (e.g., exposing a device identity or entity identity). Additionally or alternatively, the term "establish" or "establishment" at least in some examples refers to (partial or in full) acts, tasks, operations, and/or the like, related to initiating, starting, or warming communication or initiating, starting, or warming a relationship between two entities or elements (e.g., establish a session, establish a session, and/or the like). Additionally or alternatively, the term "establish" or "establishment" at least in some examples refers to initiating something to a state of working readiness. The term "established" at least in some examples refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some examples refers to (partial or in full) acts, tasks, operations, and/or the like, of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values).

The term "receipt" at least in some examples refers to any action (or set of actions) involved with receiving or obtaining an object, data, data unit, and/or the like, and/or the fact of the object, data, data unit, and/or the like being received.

The term "receipt" at least in some examples refers to an object, data, data unit, and/or the like, being pushed to a device, system, element, and/or the like (e.g., often referred to as a push model), pulled by a device, system, element, and/or the like (e.g., often referred to as a pull model), and/or the like.

The term "element" at least in some examples refers to a unit that is indivisible at a given level of abstraction and has a clearly defined boundary, wherein an element may be any type of entity including, for example, one or more devices, systems, controllers, network elements, modules, and so forth, or combinations thereof. The term "entity" at least in some examples refers to a distinct element of a component, architecture, platform, device, and/or system. Additionally or alternatively, the term "entity" at least in some examples refers to information transferred as a payload.

The term "measurement" at least in some examples refers to the observation and/or quantification of attributes of an object, event, or phenomenon. Additionally or alternatively, the term "measurement" at least in some examples refers to a set of operations having the object of determining a measured value or measurement result, and/or the actual instance or execution of operations leading to a measured value. Additionally or alternatively, the term "measurement" at least in some examples refers to data recorded during testing.

The term "metric" at least in some examples refers to a quantity produced in an assessment of a measured value. Additionally or alternatively, the term "metric" at least in some examples refers to data derived from a set of measurements. Additionally or alternatively, the term "metric" at least in some examples refers to set of events combined or otherwise grouped into one or more values. Additionally or alternatively, the term "metric" at least in some examples refers to a combination of measures or set of collected data points. Additionally or alternatively, the term "metric" at least in some examples refers to a standard definition of a quantity, produced in an assessment of performance and/or reliability of the network, which has an intended utility and is carefully specified to convey the exact meaning of a measured value.

The term "signal" at least in some examples refers to an observable change in a quality and/or quantity. Additionally or alternatively, the term "signal" at least in some examples refers to a function that conveys information about of an object, event, or phenomenon. Additionally or alternatively, the term "signal" at least in some examples refers to any time varying voltage, current, or electromagnetic wave that may or may not carry information. The term "digital signal" at least in some examples refers to a signal that is constructed from a discrete set of waveforms of a physical quantity so as to represent a sequence of discrete values.

The terms "ego" (as in, e.g., "ego device") and "subject" (as in, e.g., "data subject") at least in some examples refers to an entity, element, device, system, and/or the like, that is under consideration or being considered. The terms "neighbor" and "proximate" (as in, e.g., "proximate device") at least in some examples refers to an entity, element, device, system, and/or the like, other than an ego device or subject device.

The term "circuitry" at least in some examples refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), single-board computer (SBC), system on chip (SoC), system in package (SiP), multi-chip package (MCP), digital signal processor (DSP), and/or the like, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "compute node" or "compute device" at least in some examples refers to an identifiable entity implementing an aspect of computing operations, whether part of a larger system, distributed collection of systems, or a standalone apparatus. In some examples, a compute node may be referred to as a "computing device", "computing system", and/or the like, whether in operation as a client, server, or intermediate entity. Specific implementations of a compute node may be incorporated into a server, base station, gateway, road side unit, on-premise unit, user equipment, end consuming device, appliance, and/or the like.

The term "computer system" at least in some examples refers to any type interconnected electronic devices, computer devices, or components thereof. Additionally, the terms "computer system" and/or "system" at least in some examples refer to various components of a computer that are communicatively coupled with one another. Furthermore, the term "computer system" and/or "system" at least in some examples refer to multiple computer devices and/or multiple computing systems that are communicatively coupled with one another and configured to share computing and/or networking resources. For purposes of the present disclosure, the terms "computer system", "compute device", "compute node", and/or the like, may be considered synonymous to, and may be occasionally referred to, as a computing platform, platform, client device, client, mobile, mobile device, user device, user equipment (UE), mobile data terminal (MDT), terminal, receiver, transmitter, cellular phone, smartphones, feature phone, tablet personal computer, wearable device, laptop, desktop personal computers (or simply "desktop"), video game console, digital media players, handheld messaging devices, personal data assistant, electronic book reader (or simply "e-reader"), augmented reality (AR) device, virtual reality (VR) device, mixed reality (MR) device, in-vehicle infotainment (IVI) system, in-car entertainment (ICE) system, instrument cluster (IC), head-up display (HUD), on-board diagnostic (OBD) device, dashtop mobile equipment (DME), Electronic Engine Management System (EEMS), electronic control unit (ECU), electronic control module (ECM), embedded system, microcontroller, control module, engine management system (EMS), networked or "smart" appliance, machine-type communications (MTC) device, machine-to-machine (M2M) device, Internet of Things (IoT) device, autonomous sensor, server (e.g., stand-alone, rack-mounted, blade, and/or the like), cloud computing service, network element, network appliance, base station, access point, road side unit, gateway, router, switch, hub, on-premise unit, edge server, edge network device, aggregator, and/or any other like electronic devices.

The term "server" at least in some examples refers to a computing device or system, including processing hardware and/or process space(s), an associated storage medium such as a memory device or database, and, in some instances, suitable application(s) as is known in the art. The terms "server system" and "server" may be used interchangeably herein, and these terms at least in some examples refers to one or more computing system(s) that provide access to a pool of physical and/or virtual resources. The various servers discussed herein include computer devices with rack computing architecture component(s), tower computing architecture component(s), blade computing architecture component(s), and/or the like. The servers may represent a cluster of servers, a server farm, a cloud computing service, or other grouping or pool of servers, which may be located in one or more datacenters. The servers may also be connected to, or otherwise associated with, one or more data storage devices (not shown). Moreover, the servers may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

The term "platform" at least in some examples refers to an environment in which instructions, program code, software elements, and/or the like can be executed or otherwise operate, and examples of such an environment include an architecture (e.g., a motherboard, a computing system, and/or the like), one or more hardware elements (e.g., embedded systems, and/or the like), a cluster of compute nodes, a set of distributed compute nodes or network, an operating system, a virtual machine (VM), a virtualization container, a software framework, a client application (e.g., web browser and/or the like) and associated application programming interfaces, a cloud computing service (e.g., platform as a service (PaaS)), or other underlying software executed with instructions, program code, software elements, and/or the like. The term "architecture" at least in some examples refers to a computer architecture or a network architecture. The term "computer architecture" at least in some examples refers to a physical and logical design or arrangement of software and/or hardware elements in a computing system or platform including technology standards for interacts therebetween. The term "network architecture" at least in some examples refers to a physical and logical design or arrangement of software and/or hardware elements in a network including communication protocols, interfaces, and media transmission.

The term "appliance," "computer appliance," and/or the like, at least in some examples refers to a computer device or computer system with program code (e.g., software or firmware) that is specifically designed to provide a specific computing resource. The term "virtual appliance" at least in some examples refers to a virtual machine image to be implemented by a hypervisor-equipped device that virtualizes or emulates a computer appliance or otherwise is dedicated to provide a specific computing resource. The term "security appliance", "firewall", and/or the like at least in some examples refers to a computer appliance designed to protect computer networks from unwanted traffic and/or malicious attacks. The term "policy appliance" at least in some examples refers to technical control and logging mechanisms to enforce or reconcile policy rules (information use rules) and to ensure accountability in information systems. The term "gateway" at least in some examples refers to a network appliance that allows data to flow from one network to another network, or a computing system or application configured to perform such tasks. Examples of gateways include IP gateways, Internet-to-Orbit (I2O) gateways, IoT gateways, cloud storage gateways, and/or the like.

The term "network element" at least in some examples refers to physical or virtualized equipment and/or infrastructure used to provide wired or wireless communication network services. Additionally or alternatively, the term "network element" at least in some examples refers to a physical or virtualized equipment and/or infrastructure of a wired or wireless communication network that provides network connectivity and/or radio baseband functions for data and/or voice services between one or more users and/or one or more compute nodes. The term "network element" may be considered synonymous to and/or referred to as a networked computer, networking hardware, network equipment, network node, router, switch, hub, bridge, radio network controller, network access node (NAN), base station, base transceiver station (BTS), access point (AP), Radio Access Network (RAN) node, roadside unit (RSU), gateway, server, network appliance, network function (NF), virtualized NF (VNF), and/or the like.

The term "network access node" or "NAN" at least in some examples refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function hardware, and/or compute hardware to operate as a compute node. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline BBF Access Network, and/or the like), network appliance, and/or some other network access hardware.

The term "virtualization container", "execution container", or "container" at least in some examples refers to a partition of a compute node that provides an isolated virtualized computation environment. The term "OS container" at least in some examples refers to a virtualization container utilizing a shared Operating System (OS) kernel of its host, where the host providing the shared OS kernel can be a physical compute node or another virtualization container. Additionally or alternatively, the term "container" at least in some examples refers to a standard unit of software (or a package) including code and its relevant dependencies, and/or an abstraction at the application layer that packages code and dependencies together. Additionally or alternatively, the term "container" or "container image" at least in some examples refers to a lightweight, standalone, executable software package that includes everything needed to run an application such as, for example, code, runtime environment, system tools, system libraries, and settings.

The term "virtual machine" or "VM" at least in some examples refers to a virtualized computation environment that behaves in a same or similar manner as a physical computer and/or a server. The term "hypervisor" at least in some examples refers to a software element that partitions the underlying physical resources of a compute node, creates VMs, manages resources for VMs, and isolates individual VMs from each other.

The term "access technology" at least in some examples refers to the technology used for the underlying physical connection to a communication network. The term "radio technology" at least in some examples refers to technology for wireless transmission and/or reception of electromagnetic radiation for information transfer. The term "radio access technology" or "RAT" at least in some examples refers to the technology used for the underlying physical connection to a radio based communication network. Examples of access technologies include wireless access technologies/RATs, wireline, wireline-cable, wireline broadband forum (wireline-BBF), Ethernet (see e.g., IEEE Standard for Ethernet, IEEE Std 802.3-2018 (31 Aug. 2018) ("[IEEE802.3]")) and variants thereof, fiber optics networks (e.g., ITU-T G.651, ITU-T G.652, Optical Transport Network (OTN), Synchronous optical networking (SONET) and synchronous digital hierarchy (SDH), and/or the like), digital subscriber line (DSL) and variants thereof, Data Over Cable Service Interface Specification (DOCSIS) technologies, hybrid fiber-coaxial (HFC) technologies, and/or the like. Examples of RATs (or RAT types) and/or communications protocols include Advanced Mobile Phone System (AMPS) technologies (e.g., Digital AMPS (D-AMPS), Total Access Communication System (TACS) and variants thereof, such as Extended TACS (ETACS), and/or the like); Global System for Mobile Communications (GSM) technologies (e.g., Circuit Switched Data (CSD), High-Speed CSD (HSCSD), General Packet Radio Service (GPRS), and Enhanced Data Rates for GSM Evolution (EDGE)); Third Generation Partnership Project (3GPP) technologies (e.g., Universal Mobile Telecommunications System (UMTS) and variants thereof (e.g., UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), and/or the like), Generic Access Network (GAN)/Unlicensed Mobile Access (UMA), High Speed Packet Access (HSPA) and variants thereof (e.g., HSPA Plus (HSPA+)), Long Term Evolution (LTE) and variants thereof (e.g., LTE-Advanced (LTE-A), Evolved UTRA (E-UTRA), LTE Extra, LTE-A Pro, LTE LAA, MULTEfire, and/or the like), Fifth Generation (5G) or New Radio (NR), narrowband IoT (NB-IoT), 3GPP Proximity Services (ProSe), and/or the like); ETSI RATs (e.g., High Performance Radio Metropolitan Area Network (HiperMAN), Intelligent Transport Systems (ITS) (e.g., ITS-G5, ITS-G5B, ITS-G5C, and/or the like), and/or the like); Institute of Electrical and Electronics Engineers (IEEE) technologies and/or WiFi (e.g., *IEEE Standard for Local and Metropolitan Area Networks: Overview and Architecture*, IEEE Std 802-2014, pp. 1-74 (30 Jun. 2014) ("[IEEE802]"), *IEEE Standard for Information Technology—Telecommunications and Information Exchange between Systems-Local and Metropolitan Area Networks—Specific Requirements-Part* 11*: Wireless LAN Medium Access Control* (*MAC*) *and Physical Layer* (*PHY*) *Specifications, IEEE Std* 802.11-2020, pp. 1-4379 (26 Feb. 2021) ("[IEEE80211]"), IEEE 802.15 technologies (e.g., *IEEE Standard for Low-Rate Wireless Networks, IEEE Std* 802.15.4-2020, pp. 1-800 (23 Jul. 2020) ("[IEEE802154]") and variants thereof (e.g., ZigBee, WirelessHART, MiWi, ISA100.11a, Thread, IPv6 over Low power WPAN (6LoWPAN), and/or the like), *IEEE Standard for Local and metropolitan area networks-Part* 15.6*: Wireless Body Area Networks*, IEEE Std 802.15.6-2012, pp. 1-271 (29 Feb. 2012), and/or the like), WLAN V2X RATs (e.g., *IEEE Standard for Information technology—Local and metropolitan area networks—Specific requirements—Part* 11*: Wireless LAN Medium Access Control* (*MAC*) *and Physical Layer* (*PHY*) *Specifications Amendment* 6*: Wireless Access in Vehicular Environments*, IEEE Std 802.11p-2010, pp. 1-51 (15 Jul. 2010) ("[IEEE80211p]") (which is now part of [IEEE80211]), *IEEE Guide for Wireless Access in Vehicular Environments* (*WAVE*) *Architecture*, IEEE Standards Association, IEEE 1609.0-2019 (10 Apr. 2019) ("[IEEE16090]"), IEEE 802.11bd, Dedicated Short Range Communications (DSRC), and/or the like), Worldwide Interoperability for Microwave Access (WiMAX) (e.g., *IEEE Standard for Air Interface for Broadband Wireless Access Systems*, IEEE Std 802.16-2017, pp. 1-2726 (2 Mar. 2018) ("[WiMAX]")), Mobile Broadband Wireless Access (MBWA)/iBurst (e.g., IEEE 802.20 and variants thereof), Wireless Gigabit Alliance (WiGig) standards (e.g., IEEE 802.11ad, IEEE 802.11ay, and/or the like), and so forth); Integrated Digital Enhanced Network (iDEN) and variants thereof (e.g., Wideband Integrated Digital Enhanced Network (WiDEN)); millimeter wave (mmWave) technologies/standards (e.g., wireless systems operating at 10-300 GHZ and above 3GPP 5G); short-range and/or wireless personal area network (WPAN) technologies/standards (e.g., IEEE 802.15 technologies (e.g., as mentioned previously); Bluetooth and variants thereof (e.g., Bluetooth 5.3, Bluetooth Low Energy (BLE), and/or the like), WiFi-direct, Miracast, ANT/ANT+, Z-Wave, Universal Plug and Play (UPnP), low power Wide Area Networks (LPWANs), Long Range Wide Area Network (LoRA or LoRaWAN™), and/or the like); optical and/or visible light communication (VLC) technologies/standards (e.g., *IEEE Standard for Local and metropolitan area networks—Part* 15.7: Short-Range Optical Wireless Communications, IEEE Std 802.15.7-2018, pp. 1-407 (23 Apr. 2019), and/or the like); Sigfox; Mobitex; 3GPP2 technologies (e.g., cdmaOne (2G), Code Division Multiple Access 2000 (CDMA 2000), and Evolution-Data Optimized or Evolution-Data Only (EV-DO); Push-to-talk (PTT), Mobile Telephone System (MTS) and variants thereof (e.g., Improved MTS (IMTS), Advanced MTS (AMTS), and/or the like); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) and variants thereof (e.g., DECT Ultra Low Energy (DECT ULE), DECT-2020, DECT-5G, and/or the like); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "protocol" at least in some examples refers to a predefined procedure or method of performing one or more operations. Additionally or alternatively, the term "protocol" at least in some examples refers to a common means for unrelated objects to communicate with each other (sometimes also called interfaces). The term "communication protocol" at least in some examples refers to a set of standardized rules or instructions implemented by a communication device and/or system to communicate with other devices and/or systems, including instructions for packetizing/depacketizing data, modulating/demodulating signals, implementation of protocols stacks, and/or the like. In various implementations, a "protocol" and/or a "communication protocol" may be represented using a protocol stack, a finite state machine (FSM), and/or any other suitable data structure.

The term "application layer" at least in some examples refers to an abstraction layer that specifies shared communications protocols and interfaces used by hosts in a communications network. Additionally or alternatively, the term "application layer" at least in some examples refers to an abstraction layer that interacts with software applications that implement a communicating component, and may include identifying communication partners, determining resource availability, and synchronizing communication. Examples of application layer protocols include Hypertext Transfer Protocol (HTTP), HTTP secure (HTTPS), Andrew File System (AFS), File Transfer Protocol (FTP), Dynamic Host Configuration Protocol (DHCP), Internet Message Access Protocol (IMAP), Lightweight Directory Access Protocol (LDAP), MQTT (MQ Telemetry Transport), Remote Authentication Dial-In User Service (RADIUS), Diameter protocol, Extensible Authentication Protocol (EAP), RDMA over Converged Ethernet version 2 (RoCEv2), Real-time Transport Protocol (RTP), RTP Control Protocol (RTCP), Real Time Streaming Protocol (RTSP), Secure RTP (SRTP), SBMV Protocol, Skinny Client Control Protocol (SCCP), Session Initiation Protocol (SIP), Session Description Protocol (SDP), Simple Mail Transfer Protocol (SMTP), Simple Network Management Protocol (SNMP), Simple Service Discovery Protocol (SSDP), Small Computer System Interface (SCSI), Internet SCSI (ISCSI), ISCSI Extensions for RDMA (iSER), Transport Layer Security (TLS), voice over IP (VOIP), Virtual Private Network (VPN), Wireless Application Protocol (WAP), WebSockets, Web-based secure shell (SSH), Extensible Messaging and Presence Protocol (XMPP), and/or the like.

The term "session layer" at least in some examples refers to an abstraction layer that controls dialogues and/or connections between entities or elements, and may include establishing, managing and terminating the connections between the entities or elements. The term "transport layer" at least in some examples refers to a protocol layer that provides end-to-end (e2e) communication services such as, for example, connection-oriented communication, reliability, flow control, and multiplexing. Examples of transport layer protocols include datagram congestion control protocol (DCCP), fibre channel protocol (FBC), Generic Routing Encapsulation (GRE), GPRS Tunneling (GTP), Micro Transport Protocol (μTP), Multipath TCP (MPTCP), MultiPath QUIC (MPQUIC), Multipath UDP (MPUDP), Quick UDP Internet Connections (QUIC), Remote Direct Memory Access (RDMA), Resource Reservation Protocol (RSVP), Stream Control Transmission Protocol (SCTP), transmission control protocol (TCP), user datagram protocol (UDP), and/or the like.

The term "network layer" at least in some examples refers to a protocol layer that includes means for transferring network packets from a source to a destination via one or more networks. Additionally or alternatively, the term "network layer" at least in some examples refers to a protocol layer that is responsible for packet forwarding and/or routing through intermediary nodes. Additionally or alternatively, the term "network layer" or "internet layer" at least in some examples refers to a protocol layer that includes interworking methods, protocols, and specifications that are used to transport network packets across a network. As examples, the network layer protocols include internet protocol (IP), IP security (IPsec), Internet Control Message Protocol (ICMP), Internet Group Management Protocol (IGMP), Open Shortest Path First protocol (OSPF), Routing Information Protocol (RIP), RDMA over Converged Ethernet version 2 (RoCEv2), Subnetwork Access Protocol (SNAP), and/or some other internet or network protocol layer.

The term "link layer" or "data link layer" at least in some examples refers to a protocol layer that transfers data between nodes on a network segment across a physical layer. Examples of link layer protocols include logical link control (LLC), medium access control (MAC), Ethernet, RDMA over Converged Ethernet version 1 (RoCEv1), and/or the like. The term "medium access control protocol", "MAC protocol", or "MAC" at least in some examples refers to a protocol that governs access to the transmission medium in a network, to enable the exchange of data between stations in a network. Additionally or alternatively, the term "medium access control layer", "MAC layer", or "MAC" at least in some examples refers to a protocol layer or sublayer that performs functions to provide frame-based, connectionless-mode (e.g., datagram style) data transfer between stations or devices. (see e.g., [IEEE802], 3GPP TS 38.321 v17.2.0 (2022-10-01) and 3GPP TS 36.321 v17.2.0 (2022-10-03)). The term "physical layer", "PHY layer", or "PHY" at least in some examples refers to a protocol layer or sublayer that includes capabilities to transmit and receive modulated signals for communicating in a communications network (see e.g., [IEEE802], 3GPP TS 38.201 v17.0.0 (2022-01-05) and 3GPP TS 36.201 v17.0.0 (2022-03-31)).

The term "channel" at least in some examples refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some examples refers to a connection between two devices through a RAT for the purpose of transmitting and receiving information.

The term "local area network" or "LAN" at least in some examples refers to a network of devices, whether indoors or outdoors, covering a limited area or a relatively small geographic area (e.g., within a building or a campus). The term "wireless local area network", "wireless LAN", or "WLAN" at least in some examples refers to a LAN that involves wireless communications. The term "wide area network" or "WAN" at least in some examples refers to a network of devices that extends over a relatively large geographic area (e.g., a telecommunications network). Additionally or alternatively, the term "wide area network" or "WAN" at least in some examples refers to a computer network spanning regions, countries, or even an entire planet The term "compute resource" or simply "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and/or the like), operating systems, virtual machines (VMs), software/applications, computer files, and/or the like. A "hardware resource" at least in some examples refers to compute, storage, and/or network resources provided by physical hardware element(s). A "virtualized resource" at least in some examples refers to compute, storage, and/or network resources provided by virtualization infrastructure to an application, device, system, and/or the like. The term "network resource" or "communication resource" at least in some examples refers to resources that are accessible by computer devices/systems via a communications network. The term "system resources" at least in some examples refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "service" at least in some examples refers to the provision of a discrete function within a system and/or environment. Additionally or alternatively, the term "service" at least in some examples refers to a functionality or a set of functionalities that can be reused. The term "microservice" at least in some examples refers to one or more processes that communicate over a network to fulfil a goal using technology-agnostic protocols (e.g., HTTP and/or the like). Additionally or alternatively, the term "microservice" at least in some examples refers to services that are relatively small in size, messaging-enabled, bounded by contexts, autonomously developed, independently deployable, decentralized, and/or built and released with automated processes. Additionally or alternatively, the term "microservice" at least in some examples refers to a self-contained piece of functionality with clear interfaces, and may implement a layered architecture through its own internal components. Additionally or alternatively, the term "microservice architecture" at least in some examples refers to a variant of the service-oriented architecture (SOA) structural style wherein applications are arranged as a collection of loosely-coupled services (e.g., fine-grained services) and may use lightweight protocols.

The term "session" at least in some examples refers to a temporary and interactive information interchange between two or more communicating devices, two or more application instances, between a computer and user, and/or between any two or more entities or elements. Additionally or alternatively, the term "session" at least in some examples refers to a connectivity service or other service that provides or enables the exchange of data between two entities or elements. The term "network session" at least in some examples refers to a session between two or more communicating devices over a network. The term "web session" at least in some examples refers to session between two or more communicating devices over the Internet or some other network. The term "session identifier," "session ID," or "session token" at least in some examples refers to a piece of data that is used in network communications to identify a session and/or a series of message exchanges.

The term "identifier" at least in some examples refers to a value, or a set of values, that uniquely identify an identity in a certain scope. Additionally or alternatively, the term "identifier" at least in some examples refers to a sequence of characters that identifies or otherwise indicates the identity of a unique object, element, or entity, or a unique class of objects, elements, or entities. Additionally or alternatively, the term "identifier" at least in some examples refers to a sequence of characters used to identify or refer to an application, program, session, object, element, entity, variable, set of data, and/or the like. The "sequence of characters" mentioned previously at least in some examples refers to one or more names, labels, words, numbers, letters, symbols, and/or any combination thereof. Additionally or alternatively, the term "identifier" at least in some examples refers to a name, address, label, distinguishing index, and/or attribute. Additionally or alternatively, the term "identifier" at least in some examples refers to an instance of identification. The term "persistent identifier" at least in some examples refers to an identifier that is reused by a device or by another device associated with the same person or group of persons for an indefinite period. The term "application identifier", "application ID", or "app ID" at least in some examples refers to an identifier that can be mapped to a specific application, application instance, or application instance. In the context of 3GPP 5G/NR, an "application identifier" at least in some examples refers to an identifier that can be mapped to a specific application traffic detection rule. The term "endpoint address" at least in some examples refers to an address used to determine the host/authority part of a target URI, where the target URI is used to access an NF service (e.g., to invoke service operations) of an NF service producer or for notifications to an NF service consumer.

The term "identification" at least in some examples refers to a process of recognizing an identity as distinct from other identities in a particular scope or context, which may involve processing identifiers to reference an identity in an identity database. The term "identity" at least in some examples refers to a set of characteristics, qualities, beliefs, behaviors, and/or other aspects of an entity. Identity can be applied to persons, things, and/or entities. An entity can have several identities (often known as personas). The term "digital identity" at least in some examples refers to a set of attributes and/or any information on an entity used by computer systems to represent an agent, a person, organization, application, device, and/or entity. Additionally or alternatively, the term "identity" or "digital identity" at least in some examples refers to a record or data representing an identity. For purposes of the present disclosure, the abbreviation "ID" may refer to the term "identity", "identification", and/or "identifier".

The term "network address" at least in some examples refers to an identifier for a node or host in a computer network, and may be a unique identifier across a network and/or may be unique to a locally administered portion of the network. The term "port" in the context of computer networks, at least in some examples refers to a communication endpoint, a virtual data connection between two or more entities, and/or a virtual point where network connections start and end. Additionally or alternatively, a "port" at least in some examples is associated with a specific process or service.

Examples of identifiers and/or network addresses include an application identifier, Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, Radio Network Temporary Identifier (RNTI) and variants thereof, International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QOS Flow ID (QFI) and/or 5G QOS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), Closed Access Group Identifier (CAG-ID), driver's license number, Global Trade Item Number (GTIN) (e.g., Australian Product Number (APN), Electronic Produce Code (EPC), European Article Number (EAN), Universal Product Code (UPC), and/or the like), Digital Object Identifier (DOI), email address, Enterprise Application Server (EAS) ID, an endpoint address, an Electronic Product Code (EPC) as defined by the EPCglobal Tag Data Standard, Fully Qualified Domain Name (FQDN), flow ID and/or flow hash, hash value, index, integrated circuit card identification number (ICCID), international article number (IAN), internet protocol (IP) address in an IP network (e.g., IP version 4 (IPv4), IP version 6 (IPv6), and/or the like), an InterPlanetary File System (IPFS) content address, an internet packet exchange (IPX) address, LAN ID, a MAC address, personal area network (PAN) ID, personal identification number (PIN), personal unblocking key (PUK), port number (e.g., TCP port number, UDP port number, and/or the like), price lookup code (PLC), product key, QUIC connection ID, RFID tag, sequence number, service set identifier (SSID) and variants thereof, screen name, serial number, serial SIM number (SSN), stock keeping unit (SKU), socket address, social security number (SSN), subscriber identity module (SIM) ID, telephone number (e.g., in a public switched telephone network (PTSN)), unique identifier (UID) (e.g., including globally UID, universally unique identifier (UUID) (e.g., as specified in ISO/IEC 11578:1996), and/or the like), Universal Resource Identifier (URI), Universal Resource Locator (URL), Uniform Resource Name (URN), user name (e.g., ID for logging into a service provider platform, such as a social network and/or some other service), vehicle identification number (VIN), Virtual LAN (VLAN) ID, X.21 address, an X.25 address, Zigbee® ID, Zigbee® Device Network ID, and/or any other suitable network address and components thereof.

The term "universally unique identifier" or "UUID" refers to a number used to identify information in computer systems. Usually, UUIDs are 128-bit numbers. UUIDs are generally represented as 32 hexadecimal digits displayed in five groups separated by hyphens in the following format: "xxxxxxxx-xxxx-Mxxx-Nxxx-xxxxxxxxxxxx" where the four-bit M and the 1 to 3 bit N fields code the format of the UUID itself. The term "universally unique identifier" or "UUID" may alternatively be referred to a "globally unique identifier" or "GUID".

The term "reference" at least in some examples refers to data useable to locate other data and may be implemented a variety of ways (e.g., a pointer, an index, a handle, a key, an identifier, a hyperlink, and/or the like).

The term "configuration" at least in some examples refer to an information object, data structure(s), or other machine-readable element that contains instructions, conditions, parameters, options, settings, preferences, and/or criteria that is/are relevant to one or more software and/or hardware elements. Additionally or alternatively, the term "configuration" at least in some examples refers to the relative arrangement of components, functional units, and/or entities/elements according to some criteria and/or characteristics. For purposes of the present disclosure, the terms "configuration," "policy," "rules," "rule set," "template," "definition," "schema," "operational parameters," and "parameter set" may be used interchangeable throughout the present disclosure even those these terms may refer to different concepts.

The terms "policy" and "ruleset" at least in some examples refer to an information object, data structure(s), or other machine-readable element that define a set of rules that govern the behavior of one or more software and/or hardware elements.

The term "application" or "app" at least in some examples refers to a computer program designed to carry out a specific task other than one relating to the operation of the computer itself. Additionally or alternatively, term "application" or "app" at least in some examples refers to a complete and deployable package, environment to achieve a certain function in an operational environment.

The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like. Examples of the APIs that may be used for purposes of the present disclosure include remote APIs and/or web APIs (e.g., Representational State Transfer (REST or RESTful) API, Simple Object Access Protocol (SOAP) API, salesforce.com Apex API, and/or the like), a web services (WS) (e.g., Apache® Axi2.4 or Axi3, Apache® CXF, a JSON-Remote Procedure Call (RPC) API (e.g., Ethereum JSON-RPC API implemented by a public or enterprise Ethereum® blockchain platform), JSON-Web Service Protocol (WSP), Web Services Description Language (WSDL), XML Interface for Network Services (XINS), Web Services Conversation Language (WSCL), Web Services Flow Language (WSFL), RESTful web services, Flow Wallet API, and/or the like), and/or some other suitable API and/or WS.

The term "information object" or "InOb" at least in some examples refers to a data structure or piece of information, definition, or specification that includes a name to identify its use in an instance of communication. Additionally or alternatively, the term "information object" or "InOb" at least in some examples refers to a configuration item or other data structure that displays information in an organized form. Additionally or alternatively, the term "information object" or "InOb" at least in some examples refers to an abstraction of a real information entity and/or a representation and/or an occurrence of a real-world entity. Additionally or alternatively, the term "information object" or "InOb" at least in some examples refers to a data structure that contains and/or conveys information or data. Each of the data formats may also define the language, syntax, vocabulary, and/or protocols that govern information storage and/or exchange. Examples of the data formats that may be used for any of the InObs discussed herein may include Accelerated Mobile Pages Script (AMPscript), Abstract Syntax Notation One (ASN.1), Backus-Naur Form (BNF), extended BNF, Bencode, BSON, ColdFusion Markup Language (CFML), comma-separated values (CSV), Control Information Exchange Data Model (C2IEDM), Cascading Stylesheets (CSS), DARPA Agent Markup Language (DAML), Document Type Definition (DTD), Electronic Data Interchange (EDI), Extensible Data Notation (EDN), Extensible Markup Language (XML), Efficient XML Interchange (EXI), Extensible Stylesheet Language (XSL), Free Text (FT), Fixed Word Format (FWF), Cisco® Etch, Franca, Geography Markup Language (GML), Guide Template Language (GTL), Handlebars template language, Hypertext Markup Language (HTML), Interactive Financial Exchange (IFX), Keyhole Markup Language (KML), JAMscript, Java Script Object Notion (JSON), JSON Schema Language, Apache® MessagePack™, Mustache template language, Ontology Interchange Language (OIL), Open Service Interface Definition, Open Financial Exchange (OFX), Precision Graphics Markup Language (PGML), Google® Protocol Buffers (protobuf), Quicken® Financial Exchange (QFX), Regular Language for XML Next Generation (RelaxNG) schema language, regular expressions, Resource Description Framework (RDF) schema language, RESTful Service Description Language (RSDL), Scalable Vector Graphics (SVG), Schematron, Tactical Data Link (TDL) format (e.g., J-series message format for Link 16; JREAP messages; Multifuction Advanced Data Link (MADL), Integrated Broadcast Service/Common Message Format (IBS/CMF), Over-the-Horizon Targeting Gold (OTH-T Gold), Variable Message Format (VMF), United States Message Text Format (USMTF), and any future advanced TDL formats), VBScript, Web Application Description Language (WADL), Web Ontology Language (OWL), Web Services Description Language (WSDL), wiki markup or Wikitext, Wireless Markup Language (WML), extensible HTML (XHTML), XPath, XQuery, XML DTD language, XML Schema Definition (XSD), XML Schema Language, XSL Transformations (XSLT), YAML ("Yet Another Markup Language" or "YANL Ain't Markup Language"), Apache® Thrift, and/or any other data format and/or language discussed elsewhere herein. Additionally or alternatively, the data format for the InObs may be document and/or plain text, spreadsheet, graphics, and/or presentation formats including, for example, American National Standards Institute (ANSI) text, a Computer-Aided Design (CAD) application file format (e.g., ".c3d", ".dwg", ".dft", ".iam", ".iaw", ".tct", and/or other like file extensions), Google® Drive® formats (including associated formats for Google Docs®, Google Forms®, Google Sheets®, Google Slides®, and/or the like), Microsoft® Office® formats (e.g., ".doc", ".ppt", ".xls", ".vsd", and/or other like file extension), OpenDocument Format (including associated document, graphics, presentation, and spreadsheet formats), Open Office XML (OOXML) format (including associated document, graphics, presentation, and spreadsheet formats), Apple® Pages®, Portable Document Format (PDF), Question Object File Format (QUOX), Rich Text File (RTF), TeX and/or LaTeX (".tex" file extension), text file (TXT), TurboTax® file (".tax" file extension), You Need a Budget (YNAB) file, and/or any other like document or plain text file format. Additionally or alternatively, the data format for the InObs may be archive file formats that store metadata and concatenate files, and may or may not compress the files for storage. The term "archive file" refers to a file having a file format or data format that combines or concatenates one or more files into a single file or InOb. Archive files often store directory structures, error detection and correction information, arbitrary comments, and sometimes use built-in encryption. The term "archive format" refers to the data format or file format of an archive file, and may include, for example, archive-only formats that store metadata and concatenate files, for example, including directory or path information; compression-only formats that only compress a collection of files; software package formats that are used to create software packages (including self-installing files), disk image formats that are used to create disk images for mass storage, system recovery, and/or other like purposes; and multi-function archive formats that can store metadata, concatenate, compress, encrypt, create error detection and recovery information, and package the archive into self-extracting and self-expanding files. For the purposes of the present disclosure, the term "archive file" at least in some examples refers to an archive file having any of the aforementioned archive format types. Examples of archive file formats may include Android® Package (APK); Microsoft® Application Package (APPX); Genie Timeline Backup Index File (GBP); Graphics Interchange Format (GIF); gzip (.gz) provided by the GNU Project™; Java® Archive (JAR); Mike O'Brien Pack (MPQ) archives; Open Packaging Conventions (OPC) packages including OOXML files, OpenXPS files, and/or the like; Rar Archive (RAR); Red Hat® package/installer (RPM); Google® SketchUp backup File (SKB); TAR archive (".tar"); XPInstall or XPI installer modules; ZIP (.zip or .zipx); and/or the like. Additionally or alternatively, the archive file formats may be a suitable application package file format and/or the like.

The term "identity document", "piece of identification", "ID", (or colloquially referred to as "papers") at least in some examples refers to any document that may be used to prove a person's identity. Many physical identity documents take the form of an identity card (or "photo ID"), which may be a passport card, driver's license, social security card, national identification card, and/or the like, and typically include a person's photograph, the bearer's name, birth date, address, gender and/or sex, an identification number (e.g., a unique national, state/provincial, or local identification number), card number, citizenship status, and/or other information.

The term "authorization" at least in some examples refers to a prescription that a particular behavior shall not be prevented. The term "authentication" at least in some embodiments refers to a process of proving or verifying an identity. Additionally or alternatively, the term "authentication" at least in some embodiments refers to a mechanism by which a computer system checks or verifies that a user or entity is really the user or entity being claimed. Examples of the authentication and/or authorization techniques include using API keys, basic access authentication ("Basic Auth"), Open Authorization (OAuth), hash-based message authentication codes (HMAC), Kerberos protocol, OpenID, WebID, and/or other authentication and/or authorization techniques.

The term "biometric data", "biometrics", and/or "biometric identifier" at least in some examples refers to any body measurement(s) and/or calculation(s) related to human characteristics. Additionally or alternatively, the term "biometric data", "biometrics", and/or "biometric identifier" at least in some embodiments refers to one or more distinctive, measurable characteristics used to label and describe an individual. The term "physiological biometrics" at least in some embodiments refers to biometrics and/or other characteristics related to physical aspects of an individual; examples include fingerprints, face image, facial features (e.g., including relative arrangement of facial features), DNA, palm print, body part geometry (e.g., hand geometry and/or the like), vein patterns (e.g., palm vein patterns, finger vein pattern, or vein patters of any other body part), eye features (e.g., retina and/or iris), odor/scent, voice features (e.g., pitch, tone, and other audio characteristics of an individual's voice), neural oscillations and/or brainwaves, pulse, electrocardiogram, pulse oximetry, and/or the like. The term "behavioral biometrics" or "behaviometrics" at least in some embodiments refers to biometrics and/or other characteristics related to an individual's behavioral pattern(s); examples include typing rhythm, gait, signature, behavioral profiling (e.g., including personality traits), and voice features.

The term "certificate" or "digital certificate" at least in some examples refers to an information object (e.g., an electronic document or other data structure) used to prove the validity of a piece of data such as a public key in a public key infrastructure (PKI) system. Examples of the digital certificates include the X.509 format and/or some other suitable format, and may be signed using any suitable cryptographic mechanisms such as Elliptic Curve cryptography Digital Signature Algorithm (ECDSA) or some other suitable algorithm such as any of those discussed herein. Additionally or alternatively, the digital certificates discussed herein can include various certificates issued by the an issuer, a verification body, a notified body, certificate authority (CA) (e.g., a root CA and/or the like), an enrollment authority (EA), an authorization authority (AA), and/or other entity as delineated by relevant Certificate Authority Security Council (CASC) standards, Common Computing Security Standards Forum (CCSF) standards, CA/Browser Forum standards, GSMA standards, ETSI standards, GlobalPlatform standards, and/or some other suitable standard.

The term "certificate revocation list" or "CRL" at least in some examples refers to a signed list indicating a set of certificates that are no longer considered valid by the certificate issuer The term "confidential data" at least in some examples refers to any form of information that a person or entity is obligated, by law or contract, to protect from unauthorized access, use, disclosure, modification, or destruction. Additionally or alternatively, "confidential data" at least in some examples refers to any data owned or licensed by a person or entity that is not intentionally shared with the general public or that is classified by the person or entity with a designation that precludes sharing with the general public.

The term "consent" "at least in some examples refers to any freely given, specific, informed and unambiguous indication of a data subject's wishes by which he or she, by a statement or by a clear affirmative action, signifies agreement to the processing of personal data relating to the data subject.

The term "consistency check" at least in some examples refers to a test or assessment performed to determine if data has any internal conflicts, conflicts with other data, and/or whether any contradictions exist. In some examples, a "consistency check" may operate according to a "consistency model", which at least in some examples refers to a set of operations for performing a consistency check and/or rules or policies used to determine if data is consistent (or predictable) or not.

The term "cryptographic mechanism" at least in some examples refers to any cryptographic protocol and/or cryptographic algorithm. Examples of cryptographic mechanisms include a cryptographic hash algorithm, such as a function in the Secure Hash Algorithm (SHA) 2 set of cryptographic hash algorithms (e.g., SHA-226, SHA-256, SHA-512, and/or the like), SHA 3, and so forth, or any type of keyed or unkeyed cryptographic hash function and/or any other function discussed herein; an elliptic curve cryptographic (ECC) algorithm (e.g., Elliptic Curve cryptography Key Agreement algorithm (ECKA) algorithm, Elliptic Curve cryptography Digital Signature Algorithm (ECDSA), Lenstra elliptic-curve factorization or elliptic-curve factorization method (ECM), Menezes-Qu-Vanstone (MQV) or elliptic curve MQV (ECMQV), Elliptic Curve Diffie-Hellman (ECDH) key agreement, Elliptic Curve Integrated Encryption Scheme (ECIES) or Elliptic Curve Augmented Encryption Scheme, Edwards-curve Digital Signature Algorithm (EdDSA), and/or the like); Rivest-Shamir-Adleman (RSA) cryptography; Merkle signature scheme, advanced encryption system (AES) algorithm; a triple data encryption algorithm (3DES); Quantum cryptography algorithms; and/or the like. Additionally or alternatively, the term "cryptographic protocol" at least in some examples refers to a sequence of steps precisely specifying the actions required of two or more entities to achieve specific security objectives (e.g., cryptographic protocol for key agreement). Additionally or alternatively, the term "cryptographic algorithm" at least in some examples refers to an algorithm specifying the steps followed by a single entity to achieve specific security objectives (e.g., cryptographic algorithm for symmetric key encryption).

The term "cryptographic hash function", "hash function", or "hash") at least in some examples refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert.

The term "cryptographic key" or "key" in cryptography at least in some examples refers to a piece of information, usually a string of numbers or letters that are stored in a file, which, when processed through a cryptographic algorithm can encode or decode cryptographic data. The term "symmetric-key algorithm" at least in some examples refers to a cryptographic algorithm that uses the same cryptographic key for both the encryption of plaintext and the decryption of ciphertext; the keys may be identical, or there may be a simple transformation to go between the two keys.

The term "encryption" at least in some examples refers to a process of encoding information wherein the original representation of information (referred to as "plaintext") into an alternative form (referred to as "ciphertext"). In some examples, an encryption scheme includes use of a pseudorandom encryption key generated by a cryptographic mechanism or some other algorithm to generate an encryption key, which can be used to encrypt and/or decrypt the plaintext.

The term "information security" or "InfoSec" at least in some examples refers to any practice, technique, and technology for protecting information by mitigating information risks and typically involves preventing or reducing the probability of unauthorized/inappropriate access to data, or the unlawful use, disclosure, disruption, deletion, corruption, modification, inspection, recording, or devaluation of information; and the information to be protected may take any form including electronic information, physical or tangible (e.g., computer-readable media storing information, paperwork, and/or the like), or intangible (e.g., knowledge, intellectual property assets, and/or the like).

The term "integrity" at least in some examples refers to a mechanism that assures that data has not been altered in an unapproved way. Examples of cryptographic mechanisms that can be used for integrity protection include digital signatures, message authentication codes (MAC), and secure hashes.

The term “know your client”, “know your customer”, or “KYC” at least in some examples refers to verification procedures, a set of standards and/or requirements used to ensure that an org has sufficient information about their clients, their risk profiles, and their financial position. In various examples, KYC includes three components, including customer identification program (CIP), imposed under the USA Patriot Act in 2001, customer due diligence (CDD), and ongoing monitoring or enhanced due diligence (EDD) of a customer’s account once it is established. CIP requires that financial firms must obtain four pieces of identifying information about a client, including name, date of birth, address, and identification number. CDD is a process in which all of a customer’s credentials are collected to verify their identity and evaluate their risk profile for suspicious account activity. EDD is used for customers that are at a higher risk of infiltration, terrorism financing, or money laundering and additional information collection is often necessary. Account owners generally must provide a government-issued ID as proof of identity. Some institutions require two forms of ID, such as a driver’s license, birth certificate, social security card, or passport. In addition to confirming identity, the address must be confirmed. This can be done with proof of ID or with an accompanying document confirming the address of the client.

The term “knowledge-based assessment”, “knowledge-based authentication”, or “KBA” at least in some examples refers to verification and/or authentication processes or procedures, which requires the knowledge of private information (or personal data) to prove that the entity/element providing the identifying information is the actual owner of the corresponding identity. In some examples, KBA-generated questions are static KBAs or dynamic KBAs. The term “static KBAs” at least in some examples refers to a pre-agreed set of KBA data and/or shared secrets, such as place of birth, mother’s maiden name, name of first pet, and/or the like. The term “dynamic KBAs” at least in some examples refers to KBA-questions generated from a wider base of personal information, such as account numbers, loan amounts, tax payment amounts, and/or the like. Additionally or alternatively, the term “dynamic KBAs” at least in some examples refers to KBA-questions that are generated based on changing parameters or conditions, such as previously supplied KBA questions, timing parameters, and/or the like.

The term “personal data,” “personally identifiable information,” “PII,” at least in some examples refers to information that relates to an identified or identifiable individual (referred to as a “data subject”). Additionally or alternatively, “personal data,” “personally identifiable information,” “PII,” at least in some examples refers to information that can be used on its own or in combination with other information to identify, contact, or locate a data subject, or to identify a data subject in context.

The term “plausibility check” at least in some examples refers to a test or assessment performed to determine whether data is, or can be, plausible. The term “plausible” at least in some examples refers to an amount or quality of being acceptable, reasonable, comprehensible, and/or probable.

The term “Personal Identity Verification” or “PIV” at least in some examples refers to a common identification standard for Federal employees and contractors as specified in National Institute of Standards and Technology (NIST), “Personal Identity Verification (PIV) of Federal Employees and Contractors”, Federal Information Processing Standards (FIPS) 201-3 (January 2022), which is hereby incorporated by reference in its entirety and for all purposes. The term “Personal Identity Verification-Interoperable” or “PIV-I” at least in some examples refers to a credential standard for issuance to non-Federal entities to access U.S. Federal Government systems. Additionally or alternatively, the term “Personal Identity Verification-Interoperable” or “PIV-I” at least in some embodiments refers to a credential that is issued to non-Federal entities per the Chief Information Officers (CIO) Council, “Personal Identity Verification Interoperability for Issuers” v2.0.1 (27 Jul. 2017), which is hereby incorporated by reference in its entirety and for all purposes.

The term “protected location” at least in some examples refers to a memory location outside of a hardware root of trust, protected against attacks on confidentiality, and in which from the perspective of the root of trust, integrity protection is limited to the detection of modifications.

The term “pseudonymization” at least in some examples refers to any means of processing personal data or sensitive data in such a manner that the personal/sensitive data can no longer be attributed to a specific data subject (e.g., person or entity) without the use of additional information. The additional information may be kept separately from the personal/sensitive data and may be subject to technical and organizational measures to ensure that the personal/sensitive data are not attributed to an identified or identifiable natural person.

The term “public-key cryptography” or “asymmetric cryptography” at least in some examples refers to a cryptographic system that use pairs of related keys including, for example, a public key used for generating ciphertext, and a corresponding private key to decrypt the ciphertext to obtain the original message (e.g., plaintext); in some examples, these key pairs are generated with cryptographic algorithms based on one-way functions.

The term “sensitive data” at least in some examples refers to data related to racial or ethnic origin, political opinions, religious or philosophical beliefs, or trade union membership, genetic data, biometric data, data concerning health, and/or data concerning a natural person’s sex life or sexual orientation.

The term “shielded location” at least in some examples refers to a memory location within the hardware root of trust, protected against attacks on confidentiality and manipulation attacks including deletion that impact the integrity of the memory, in which access is enforced by the hardware root of trust.

The term “security threat” at least in some examples refers to a potential violation of security. Examples of security threats include loss or disclosure of information, modification of assets, destruction of assets, and/or the like. A security threat can be intentional like a deliberate attack or unintentional due to an internal failure or malfunctions. Alteration of data/assets may include insertion, deletion, and/or substitution breaches.

The term “signature” or “digital signature” at least in some examples refers to a mathematical scheme, process, or method for verifying the authenticity of a digital message or information object (e.g., an electronic document or other data structure).

The term “verification” at least in some examples refers to a process, method, function, or any other means of establishing the correctness of information or data.

The term “electronic health record” or “EHR” at least in some examples refers to a systematized collection of patient and population electronically stored health information in a digital format. Additionally or alternatively, the term "electronic health record" or "EHR" at least in some examples refers to a health record and/or personal health record (PHR) in electronic form. Additionally or alternatively, the term "electronic health record" or "EHR" at least in some examples refers to a collection of a patient's stored health information in a digital format. As examples, EHRs include a range of data, including demographics, medical history, progress notes, problems, medications, allergies, vital signs, immunization status, laboratory test results, radiology images, vital signs, personal statistics/data (e.g., age, weight, and/or the like), and billing information. For purposes of the present disclosure, the term "electronic health record" and "electronic medical record" may be used interchangeably, even though these terms may refer to different concepts in some cases or contexts. The term "personal health record" or "PHR" is a health record where health data and other information related to the care of a patient is maintained by the patient.

The term "health care provider", "healthcare provider", or "HP" at least in some examples refers to an individual professional, facility, and/or organization licensed to provide healthcare diagnosis and treatment services including medication, surgery, medical devices, and/or the like. Examples of HPs include physicians, dentists, advanced practice providers (APPs) (e.g., physician assistants, nurses, pharmacists, midwives, chiropractors, social workers, psychologists, and/or the like), allied health professionals (e.g., technicians, therapists, hygienists, medical/dental assistants, nutritionists, scribes, counselors, physiologists, interpreters, radiation scientists, midwives, paramedics, pathologists, radiographers, sonographers, and/or the like), health professionals, individual hospitals, hospital networks, healthcare system, medical group, medical practice, clinics, and/or the like.

The term "deployment script" at least in some examples refers to a script that automates the process of deploying software applications to a server, cloud, and/or other environment. In some examples, a "deployment script" includes a series of commands or instructions that are executed automatically to deploy an application, configure settings of the application and/or the environment, and/or start services and/or processes.

The term "blockchain" at least in some examples refers to a list of records (referred to as "blocks") that are linked together in some way, usually using cryptography. The term "block" as used in "blockchain" at least in some examples refers to a batch of transactions with a reference to a previous block (e.g., a hash of the previous block) in a blockchain thereby linking the block to the previous block. In various implementations, each block in a blockchain contains a cryptographic hash of a previous block, a timestamp, and transaction data (e.g., represented as a Merkle tree). Additionally or alternatively, the term "blockchain" at least in some examples refers to a digital database containing information, such as records of financial or other transactions, which can be simultaneously used and shared within a large decentralized, publicly accessible network. Additionally or alternatively, the term "blockchain" at least in some examples refers to a shared, immutable ledger that facilitates the process of recording transactions and tracking assets (tangible and intangible) in a network. In some examples, a blockchain includes a growing list of records, called blocks, that are linked together using cryptography. Each block contains a cryptographic hash of the previous block, a timestamp, and transaction data. The timestamp proves that the transaction data existed when the block was published in order to get into its hash. Each block contains information about the block previous to it, forming a chain, with each additional block reinforcing the ones before it. Therefore, blockchains are resistant to modification of their data because once recorded, the data in any given block cannot be altered retroactively without altering all subsequent blocks. Blockchains are typically managed by a peer-to-peer network for use as a publicly distributed ledger, where nodes collectively adhere to a protocol to communicate and validate new blocks. The term "blockchain mining" or "mining" at least in some examples refers to a process (e.g., computer computations) by which transactions are validated and verified for inclusion in a blockchain.

The terms "consensus algorithm", "consensus protocol", "consensus mechanism", and/or "consensus" at least in some examples refers to one or more coordinating processes that allows distributed computing applications and/or multi-agent systems to agree on a data value that is needed during computation. Examples of consensus algorithms include proof of work (PoW), reusable PoW, proof of useful work, proof of stake (PoS), proof of space, proof of authority, Specialized Proofs of Confidential Knowledge (SPoCKs), Delegated Proof of Stake (DPOS), Byzantine fault tolerance (BFT), BFT-DPOS, Transaction as Proof of Stake (TaPoS), Paxos, distributed lock services (e.g., Chubby provided by Google®), lockstep protocols, Byzantine agreement protocol (BAP), quantum BAP, and/or the like.

The term "consortium blockchain" at least in some examples refers to a group of private blockchains, each owned by individual institutions that permit the sharing of information for various purposes, such as improving/streamlining workflows, transparency, and/or accountability. Additionally or alternatively, the term "consortium blockchain" at least in some examples refers to a hybrid blockchain networks that combines public and private blockchain network features. Additionally or alternatively, the term "consortium blockchain" at least in some examples refers to a permissioned blockchain networks governed by a group of organizations that have decided to share a ledger among themselves for transactions. Additionally or alternatively, the term "consortium blockchain" can also be referred to as a "federated blockchain".

The term "decentralized application", "decentralized app", "Dapp", "Đapp", "dApp", and/or the like, at least in some examples refers to an application that can operate autonomously, for example, through the use of smart contracts, that run on a decentralized computing platform, blockchain, or other distributed ledger system. Additionally or alternatively, the term "decentralized application", "decentralized app", "Dapp", "Đapp", "dApp", and/or the like, at least in some examples refers to an application configured to generate and distribute tokens according to a standard algorithm and/or set of criteria.

The term "Ethereum" at least in some examples refers to a decentralized, open-source blockchain with smart contract functionality. The term "Ether", "ETH", or "E" at least in some examples refers to the native cryptocurrency of the Ethereum platform. The term "Ethereum Improvement Proposals" or "EIPs" at least in some examples refers to standards for the Ethereum platform, including core protocol specifications, client APIs, and contract standards. The term "Ethereum Virtual Machine" or "EVM" at least in some examples refers to a runtime environment for transaction execution in Ethereum. Additionally or alternatively, the term "Ethereum Virtual Machine" or "EVM" at least in some examples refers to a global virtual computer whose state every participant on the Ethereum network stores and agrees on; where any participant can request the execution of arbitrary code on the EVM; code execution changes the state of the EVM. Additional aspects of Ethereum, Ether, and EVMs are discussed in *Ethereum Development Documentation*, ETHEREUM.org (18 Oct. 2018), https://ethereum.org/en/developers/docs/ ("[Ethereum Doc]"), *Ethereum Glossary*, ETHEREUM.org (23 Feb. 2022), https://ethereum.org/en/glossary/, Takenobu T., *Ethereum EVM illustrated: exploring some mental models and implementations*, rev. 0.01.1 (March 2018), http://takenobu-hs.github.io/downloads/ethereum_evm_illustrated.pdf, and Dr. Gavin Wood, *Ethereum: A secure Decentralised Generalised Transaction Ledger*, Berlin version b8ffc51 (21 Feb. 2022), https://ethereum.github.io/yellowpaper/paper.pdf ("[Ethereum-Yellow-Paper]"), the contents of each of which are hereby incorporated by reference in their entireties and for all purposes.

The terms "flow blockchain", "flow framework", or simply "flow" at least in some examples refers to a node pipeline that may be used to verify blockchain transactions as discussed in Hentschel et al., *Flow: Separating Consensus and Compute*, arXiv: 1909.05821v1 [cs.DC], 21 pages (12 Sep. 2019); Hentschel et al., *Flow: Separating Consensus and Compute—Execution Verification—*, arXiv: 1909.05832v1 [cs.DC] (12 Sep. 2019); Hentschel et al., *Flow: Separating Consensus and Compute—Block Formation and Execution—*, arXiv: 2002.07403v1 [cs.DC] (18 Feb. 2020); Flow Primer, FLOW BLOCKCHAIN (24 Sep. 2020), https://flow.com/primer; FLOW Token Economics, FLOW BLOCKCHAIN (23 Sep. 2020), https://flow.com/flow-token-economics; Mackenzie 10thfloor, *How to Launch a Fungible Token on Flow*, FLOW DEVELOPERS (22 Sep. 2022), https://developers.flow.com/flow/fungible-tokens; [Flow-NFT]; Bastian Müller ("turbolent"), *The Cadence Programming Language*, FLOW DEVELOPERS (17 Mar. 2021), https://developers.flow.com/cadence/language; and Lafrance et al., *Incentives in a Multi-Role Blockchain,* 16 pages (21 Sep. 2020) (collectively referred to herein as "[Flow]"), the contents of each of which are hereby incorporated by reference in their entireties and for all purposes.

The term "gas" at least in some examples refers to a unit that measures the amount of computational effort required to execute specific operations on the Ethereum network. Additionally or alternatively, the term "gas" at least in some examples refers to a limit on the amount of work that is needed to execute a transaction. The term "gas price" or "gas fee" at least in some examples refers to the fee required to conduct a transaction successfully in terms of computational resources, computational complexity, and/or currency.

The term "housekeeping" at least in some examples refers to an entry or exit routine appended to a user-written block of code (such as a routine, subroutine, function, smart contract, and/or the like) at its entry and exit. Additionally or alternatively, the term "housekeeping" at least in some examples refers to any automated or manual process whereby a computer is cleaned up after usage (e.g., freeing resources such as virtual memory and/or the like, saving and/or restoring a program state or context, initializing local variables, garbage collection processes, data conversion, backing up data, disk maintenance processes, and/or the like).

The term "InterPlanetary File System" or "IPFS" at least in some examples refers to a protocol and peer-to-peer network for storing and sharing data in a distributed file system. IPFS uses content-addressing to uniquely identify each file in a global namespace connecting all computing devices. Additional aspects of IPFS are discussed in Interplanetary File System (IPFS) Documentation, IPFS Docs (2018), https://docs.ipfs.io/("[IPFS]"), the contents of which is hereby incorporated by reference in its entirety and for all purposes.

The term "Merkle tree" or "hash tree" at least in some examples refers to a tree data structure in which every leaf node is labelled with the cryptographic hash of a data block, and every node that is not a leaf node (e.g., a branch node, inner node, or inode) is labelled with the cryptographic hash of the labels of its child nodes. Additionally or alternatively, "hash tree" at least in some examples is a generalization of a hash list and a hash chain.

The term "minting" at least in some examples refers to a process of turning digital data into a digital asset such as a token or non-fungible token (NFT), and may involve adding the digital asset to a blockchain or other distributed ledger. In some examples, "minting" is performed according to [EIP-721], [EIP-1155], Lockyer et al., *EIP-998: ERC-998 Composable Non-Fungible Token Standard [DRAFT]*, ETHEREUM IMPROVEMENT PROPOSALS, no. 998 (July 2018), https://eips.ethereum.org/EIPS/eip-998 ("[EIP-998]"), Buterin et al., *EIP-1559: Fee market change for ETH 1.0 chain*, ETHEREUM IMPROVEMENT PROPOSALS, no. 1559 (April 2019), https://eips.ethereum.org/EIPS/eip-1559 ("[EIP-1559]"), Marro et al., *EIP-5375: NFT Author Information and Consent*, ETHEREUM IMPROVEMENT PROPOSALS, no. 5375 (July 2022), https://eips.ethereum.org/EIPS/eip-5375 ("[EIP-5375]"), and/or Zainan Victor Zhou, EIP-5679*: Token Minting and Burning*, ETHEREUM IMPROVEMENT PROPOSALS, no. 5679, (September 2022), https://eips.ethereum.org/EIPS/eip-5679 ("[EIP-5679]"), the contents of each of which are hereby incorporated by reference in their entireties and for all purposes.

The term "non-fungible token" or "NFT" at least in some examples refers to a non-interchangeable unit of data. Additionally or alternatively, the term "non-fungible token" or "NFT" at least in some examples refers to a non-interchangeable unit of data that provides or otherwise acts as a certificate of authenticity or proof of ownership of some physical or virtual item or object. NFTs may be stored on a blockchain or other form of digital ledger, and sold or traded. NFTs may be associated with digital files such as photos, videos, audio, virtual property or virtual assets, and/or the like. Moreover, because individual NFTs are uniquely identifiable, NFTs differ from blockchain cryptocurrencies, such as Bitcoin, Ether, and/or the like. Additional aspects of NFTs are discussed in Entriken et al., EIP-721*: Non-Fungible Token Standard*, ETHEREUM IMPROVEMENT PROPOSALS, no. 721 (24 Jan. 2018), https://eips.ethereum.org/EIPS/eip-721 ("[EIP-721]") and Reitwießner et al., *EIP-165: Standard Interface Detection*, ETHEREUM IMPROVEMENT PROPOSALS, no. 165 (23 Jan. 2018), https://eips.ethereum.org/EIPS/eip-165 ("[EIP-165]"), Burks et al., *EIP-2981: NFT Royalty Standard*, ETHEREUM IMPROVEMENT PROPOSALS, no. 2981 (September 2020), https://eips.ethereum.org/EIPS/eip-2981 ("[EIP-2981]"), Anders et al., EIP-4907*: Rental NFT, an Extension of EIP-721*, ETHEREUM IMPROVEMENT PROPOSALS, no. 4907 (March 2022), https://eips.ethereum.org/EIPS/eip-4907 ("[EIP-4907]"), Lance et al., *EIP-5006: Rental NFT, NFT User Extension [DRAFT]*, ETHEREUM IMPROVEMENT PROPOSALS, no. 5006 (April 2022), https://eips.ethereum.org/EIPS/eip-5006 ("[EIP-5006]"), Anders et al., *EIP-5007: Time NFT, EIP-721 Time Extension [DRAFT]*, ETHEREUM IMPROVEMENT PROPOSALS, no. 5007 (April 2022), https://eips.ethereum.org/EIPS/eip-5007 ("[EIP-5007]"), Siemens et al., *Flow Non-Fungible Token Standard*, FLOW BLOCKCHAIN (20 Dec. 2021)

https://github.com/onflow/flow-nft/blob/master/README.md ("[Flow-NFT]"), and/or Karslen et al., *Non-Fingible Token Metadata*, Flow Improvement Proposal, no. 636 (6 Dec. 2021) ("[FLIP-636]"), the contents of each of which are hereby incorporated by reference in their entireties and for all purposes.

The term "on-chain transaction" at least in some examples refers to a transaction that occurs and is considered valid when the blockchain is modified. Additionally or alternatively, the term "on-chain transaction" at least in some examples refers to a transaction that is carried out on a blockchain or blockchain network. In some examples, the term "on-chain transaction" may be synonymous with the term "transaction".

The term "off-chain transaction" at least in some examples refers to a transaction that takes place or takes value outside of a blockchain. Additionally or alternatively, the term "off-chain transaction" at least in some examples refers to a transaction that is confirmed outside of a blockchain network. Additionally or alternatively, the term "off-chain transaction" at least in some examples refers to a transaction that involves some of the transaction-related work from a blockchain ecosystem, which can later be integrated back into a blockchain.

The term "smart contract" at least in some examples refers to a set of self-executing code. Additionally or alternatively, the term "smart contract" at least in some examples refers to a program, application, set of trigger functions, or transaction protocol that is intended to automatically execute, control, or document relevant events and actions according to some predefined criteria or conditions such as those defined in a contract, agreement, or policy. Additional aspects of smart contracts are discussed in Mudge et al., *EIP-173: Contract Ownership Standard*, Ethereum Improvement Proposals, no. 173 (7 Jun. 2018), https://eips.ethereum.org/EIPS/eip-173 ("[EIP-173]"), Radomski et al., *EIP-1155: Multi Token Standard*, Ethereum Improvement Proposals, no. 1155 (17 Jun. 2018), https://eips.ethereum.org/EIPS/eip-1155 ("[EIP-1155]"), Murray et al., *EIP-1167: Minimal Proxy Contract*, Ethereum Improvement Proposals, no. 1167 (June 2018), https://eips.ethereum.org/EIPS/eip-1167 ("[EIP-1167]"), Giordano et al., *EIP-1271: Standard Signature Validation Method for Contracts*, Ethereum Improvement Proposals, no. 1271 (July 2018), https://eips.ethereum.org/EIPS/eip-1271 ("[EIP-1271]"), *Enterprise Ethereum Alliance Client Specification v7*, EEA Editor's Draft, version 7 (10 Feb. 2022), https://entethalliance.github.io/client-spec/spec.html ("[EEA-CS7]"), *Solidity Documentation*, release 0.8.18, revision c1040815 (8 Sep. 2022) ("[Solidity]"), Vyper Team, *Vyper Documentation*, release v0.3.8, revision 1cd6f3db (15 Dec. 2022) ("[Vyper]"), FuelLaps™, Yul+, version 0.2.3 (10 Oct. 2020), https://github.com/FuelLabs/yulp ("[Yul+]"), *The Cadence Programming Landuage*, Flow Developers (17 Mar. 2021), https://developers.flow.com/cadence/language/index ("[Cadence]"), and Contracts, openzepplin|docs, version 4.x (2022), https://docs.openzeppelin.com/contracts/4.x/("[OZContracts]"), the contents of each of which are hereby incorporated by reference in their entireties and for all purposes. In some examples, one or more smart contracts can be implemented as "diamonds" as discussed in Mudge, *EIP-2535: Diamonds, Multi-Facet Proxy*, Ethereum Improvement Proposals, no. 2535 (February 2020), https://eips.ethereum.org/EIPS/eip-2535 ("[EIP-2535]"), the contents of which are hereby incorporated by reference in its entirety and for all purposes.

The term "staking" at least in some examples refers to the process of holding or locking up a certain amount of cryptocurrency or tokens in order to participate in maintaining the operations and security of a blockchain network. Additionally or alternatively, the term "staking" at least in some examples refers to a consensus mechanism used in Proof-of-Stake (POS) blockchain networks, where validators (also referred to as "validator nodes", "staking nodes", or "block producers") are chosen to create new blocks based on the amount of cryptocurrency or tokens they have staked or locked up as collateral.

The term "token" at least in some examples refers to a software and/or hardware object or element that represents the right or ability to perform an operation. Additionally or alternatively, the term "token" at least in some examples refers to a software and/or hardware object or element that references or maps to another data item, which may be done through a tokenization system. The term "security token", "authentication token", "cryptographic token", and/or the like at least in some examples refers to a software object and/or a physical device used for computer authentication. The term "tokenization" at least in some examples refers to a process for substituting a data item with another equivalent data item (e.g., a "token") that has no extrinsic or exploitable meaning or value, or at least a different meaning or value than the original data item. Additional aspects of tokens are discussed in Vogelsteller et al., *EIP-20: Token Standard*, Ethereum Improvement Proposals, no. 20 (19 Nov. 2015), https://eips.ethereum.org/EIPS/eip-20 ("[EIP-20]"), Dafflon et al., *EIP-777: Token Standard*, Ethereum Improvement Proposals, no. 777 (20 Nov. 2017), https://eips.ethereum.org/EIPS/eip-777 ("[EIP-777]"), StartfundInc, *EIP-5528: Refundable Fungible Token*, Ethereum Improvement Proposals, no. 5528 (August 2022), https://eips.ethereum.org/EIPS/eip-5528 ("[EIP-5528]"), and/or Igualada et al., *Fingible Token Metadata*, Flow Improvement Proposal, no. 1087 (16 Aug. 2022) ("[FLIP-1087]"), the contents of each of which are hereby incorporated by reference in their entireties and for all purposes. In some examples, the term "token" and/or "NFT" can include semi-fungible tokens as discussed in Wang et al., *EIP-3525: Semi-Fungible Token*, Ethereum Improvement Proposals, no. 3525 (December 2020), https://eips.ethereum.org/EIPS/eip-3525 ("[EIP-3525]") and/or Zhu et al., EIP-5727*: Semi-Fungible Soulbound Token [DRAFT]*, Ethereum Improvement Proposals, no. 5727 (September 2022), https://eips.ethereum.org/EIPS/eip-5727 ("[EIP-5727]"), the contents of which is hereby incorporated by reference in its entirety and for all purposes.

The term "transaction" at least in some examples refers to a unit of work performed within a computing system and/or a database management system. Additionally or alternatively, the term "transaction" at least in some examples refers to information processing that is divided into individual, indivisible operations. Additionally or alternatively, the term "transaction" at least in some examples refers to the physical and/or electronic exchange or transfer of assets or objects. Additionally or alternatively, the term "transaction" at least in some examples refers to a request to execute operations on a blockchain that change the state of one or more accounts. The term "private transaction" at least in some examples refers to a transaction where some information about the transaction, such as the payload data, or the sender or the recipient, is only available to the subset of parties privy to that transaction.

The term "wallet" or "digital wallet" at least in some examples refers to an electronic device, online/web service, and/or software application that allows a party to make electronic transaction with another party. Additionally or alternatively, the term "wallet" or "digital wallet" at least in some examples refers to an electronic device, online/web service, and/or software application used to store credentials (e.g., cryptographic private keys) that are used to perform transactions and/or access an account. Additional aspects of wallets are discussed in [EEA-CS7].

The term "translation" at least in some examples refers to the process of converting or otherwise changing data from a first form, shape, configuration, structure, description, and/or arrangement into a second form, shape, configuration, structure, description, and/or arrangement. In some examples, "translation" can include transcoding and/or transformation. The term "transcoding" at least in some examples refers to taking information/data in one format (e.g., a packed binary format) and translating the same information/data into another format in the same sequence. Additionally or alternatively, the term "transcoding" at least in some examples refers to taking the same information, in the same sequence, and packaging the information (e.g., bits or bytes) differently. The term "transformation" at least in some examples refers to changing data from one format and writing it in another format, keeping the same order, sequence, and/or nesting of data items. Additionally or alternatively, the term "transformation" at least in some examples involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some examples refers to changing the schema of a data object to another schema.

Aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. A computing system, comprising:
- an interface circuitry;
- a processor circuitry connected to the interface circuitry; and
- a non-transitory memory containing instructions, which when executed by the processor circuitry, cause the processor circuitry to:
  - receive, by the interface circuitry, from an online portal, personally identifiable information associated with a person;
  - forward, by the interface circuitry, the received personally identifiable information;
  - verify, by the processor circuitry, authenticity of the personally identifiable information against one or more authoritative sources;
  - store, by the processor circuitry, the verified personally identifiable information as metadata in a distributed file system,
  - detect, by the processor circuitry, a trigger to mint a non-fungible token (NFT) identity (ID) for the person for use with the online portal;
  - execute, by a minting engine, in response to detection of the trigger, a smart contract of the online portal to cause the NFT ID to be minted based on the metadata and online portal-specific requirements of the smart contract, wherein different smart contracts define different requirements of different online portals to mint an NFT ID;
  - receive, by the processor circuitry, from the minting engine, a minted NFT ID based on execution of the smart contract;
  - issue, by the processor circuitry, the minted NFT ID to at least one of an administrator (admin) or a client associated with the person; and
  - store, by the processor circuitry, the minted NFT ID in one or more distributed ledgers or blockchains.

2. The computing system of claim 1, wherein the instructions further cause the processor circuitry to:
- generate transaction data to be used for executing the smart contract, wherein the transaction data includes at least one of a token ID for the NFT ID, ownership information of an owner of the NFT ID, a reference to a storage location of the metadata in the distributed file system, or supply information indicating a number and type of NFT IDs to be minted.

3. The computing system of claim 1, wherein the minted NFT ID includes a reference to a storage location of the metadata, and the minted NFT ID does not include the personally identifiable information and the metadata.

4. The computing system of claim 1, wherein the admin and the client associated with the person comprise a standalone wallet device or a client application (app), a web app, or a digital wallet app operating on a client device.

5. The computing system of claim 1, wherein the personally identifiable information comprises at least one of biographic data or biometric data.

6. The computing system of claim 1, wherein the distributed file system comprises an InterPlanetary File System (IPFS).

7. The computing system of claim 1, wherein the trigger comprises at least one of: a request from the client associated with the person, a request from the admin, completion of verification of the personally identifiable information, or a predefined event.

8. The computing system of claim 1, wherein the smart contract defines requirements comprising at least one of: a token type, a token standard, ownership rights, transfer restrictions, or verification requirements.

9. The computing system of claim 1, wherein the instructions further cause the processor circuitry to:
- encrypt the personally identifiable information prior to storing the verified personally identifiable information as metadata in the distributed file system.

10. The computing system of claim 1, wherein the instructions further cause the processor circuitry to:
- delete the personally identifiable information from the computing system after the minted NFT ID is stored in the one or more distributed ledgers or blockchains.

11. The computing system of claim 1, wherein the different requirements include different types of inputs required to mint an NFT ID for the different online portals.

12. The computing system of claim 1, wherein the different requirements include one or more types of inputs that are required to be provided by a wallet of the client and one or more types of inputs that are required to be provided by a wallet of the administrator.

13. The computing system of claim 1, wherein the different requirements are based on whether the different online portals are associated with a government sector, a non-government organization sector or a social media sector.

14. The computing system of claim 1, wherein to cause the NFT ID to be minted, the minting engine is configured to process the metadata in ways defined by at least one of a wallet of the client or a wallet of the administrator for use with the online portal.

15. The computing system of claim 1, wherein the NFT ID comprises a digitized form of a physical identity document.

16. A method for creating a non-fungible token (NFT) based identity, comprising:

receiving, by an interface circuitry, from an online portal, personally identifiable information associated with a person;

verifying, by a processor circuitry, authenticity of the personally identifiable information against one or more authoritative sources;

storing, by the processor circuitry, the verified personally identifiable information as metadata in a distributed file system;

detecting, by the processor circuitry, a trigger to mint an NFT identity (ID) for the person for use with the online portal;

executing, by a minting engine, in response to detection of the trigger, a smart contract of the online portal to cause the NFT ID to be minted based on the metadata and online portal-specific requirements of the smart contract, wherein different smart contracts define different requirements of different online portals to mint an NFT ID;

receiving, by the processor circuitry, from the minting engine, a minted NFT ID based on execution of the smart contract;

issuing, by the processor circuitry, the minted NFT ID to at least one of an administrator (admin) or a client associated with the person; and storing, by the processor circuitry, the minted NFT ID in one or more distributed ledgers or blockchains.

17. The method of claim 16, further comprising:

generating transaction data to be used for executing the smart contract, wherein the transaction data includes at least one of a token ID for the NFT ID, ownership information of an owner of the NFT ID, a reference to a storage location of the metadata in the distributed file system, or supply information indicating a number and type of NFT IDs to be minted.

18. The method of claim 16, wherein the minted NFT ID includes a reference to a storage location of the metadata, and the minted NFT ID does not include the personally identifiable information and the metadata.

19. The method of claim 16, wherein the personally identifiable information comprises at least one of biographic data or biometric data.

20. The method of claim 16, further comprising:

encrypting the personally identifiable information prior to storing the verified personally identifiable information as metadata in the distributed file system.

21. At least one non-transitory computer-readable medium comprising instructions that, when executed by at least one processor, cause the at least one processor to perform operations comprising:

receiving, from an online portal, personally identifiable information associated with a person;

verifying authenticity of the personally identifiable information against one or more authoritative sources;

storing the verified personally identifiable information as metadata in a distributed file system;

detecting a trigger to mint a non-fungible token (NFT) identity (ID) for the person for use with the online portal;

executing, in response to detection of the trigger, a smart contract of the online portal to cause the NFT ID to be minted based on the metadata and online portal-specific requirements of the smart contract, wherein different smart contracts define different requirements of different online portals to mint an NFT ID;

receiving a minted NFT ID based on execution of the smart contract;

issuing the minted NFT ID to at least one of an administrator (admin) or a client associated with the person; and storing the minted NFT ID in one or more distributed ledgers or blockchains.

22. The at least one non-transitory computer-readable medium of claim 21, wherein a set of parameters defined by the smart contract comprises at least one of: a token type, a token standard, ownership rights, transfer restrictions, or verification requirements.

23. The at least one non-transitory computer-readable medium of claim 21, wherein the operations further comprise:

generating transaction data to be used for executing the smart contract, wherein the transaction data includes at least one of a token ID for the NFT ID, ownership information of an owner of the NFT ID, a reference to a storage location of the metadata in the distributed file system, or supply information indicating a number and type of NFT IDs to be minted.

24. The at least one non-transitory computer-readable medium of claim 21, wherein the minted NFT ID includes a reference to a storage location of the metadata, and the minted NFT ID does not include the personally identifiable information and the metadata.

25. The at least one non-transitory computer-readable medium of claim 21, wherein the admin and the client associated with the person comprise a standalone wallet device or a client application (app), a web app, or a digital wallet app operating on a client device.

26. The at least one non-transitory computer-readable medium of claim 21, wherein the operations further comprise:

encrypting the personally identifiable information prior to storing the verified personally identifiable information as metadata in the distributed file system; and deleting the personally identifiable information after the minted NFT ID is stored in the one or more distributed ledgers or blockchains.

27. A method for creating a non-fungible token (NFT) based identity, comprising:

receiving, from an online portal, identity (ID) data associated with a person, the ID data comprising at least one of a physical or electronic ID document, contact information, authentication credentials, or biometric data;

verifying authenticity of the ID data against one or more authoritative sources;

storing the verified ID data as metadata in a distributed file system;

detecting a trigger to mint an NFT identity (ID) for the person;

executing, in response to the trigger, a smart contract of the online portal to cause the NFT ID to be minted based on the metadata and according to online portal-specific requirements defined by the smart contract, wherein different smart contracts define different requirements of different online portals to cause an NFT ID to be minted;

receiving a minted NFT ID based on execution of the smart contract;

issuing the minted NFT ID to at least one of an administrator (admin) or to a client associated with the person for use with the online portal; and storing the minted NFT ID in one or more distributed ledgers or blockchains.

28. At least one non-transitory computer-readable medium comprising instructions that, when executed by at least one processor, cause the at least one processor to perform operations comprising:

receiving, from an online portal, identity (ID) data associated with a person, the ID data comprising at least one of a physical or electronic ID document, contact information, authentication credentials, or biometric data;

verifying authenticity of the ID data against one or more authoritative sources;

storing the verified ID data as metadata in a distributed file system;

detecting a trigger to mint a NFT identity (ID) for the person for use with the online portal;

executing, in response to the trigger, a smart contract of the online portal to cause the NFT ID to be minted based on the metadata and according to online portal-specific requirements defined by the smart contract for the online portal, wherein different smart contracts define different requirements of different online portals to cause an NFT ID to be minted;

receiving a minted NFT ID based on execution of the smart contract;

issuing the minted NFT ID to at least one of an administrator (admin) or a client associated with the person; and storing the minted NFT ID in one or more distributed ledgers or blockchains.

* * * * *